US009735848B2

United States Patent
Saiwai et al.

(10) Patent No.: US 9,735,848 B2
(45) Date of Patent: Aug. 15, 2017

(54) MOBILE COMMUNICATION SYSTEM AND COMMUNICATION CONTROL METHOD

(71) Applicant: KYOCERA CORPORATION, Kyoto (JP)

(72) Inventors: Takahiro Saiwai, Kawasaki (JP); Chiharu Yamazaki, Ota-ku (JP); Kugo Morita, Yokohama (JP); Fangwei Tong, Machida (JP); Atsuhisa Inakoshi, Kawasaki (JP); Masato Fujishiro, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/435,537

(22) PCT Filed: Oct. 9, 2013

(86) PCT No.: PCT/JP2013/077531
§ 371 (c)(1),
(2) Date: Apr. 14, 2015

(87) PCT Pub. No.: WO2014/061534
PCT Pub. Date: Apr. 24, 2014

(65) Prior Publication Data
US 2015/0333807 A1 Nov. 19, 2015

Related U.S. Application Data

(60) Provisional application No. 61/715,588, filed on Oct. 18, 2012, provisional application No. 61/715,632, (Continued)

(51) Int. Cl.
*H04K 1/10* (2006.01)
*H04L 27/28* (2006.01)
(Continued)

(52) U.S. Cl.
CPC .......... *H04B 7/0456* (2013.01); *H04B 7/063* (2013.01); *H04B 7/0617* (2013.01);
(Continued)

(58) Field of Classification Search
CPC .... H04B 7/0456; H04B 7/0617; H04B 7/063; H04B 7/0639; H04W 74/006; H04W 72/10; H04W 24/10; H04W 72/1226; H04L 5/00
(Continued)

(56) References Cited

U.S. PATENT DOCUMENTS

| 8,731,480 | B2 * | 5/2014 | Kim | ....................... H04B 7/024 370/238 |
| 2007/0041464 | A1 * | 2/2007 | Kim | ....................... H04L 1/0026 375/267 |

(Continued)

FOREIGN PATENT DOCUMENTS

| JP | 2009-111781 A | 5/2009 |
| JP | 2009-164975 A | 7/2009 |

(Continued)

OTHER PUBLICATIONS

International Search Report; PCT/JP2013/077531; Dec. 24, 2013.
(Continued)

*Primary Examiner* — Phuong Phu
(74) *Attorney, Agent, or Firm* — Studebaker & Brackett PC

(57) ABSTRACT

A mobile communication system performs downlink multi-antenna transmission by applying a precoder matrix that defines transmission directionality of downlink and a rank that defines number of signal sequences of the downlink. The mobile communication system comprises a user terminal that feeds back feedback information of a target frequency band, to a base station. The feedback information
(Continued)

includes combinations of precoder matrix information indicating the precoder matrix and rank information indicating the rank.

22 Claims, 45 Drawing Sheets

Related U.S. Application Data filed on Oct. 18, 2012, provisional application No. 61/715,651, filed on Oct. 18, 2012, provisional application No. 61/723,069, filed on Nov. 6, 2012.

(51) Int. Cl.

| | | |
|---|---|---|
| *H04B 7/0456* | (2017.01) | |
| *H04W 74/00* | (2009.01) | |
| *H04W 72/10* | (2009.01) | |
| *H04B 7/06* | (2006.01) | |
| *H04L 5/00* | (2006.01) | |
| *H04W 72/12* | (2009.01) | |
| *H04W 24/10* | (2009.01) | |

(52) U.S. Cl.
CPC ............ *H04B 7/0639* (2013.01); *H04L 5/00* (2013.01); *H04L 5/0023* (2013.01); *H04L 5/0057* (2013.01); *H04W 72/10* (2013.01); *H04W 72/1226* (2013.01); *H04W 74/006* (2013.01); *H04W 24/10* (2013.01)

(58) Field of Classification Search
USPC ..................... 375/260, 267, 299, 346, 347
See application file for complete search history.

(56) References Cited

U.S. PATENT DOCUMENTS

| | | |
|---|---|---|
| 2011/0009125 A1 | 1/2011 | Shin et al. |
| 2011/0013719 A1 | 1/2011 | Taoka et al. |
| 2013/0044833 A1 | 2/2013 | Zhou et al. |
| 2013/0128846 A1 | 5/2013 | Golitschek Edler von Elbwart et al. |
| 2013/0336270 A1 | 12/2013 | Nagata et al. |
| 2014/0355543 A1 | 12/2014 | Golitschek Edler von Elbwart et al. |

FOREIGN PATENT DOCUMENTS

| | | |
|---|---|---|
| JP | 2012-070383 A | 4/2012 |
| JP | 2012-147125 A | 8/2012 |
| WO | 2011/005048 A2 | 1/2011 |
| WO | 2011/134160 A1 | 11/2011 |

OTHER PUBLICATIONS

Samsung; "Multi-Component Feedback for CQI Enhancement"; 3GPP TSG RAN WG1 Meeting #62; R1-105379; Xian, China; Oct. 11-15, 2010.
3GPP TS 36.300 V11.3.0 (Sep. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).
A. Inakoshi et al.; "A Study on Feedback Information for Coordinated Beamforming Multi-Cell Coordination for LTE-Advanced System"; IEICE Technical Report RCS2012-178; Nov. 8, 2012.
An Office Action; "Notice of Reasons for Rejection," issued by the Japanese Patent Office on Feb. 16, 2016, which corresponds to Japanese Patent Application No. 2014-542080 and is related to U.S. Appl. No. 14/435,537; with English language statement of relevance.
3GPP TSG RAN WGI#62bis, RI-105133, "CQI enhancement for Rel-10 MU MIMO", Xi'an, China, Oct. 11-15, 2010.
Office Action issued by the Japanese Patent Office dated Apr. 25, 2017, which corresponds to Japanese Patent Application No. 2016-115322 and is related to U.S. Appl. No. 14/435,537, with English language Concise Exaplanation.

\* cited by examiner

FIG. 12

| RI 0 (ex. =1) | Date length1 (ex. =1) | BC-PMI 00 | |
|---|---|---|---|
| RI 1 (ex. =2) | Date length2 (ex. =1) | BC-PMI 10 | BC-PMI 11 |
| RI N-1 | Date length (ex. =0) | | |
| RI N | Date lengthN (ex. =1) | BC-PMI N0 | |

FIG. 17

| | INTERFERENCE AMOUNT SMALL → | |
|---|---|---|
| RI 0 (ex. =1) | BC-PMI 00 | BC-PMI 01 Priority 1 (ex. =5) |
| RI 1 (ex. =2) | BC-PMI 10 Priority 1 (ex. =4) | BC-PMI 11 Priority 2 (ex. =2) |
| RI N-1 | BC-PMI 20 Priority 3 (ex. =3) | BC-PMI 21 Priority 3 (ex. =6) |
| RI N | BC-PMI N0 Priority N | BC-PMI N1 Priority N |

FIG. 22

| | | SMALL ← INTERFERENCE AMOUNT |
|---|---|---|
| RI 0 (ex. =1) | BC-PMI 00 | BC-PMI 01 (ex. =null) |
| RI 1 (ex. =2) | BC-PMI 10 | BC-PMI 11 |
| RI N-1 | BC-PMI 20 (ex. =null) | BC-PMI 21 (ex. =null) |
| RI N | BC-PMI N0 | BC-PMI N1 (ex. =null) |

FIG. 24

| | | |
|---|---|---|
| ↑ Priority | RI 0 (ex. =3) | BC-PMI 0 (ex. =5) |
| | RI 1 (ex. =2) | BC-PMI 1 |
| | RI N-1 | BC-PMI 2 |
| ↓ SMALL | RI N | BC-PMI N |

FIG. 47

| Priority 0 | RI 0 | BC-PMI0 | CQI0 |
| Priority 1 | RI 1 | BC-PMI1 | CQI0 |
| Priority 2 | RI 2 | BC-PMI2 | CQI0 |
| Priority 3 | RI 3 | BC-PMI3 | CQI0 |
| Priority 4 | RI 4 | BC-PMI4 | CQI1 |
| Priority 5 | RI 5 | BC-PMI5 | CQI1 |
| Priority 6 | RI 6 | BC-PMI6 | CQI2 |
| Priority 7 | RI 7 | BC-PMI7 | CQI2 |

| CQI0 | Priority 4 | Priority 6 |

MOBILE COMMUNICATION SYSTEM AND COMMUNICATION CONTROL METHOD

TECHNICAL FIELD

The present invention relates to a mobile communication system and a communication control method that support downlink multi-antenna transmission.

BACKGROUND ART

An LIE system of which the specifications are formulated in 3GPP (3rd Generation Partnership Project), which is a project aiming to standardize a mobile communication system, supports downlink multi-antenna transmission (for example, see Non Patent Document 1).

In order to realize the downlink multi-antenna transmission in the FDD scheme, a user terminal feeds back a combination of precoder matrix information indicating a precoder matrix and rank information indicating a rank, to a base station. The precoder matrix determines the transmission directionality, and the rank determines the number of signal sequences (number of layers).

The base station performs the downlink multi-antenna transmission by applying the precoder matrix and the rank based on the feedback information (a combination of the precoder matrix information and the rank information) fed back by each user terminal.

PRIOR ART DOCUMENTS

Non Patent Documents

[Non Patent Document 1] 3GPP Technology Specifications "TS 36.300 V11.3.0" (September, 2012)

SUMMARY OF INVENTION

The current specifications stipulate the feedback of information expressing one precoder matrix as the feedback information for a target frequency band (an entire downlink band or a subband). However, it is difficult to appropriately execute the downlink multi-antenna transmission by such a feedback method.

Thus, the present invention provides a mobile communication system and a communication control method by which the downlink multi-antenna transmission can be executed appropriately.

According to one embodiment, a mobile communication system that performs downlink multi-antenna transmission by applying a precoder matrix that defines transmission directionality of downlink and a rank that defines number of signal sequences (number of signal layers) of the downlink, comprises: a user terminal that feeds back feedback information of a target frequency band, to a base station. The feedback information includes a plurality of combinations of precoder matrix information indicating the precoder matrix and rank information indicating the rank.

According to one embodiment, a mobile communication system performs downlink multi-antenna transmission by applying a precoder matrix that defines transmission directionality of downlink. The mobile communication system comprises: a user terminal that feeds back several pieces of precoder matrix information to a base station as feedback information of target frequency band. When the user terminal selects all pieces of precoder matrix information as the feedback information, then instead of feeding back all the pieces of precoder matrix information to the base station, the user terminal feeds back an index indicating all the pieces of precoder matrix information to the base station.

According to one embodiment, a mobile communication system performs downlink multi-antenna transmission by applying a precoder matrix that defines transmission directionality of downlink. The mobile communication system comprises: a user terminal that feeds back one or more pieces of precoder matrix information to a base station as the feedback information of target frequency band. Number of the pieces of precoder matrix information fed back to the base station is set according to number of user terminals connected to the base station.

According to one embodiment, a mobile communication system performs downlink multi-antenna transmission by applying a precoder matrix that defines transmission directionality of downlink. The mobile communication system comprises a user terminal that feeds back precoder matrix information to a serving cell as the feedback information of target frequency band. The user terminal performs an aperiodic feedback of second precoder matrix information while performing a periodic feedback of first precoder matrix information.

According to one embodiment, a mobile communication system comprises: a base station that performs downlink multi-antenna transmission by using a precoder matrix that determines transmission directionality of downlink and a rank that determines number of signal sequences (number of signal layers) of the downlink; and a user terminal that feeds back feedback information of a target frequency band to the base station. The base station notifies, to the user terminal, usage status information indicating a usage status of the rank and/or the precoder matrix in the base station. The feedback information includes combination of precoder matrix information indicating the precoder matrix and rank information indicating the rank. On the basis of the usage status information, the user terminal regards only combination corresponding to the rank and/or the precoder matrix that is in use by the base station, as the combination to be fed back to the base station.

According to one embodiment, a communication control method is used in a mobile communication system having a first base station, a user terminal that establishes a connection with the first base station, and a second base station that cooperates with the first base station, and supporting downlink multi-antenna transmission. The communication control method comprises: a step A of determining, by the user terminal, a plurality of combinations of transmission control information indicating a precoder matrix and/or a rank for the downlink multi-antenna transmission, and channel quality information indicating a modulation and coding scheme that is recommended when the transmission control information is applied, and then notifying, to the second base station, several pieces of transmission control information included in the plurality of determined combinations; a step B of selecting, by the second base station, any transmission control information from among the several pieces of transmission control information, and then notifying, to the first base station, predetermined information related to the selected transmission control information; and a step C of determining, by the first base station, on the basis of the predetermined information, channel quality information corresponding to the transmission control information selected by the second base station, and then using the determined channel quality information for scheduling the user terminal.

BRIEF DESCRIPTION OF DRAWINGS

FIG. 12 is a diagram illustrating a configuration example of feedback information used in an operation pattern 2 according to the first embodiment.

FIG. 17 is a diagram illustrating a configuration example of feedback information used in an operation pattern 4 according to the first embodiment.

FIG. 22 is a diagram illustrating a configuration example of feedback information used in an operation pattern 6 according to the first embodiment.

FIG. 24 is a diagram illustrating a configuration example of feedback information used in an operation pattern 7 according to the first embodiment.

FIG. 47 is a diagram illustrating an operation of UE according to the eighth embodiment.

DESCRIPTION OF EMBODIMENTS

Figure 1:
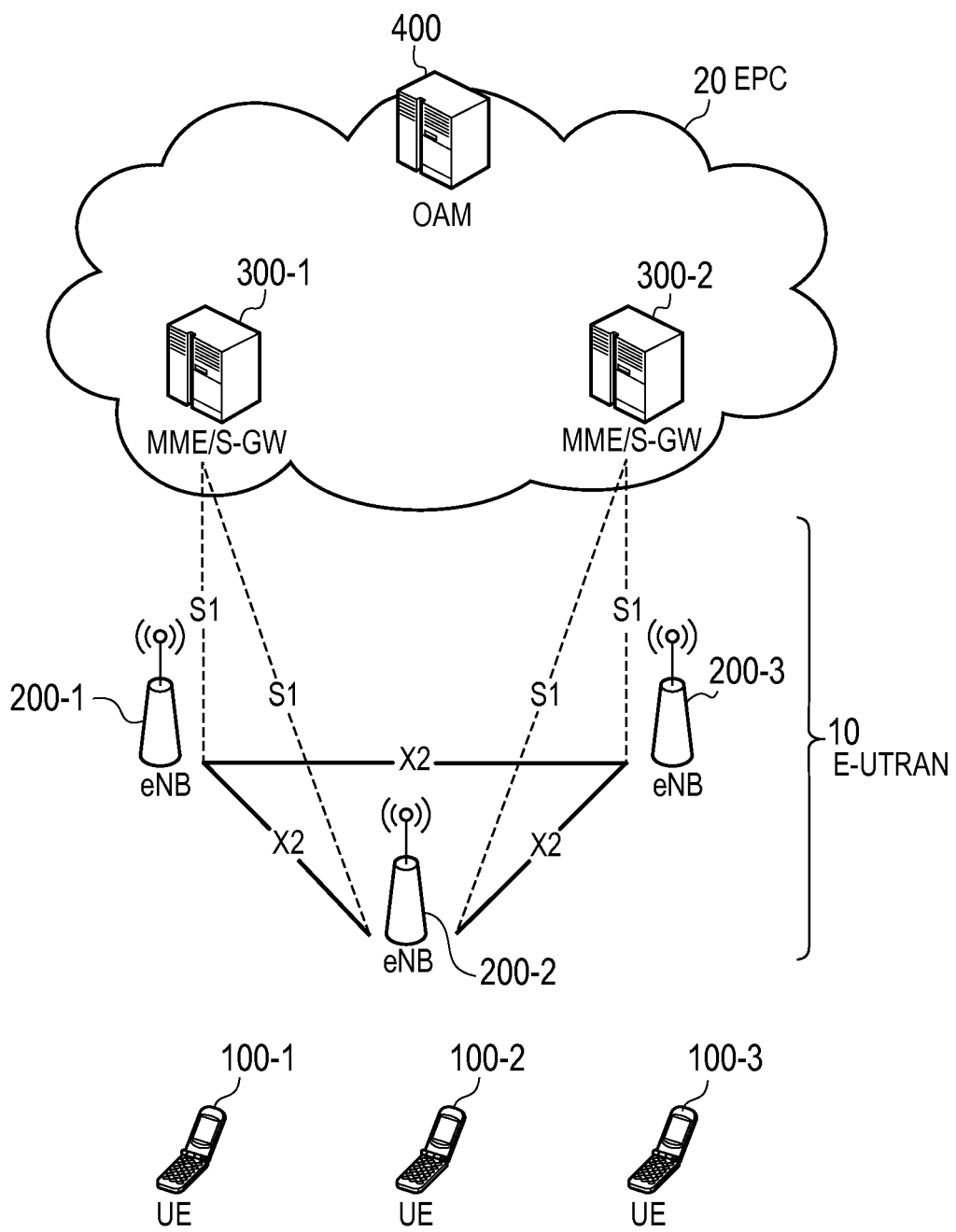
FIG. 1 is a configuration diagram of an LTE system according to first to eighth embodiments.

[First to Fourth Embodiments]
(1) First Embodiment
(1.1) Overview of First Embodiment A mobile communication system according to a first embodiment performs downlink multi-antenna transmission by applying a precoder matrix that defines the transmission directionality of the downlink and a rank that defines the number of signal sequences of the downlink. The mobile communication system includes a user terminal that feeds back the feedback information of the target frequency band to the base station. The feedback information includes a plurality of combinations of precoder matrix information indicating the precoder matrix and rank information indicating the rank. Thus, the base station can select an appropriate combination on the basis of the plurality of combinations while taking into consideration other user terminals as well. Therefore, the downlink multi-antenna transmission can be implemented appropriately.

The precoder matrix information indicates the precoder matrix that is preferred for the user terminal. The base station assigns the same radio resource as that of the user terminal to another user terminal that feeds back feedback information matching any of the plurality of combinations included in the feedback information, and then performs transmission to the another user terminal according to the matching feedback information. Thus, the interference exerted on the user terminal can be suppressed.

Alternatively, the precoder matrix information indicates the precoder matrix that is not preferred for the user terminal. The base station assigns the same radio resource as that of the user terminal to another user terminal that feeds back feedback information that does not match any of the plurality of combinations included in the feedback information, and then performs transmission to the another user terminal according to the non-matching feedback information. Thus, the interference exerted on the user terminal can be suppressed.

For each of the several pieces of prescribed rank information, the user terminal calculates the evaluated value of each of the several pieces of prescribed precoder matrix information. The user terminal includes the plurality of combinations in the feedback information on the basis of the evaluated value. Thus, the appropriate plurality of combinations can be included in the feedback information on the basis of the evaluated value.

In an operation pattern 1, for each of the several pieces of rank information, the user terminal selects a predetermined number of pieces of precoder matrix information in accordance with the evaluated value. The user terminal includes the combinations of each of the several pieces of rank information and the selected predetermined number of pieces of precoder matrix information in the feedback information.

In an operation pattern 2, for each of the several pieces of rank information, the user terminal selects the precoder matrix information in accordance with the comparison result of the evaluated value and the threshold value. The user terminal includes the combinations of each of the several pieces of rank information and the selected precoder matrix information in the feedback information.

Alternatively, for each of the several pieces of rank information, the user terminal selects the precoder matrix information in which the difference from the maximum evaluated value or from the minimum evaluated value is less than the threshold value. The user terminal includes the combinations of each of the pieces of rank information and the selected precoder matrix information in the feedback information.

In an operation pattern 3, the user terminal selects the combinations of the precoder matrix information and the rank information corresponding to the precoder matrix information in accordance with the comparison result of the evaluated value and the threshold value. The user terminal includes the selected combinations in the feedback information.

In an operation pattern 4, the user terminal adds priority order information indicating a priority order determined in accordance with the evaluated value, to each of the plurality of combinations. The user terminal includes the plurality of combinations, to which the priority order information is added, in the feedback information.

In an operation pattern 5, the evaluated value of the precoder matrix information is the channel quality information indicating the modulation and coding scheme recommended when the precoder matrix corresponding to the precoder matrix information is applied. The user terminal selects the combinations of the precoder matrix information, which is in accordance with the comparison result of the evaluated value and the channel quality information to be fed back, and the rank information corresponding to the precoder matrix information. The user terminal includes the selected combinations in the feedback information.

In an operation pattern 6, the user terminal additionally sets the unselected precoder matrix information in the operation pattern 2 to a null value, and includes the resultant information in the feedback information.

In an operation pattern 7, the user terminal selects a predetermined number of combinations in accordance with the evaluated value. The user terminal includes the selected combinations in the feedback information.

In an operation pattern 8, from among the combinations selected in the operation pattern 7, the user terminal sets the precoder matrix information, in accordance with the comparison result of the evaluated value and the threshold value, to a null value, and includes the resultant information in the feedback information.

The user terminal according to the first embodiment is used in a mobile communication system that performs the downlink multi-antenna transmission by applying a precoder matrix that defines the transmission directionality of the downlink and a rank that defines the number of signal sequences of the downlink. The user terminal includes a control unit that feeds back feedback information of the target frequency band to the base station. The feedback information includes a plurality of combinations of the precoder matrix information indicating the precoder matrix and the rank information indicating the rank.

A processor according to the first embodiment is provided in the user terminal of a mobile communication system that performs the downlink multi-antenna transmission by applying a precoder matrix that defines the transmission directionality of the downlink and a rank that defines the number of signal sequences of the downlink. The processor performs a process by which the user terminal feeds back feedback information of the target frequency band to the base station. The feedback information includes a plurality of combinations of the precoder matrix information indicating the precoder matrix and the rank information indicating the rank.

The base station according to the first embodiment is used in a mobile communication system that performs the downlink multi-antenna transmission by applying a precoder matrix that defines the transmission directionality of the downlink and a rank that defines the number of signal sequences of the downlink. The base station includes a reception unit that receives feedback information of the target frequency band from the user terminal. The feedback information includes a plurality of combinations of the precoder matrix information indicating the precoder matrix and the rank information indicating the rank.

The processor according to the first embodiment is provided in a base station of a mobile communication system that performs the downlink multi-antenna transmission by applying a precoder matrix that defines the transmission directionality of the downlink and a rank that defines the number of signal sequences of the downlink. The processor performs a process by which the base station receives the feedback information of the target frequency band from the user terminal. The feedback information includes a plurality of combinations of the precoder matrix information indicating the precoder matrix and the rank information indicating the rank.

Hereinafter, with reference to the drawings, a description will be provided for an embodiment when the present invention is applied to a mobile communication system (an LTE system) configured to conform to the 3GPP standards.

(1.2) LTE System

FIG. 1 is a configuration diagram of an LTE system according to the first embodiment.

As illustrated in FIG. 1, the LIE system includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 forms the cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM 400 (Operation and Maintenance).

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
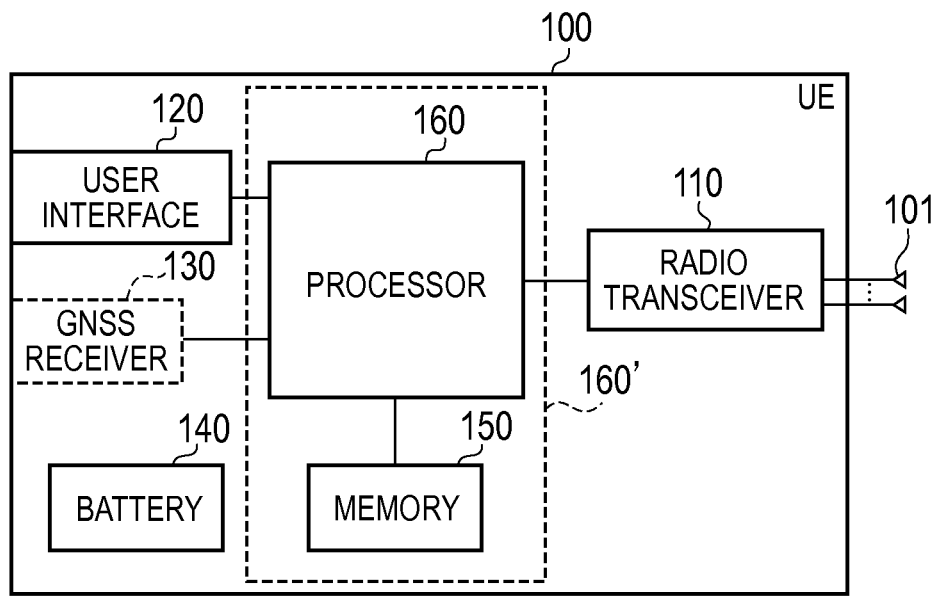
FIG. 2 is a block diagram of UE according to first to eighth embodiments.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 executes various processes and various communication protocols described later.

In the first embodiment, the processor 160 generates channel state information (CSI) on the basis of a signal received by the radio transceiver 110 (particularly, a reference signal), and then feeds back the channel state information to the serving cell or the neighboring cell. The channel state information includes PMI (Precoding Matrix Indicator), RI (Rank Indicator), and CQI (Channel Quality Indicator), for example.

An "entire downlink band" or a "subband" is stipulated as the frequency unit (the target frequency band) that is to be fed back, and which one to use is determined in accordance with the instruction from the eNB 200. A subband is a frequency unit obtained by dividing the entire downlink band, and includes the bandwidth of a plurality of resource blocks. The details of the information that is fed back (such as the PMI, the RI, and the CQI) are described later.

Figure 3:
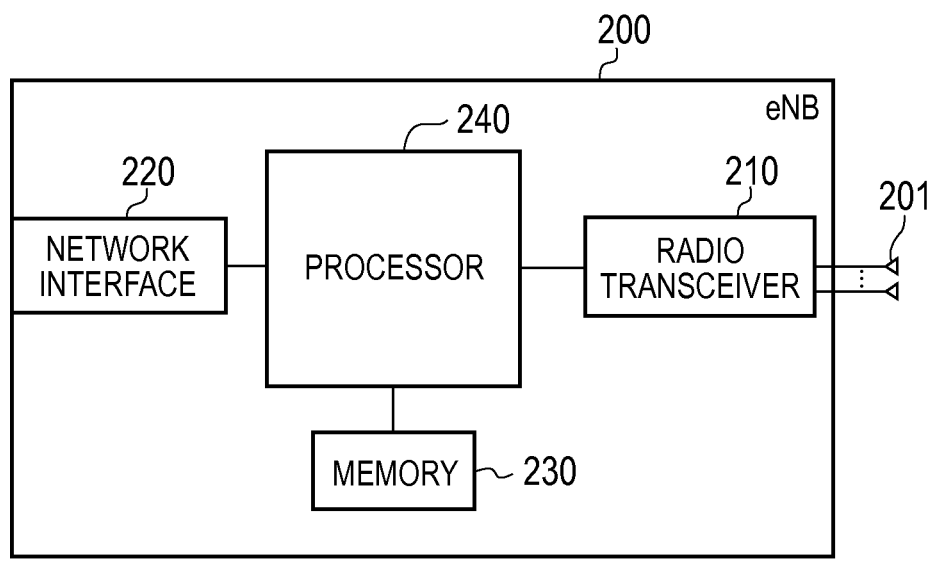
FIG. 3 is a block diagram of eNB according to first to eighth embodiments.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a control unit.

The antenna 201 and the radio transceiver 210 are used to transmit and receive a radio signal. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 executes various processes and various communication protocols described later.

Figure 4:
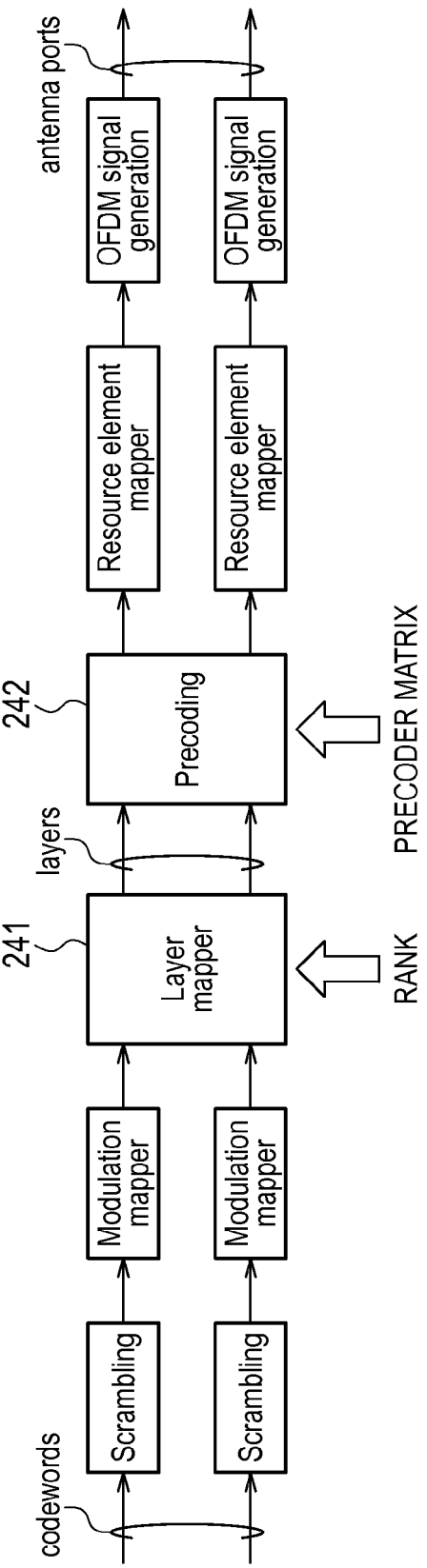
FIG. 4 is a block diagram related to downlink multi-antenna transmission according to first to eighth embodiments.

In the first embodiment, the processor 240 performs downlink multi-antenna transmission by applying the precoder matrix and the rank. FIG. 4 is a block diagram of the processor 240 related to the downlink multi-antenna transmission. The details of each block are described in 3GPP TS 36.211, for example. However, an overview of each block will be described herein.

As illustrated in FIG. 4, one or two codewords to be transmitted through a physical channel are scrambled, are modulated into a modulation symbol, and then are mapped to a plurality of layers by a layer mapper 241. The codeword is an error correction data unit. The rank (number of layers) is determined on the basis of the RI that is fed back.

A precoder 242 precodes a modulation symbol of each layer by using a precoder matrix. The precoder matrix is determined on the basis of the PMI that is fed back. The precoded modulation symbol is mapped to a resource element, is converted into an OFDM signal of a temporal domain, and is output to each antenna port.

Figure 5:
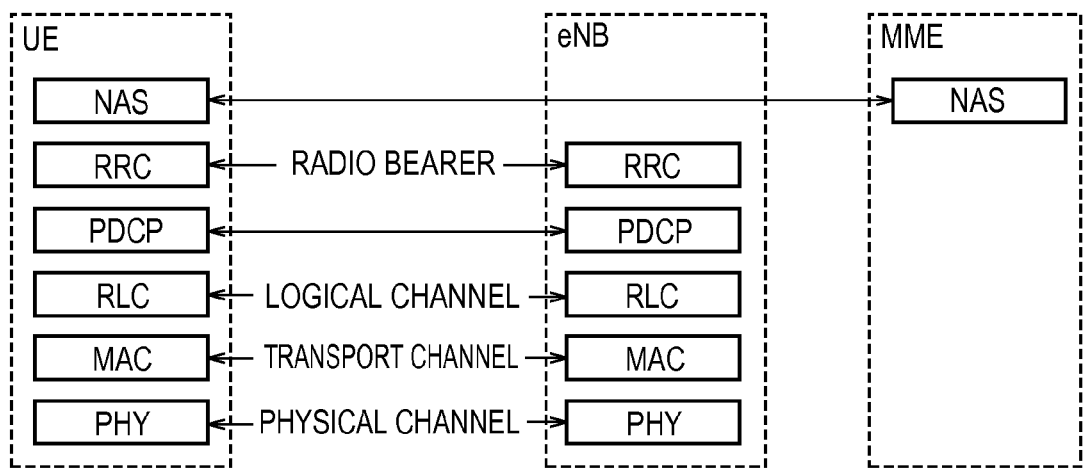
FIG. 5 is a protocol stack diagram of a radio interface in the LIE system according to first to eighth embodiments.

FIG. 5 is a protocol stack diagram of a radio interface in the LTE system.

As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (RRC Connected State), and otherwise, the UE 100 is in an idle state (RRC Idle State).

A NAS (Non-Access Stratum) layer positioned above the RRC layer performs session management or mobility management, for example.

Figure 6:
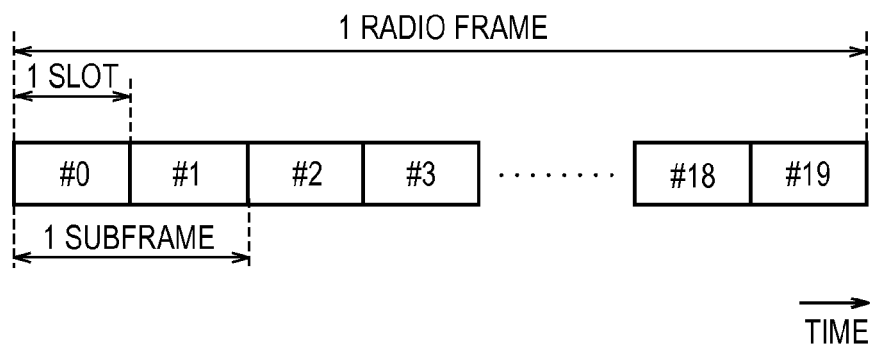
FIG. 6 is a configuration diagram of a radio frame used in the LTE system according to first to eighth embodiments.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As a duplex scheme, either an FDD (Frequency Division Duplex) scheme or a TDD (Time Division Duplex) scheme is used. However, in the first embodiment, the FDD scheme is mainly assumed.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, reference signals such as cell-specific reference signals (CRSs) are distributed and arranged.

The PDCCH carries the control information. The control information, for example, includes the uplink SI (Scheduling Information), the downlink SI, and a TPC bit. The uplink SI is information indicating the assignment of uplink radio resources, and the downlink SI is information indicating the assignment of downlink radio resources. The TPC bit is information for instructing an increase or decrease in the uplink transmission power.

The PDSCH carries the control information and/or user data. For example, a downlink data region may be assigned only to the user data, or may be assigned such that the user data and the control information are multiplexed.

In the uplink, both ends, in the frequency direction, of each subframe are control regions mainly used as a physical uplink control channel (PUCCH). Furthermore, the center portion, in the frequency direction, of each subframe is a region mainly used as a physical uplink shared channel (PUSCH).

The PUCCH carries the control information. The control information includes, for example, the CQI, the PMI, the RI, the SR (Scheduling Request), and the ACK/NACK.

The CQI indicates the modulation and coding scheme (that is, the recommended MCS) that is preferably used in the downlink, on the basis of the reception status of the downlink.

The PMI is information indicating a precoder matrix that is preferably used in the downlink. In other words, the PMI is information indicating a precoder matrix in which a beam is directed toward the UE serving as a transmission source of the PMI. For example, in order for the reception status of the UE 100 to improve, the UE 100 selects the PMI to be fed back to the eNB 200.

The RI indicates the rank that is preferably used in the downlink. For example, in order for the rank corresponding to the reception status of the UE 100 to be applicable, the UE 100 selects the PMI to be fed back to the eNB 200.

The SR is information for requesting the assignment of uplink radio resources.

The ACK/NACK is information indicating whether or not the decoding of a signal transmitted via a downlink physical channel (for example, the PDSCH) is successful.

The PUSCH is a physical channel that carries the control information and/or user data. For example, an uplink data region may be assigned only to the user data, or may be assigned such that the user data and the control information are multiplexed.

(1.3) Operation According to First Embodiment

Hereinafter, an operation according to the first embodiment will be described.

(1.3.1) Operation Overview

Figure 7:
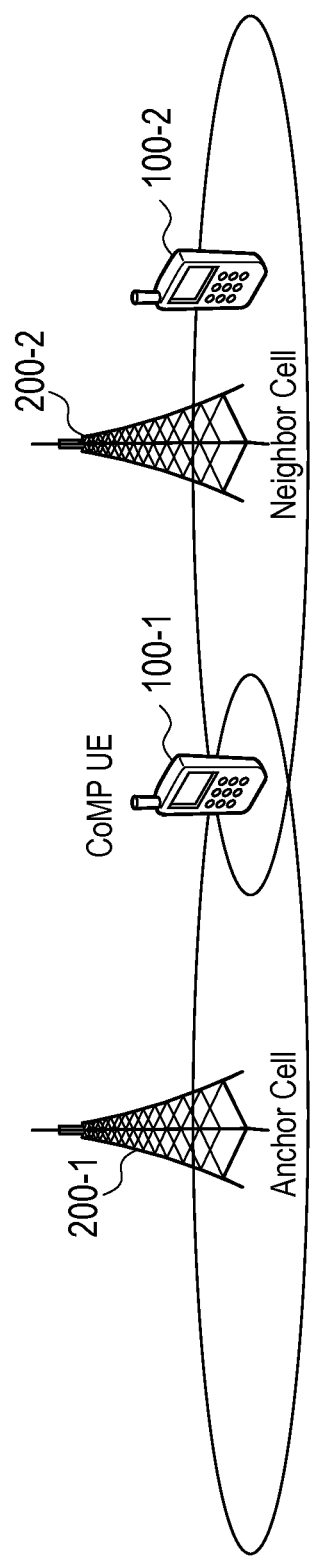
FIG. 7 is a diagram illustrating an operation environment according to first to fourth embodiments.
Figure 8:
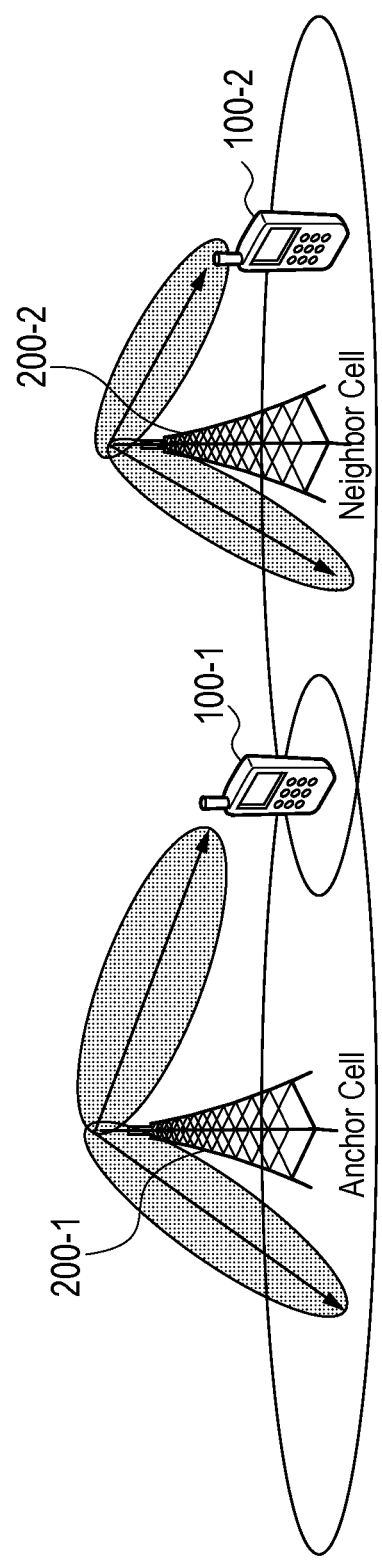
FIG. 8 is a diagram illustrating an operation environment according to first to fourth embodiments.

FIG. 7 and FIG. 8 are diagrams illustrating operation environments according to the first embodiment. In FIG. 7 and FIG. 8, eNB 200-1 and eNB 200-2 constitute cells that are adjacent to each other.

As illustrated in FIG. 7, UE 100-1 establishes a connection with the cell of the eNB 200-1. That is, the UE 100-1 performs communication by assuming the cell of the eNB 200-1 as the serving cell.

In the first embodiment, the UE 100-1 is positioned in the boundary region of the respective cell of the eNB 200-1 and the eNB 200-2. In such a case, normally, the UE 100-1 receives the influence of the interference from the cell of the eNB 200-2.

UE 100-2 establishes a connection with the cell of the eNB 200-2. That is, the UE 100-2 performs communication by assuming the cell of the eNB 200-2 as the serving cell. In FIG. 7, only one UE 100-2 is illustrated, however, a plurality of UEs 100-2 may establish a connection with the cell of the eNB 200-2.

In order to improve the throughput of the UE 100-1 that is positioned at the cell edge of the eNB 200-1, the eNB 200-1 and the eNB 200-2 perform CB-CoMP. In the CB-CoMP, the serving cell of the UE 100-1 is called an "anchor cell".

Furthermore, in the CB-CoMP, the eNB 200-2, which acts as the main interference source, adjusts the transmission directionality so as to reduce the influence of the interference exerted on the UE 100-1. Specifically, the eNB 200-2 performs transmission to the UE 100-2 by directing a beam to the UE 100-2 while directing a null to the UE 100-1.

The UE 100-1 that is the target of the CB-CoMP performs a special feedback to the eNB 200-2 in addition to the normal feedback (the PMI, the RI, and the CQI) to the eNB 200-1. In the first embodiment, the UE 100-1 feeds back the special PMI and the RI to the eNB 200-2.

The normal PMI, which is the information indicating the precoder matrix (the precoder matrix in which a beam is directed to the UE 100-1) preferable for the UE 100-1, is used to determine the precoder matrix applicable in the downlink multi-antenna transmission to the UE 100-1. The UE 100-1 performs the feedback of the normal PMI on the basis of the reference signal, for example, received from the eNB 200-1.

In contrast, the special PMI, which is the information indicating the precoder matrix (the precoder matrix in which a null is directed to the UE 100-1) preferable for the UE 100-1, is used to determine the precoder matrix applicable in the downlink multi-antenna transmission to the UE 100 (for example, UE 100-2) other than the UE 100-1. Such PMI is called BC (Best Companion)-PMI. The UE 100-1 performs the feedback of the BC-PMI on the basis of, for example, the reference signal received from the eNB 200-2.

For example, the feedback information to the eNB 200-2 includes a plurality of combinations of the BC-PMI and the RI in which the influence of the interference exerted on the UE 100-1 by the eNB 200-2 is less. In the first embodiment, the BC-PMI corresponds to the precoder matrix information, and the RI corresponds to the rank information. In the case of the settings in which the feedback of the BC-PMIs and RIs is performed for each subband, the feedback information of one subband includes a plurality of combinations of the BC-PMIs and RIs.

For example, the combinations may include n (n≥2) of BC-PMIs starting from the BC-PMI in which the influence of the interference is the smallest, or the combinations may include BC-PMIs in which the influence of the interference is less than the threshold value. The details of the feedback method of the BC-PMI and the RI will be described later.

The UE 100-1 may feed back the combinations of the BC-PMI and the RI to the eNB 200-2 via the serving cell (the eNB 200-1), or may directly feed back to the eNB 200-2.

For example, the eNB 200-2 assigns the same radio resource as that of the UE 100-1 to the UE 100 (the UE 100-2) within the cell of the eNB 200-2 that feeds back the PMI and the RI matching any one of the combinations of the BC-PMIs and RIs fed back from the UE 100-1. In this case, the eNB 200-2 must dynamically or quasi-statically share the scheduling information of the UE 100-1 with the eNB 200-1. Also, the eNB 200-2 performs transmission to the UE 100-2 according to the matching PMI and the RI.

As a result, as illustrated in FIG. 8, the eNB 200-2 can perform transmission to the UE 100-2 with directing a beam to the UE 100-2 while directing a null to the UE 100-1. Thus, the interference exerted on the UE 100-1 can be suppressed.

It must be noted that if the UE 100 within the cell of the eNB 200-2 that feeds back the PMI and the RI matching any one of the combinations of the BC-PMIs and RIs fed back from the UE 100-1 does not exist, the eNB 200-2 is believed to perform either of two operations, namely that of not assigning the same radio resource as that of the UE 100-1, and that of assigning a radio resource even when the PMI is not matching.

On the other hand, the eNB 200-1 performs transmission to the UE 100-1 according to the normal PMIs and RIs that are fed back from the UE 100-1. As a result, the eNB 200-1 is able to direct a beam to the UE 100-1.

(1.3.2) Operation Sequence

Figure 9:
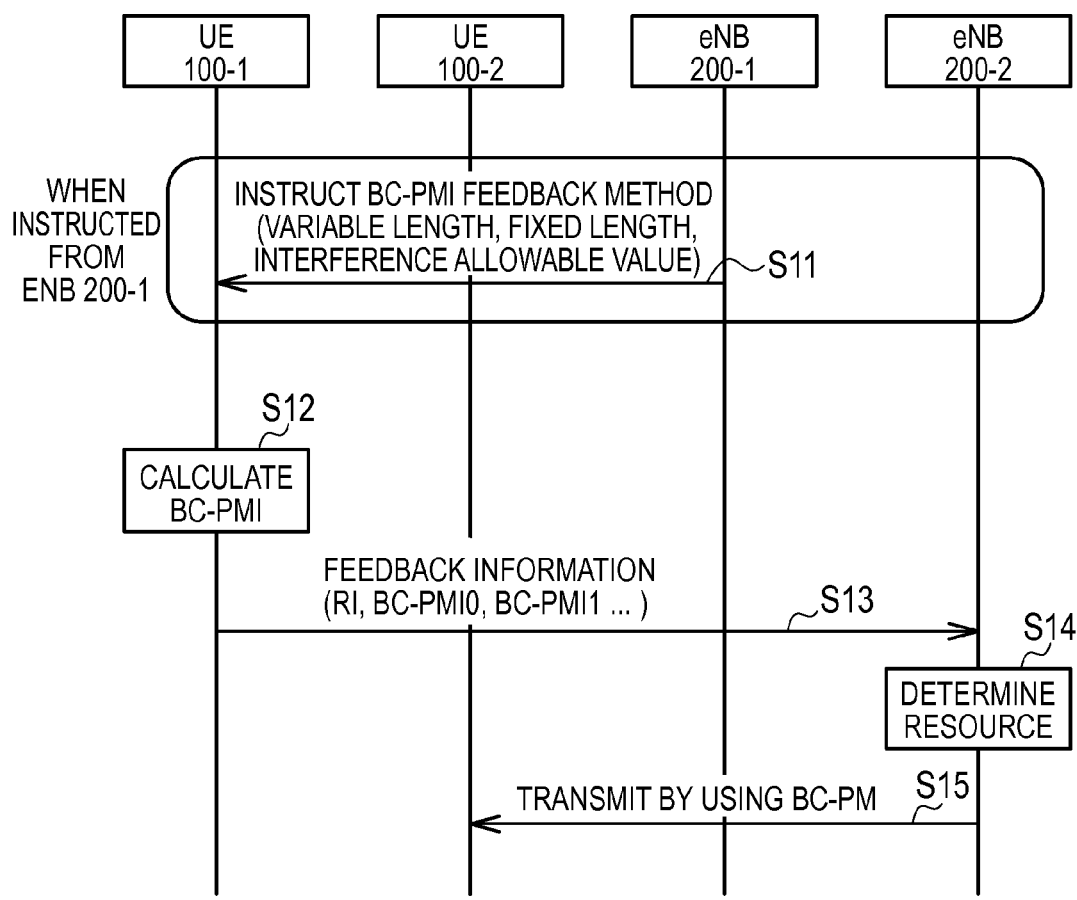
FIG. 9 is an operation sequence diagram according to the first embodiment.

FIG. 9 is an operation sequence diagram according to the first embodiment.

As illustrated in FIG. 9, in step S11, the eNB 200-1 instructs the UE 100-1 about the feedback method of the BC-PMI (and the RI) to the eNB 200-2. The instruction includes instructing, for example, any one of operation patterns 1 through 8 described later. Alternatively, the threshold value, for example, used in any one of the operation patterns 1 through 8 may be instructed.

In step S12, on the basis of the reference signal (such as the CRS or the CSI-RS) received from each of the eNB 200-1 and the eNB 200-2, the UE 100-1 calculates the evaluated value of each of the plurality of prescribed PMIs (BC-PMIs) for each of the plurality of prescribed RIs. In the first embodiment, the evaluated value of the BC-PMI is the interference level (interference power) that is assumed when the BC-PMI is applied. In the case of feedback for each subband, the UE 100-1 calculates the evaluated value of each BC-PMI for each subband and each RI. In addition, on the basis of the evaluated value, the UE 100-1 selects a plurality of combinations of the BC-PMIs and RIs included in the feedback information. The details of step S12 will be described later.

In step S13, the UE 100-1 feeds back, to the eNB 200-2, the feedback information including the plurality of combinations of the BC-PMIs and RIs selected in step S12. The UE 100-1 may feed back the plurality of combinations of the BC-PMIs and RIs to the eNB 200-2 via the serving cell (the eNB 200-1), or may directly feed back to the eNB 200-2.

In step S14, the eNB 200-2 assigns the same radio resource as that of the UE 100-1 to the UE 100 (for example, the UE 100-2) within the cell of the eNB 200-2 that feeds back the PMI and the RI matching any one of the combinations of the BC-PMIs and RIs fed back from the UE 100-1. In this case, the eNB 200-2 must dynamically or quasi-statically share the scheduling information of the UE 100-1 with the eNB 200-1.

In step S15, the eNB 200-2 performs transmission to the UE 100-2 by applying the matching PMI and the RI. It must be noted that the PMI (and the BC-PMI) is an index of the precoder matrix (PM), and the RI is an index of the rank (number of signal layers). Thus, the eNB 200-2 performs transmission by using the precoder matrix indicated by the PMI and the rank indicated by the RI.

(1.3.3) Operation of UE

Next, a feedback method by the UE 100-1, specifically, an operation of selecting a combination of the BC-PMI and the RI to be fed back will be described.

(1.3.3.1) Operation Pattern 1

In the operation pattern 1, for each of the plurality of RIs, the UE 100-1 selects a predetermined number (fixed length) of BC-PMIs in order of increasing interference level. The UE 100-1 includes the combinations of each of the plurality of RIs and the selected predetermined number (fixed length) of BC-PMIs in the feedback information.

Figure 10:
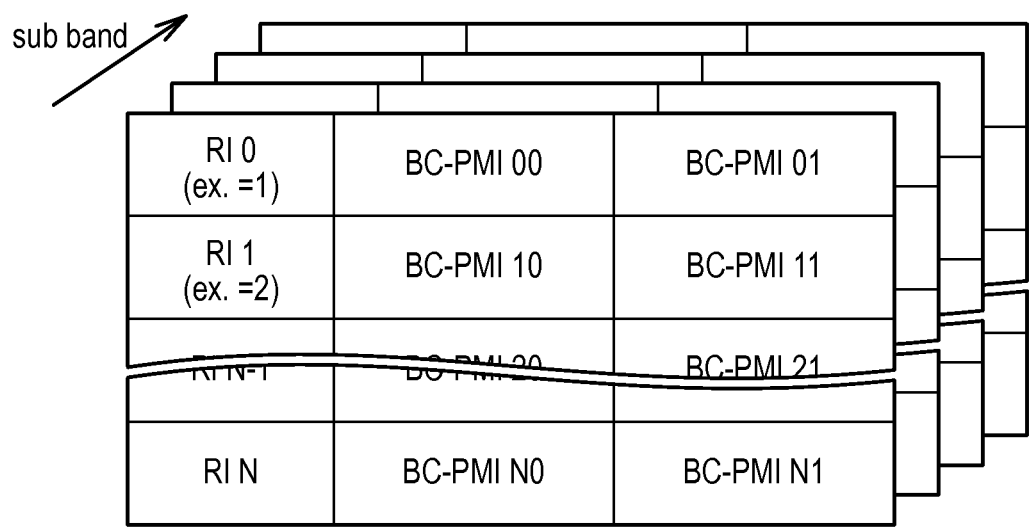
FIG. 10 is a diagram illustrating a configuration example of feedback information used in an operation pattern 1 according to the first embodiment.

FIG. 10 is a diagram illustrating a configuration example of feedback information used in the operation pattern 1. In FIG. 10, a case of feedback for each subband is assumed.

As illustrated in FIG. 10, the feedback information used in the operation pattern 1 includes the combinations of each of the plurality of RIs (RI 0 through RI N), and the selected predetermined number (fixed length) of BC-PMIs. The selected predetermined number (fixed length) of BC-PMIs is two BC-PMIs in order of increasing interference level, that is, the BC-PMI in which the interference level is the lowest and the BC-PMI in which the interference level is the second lowest.

Figure 11:
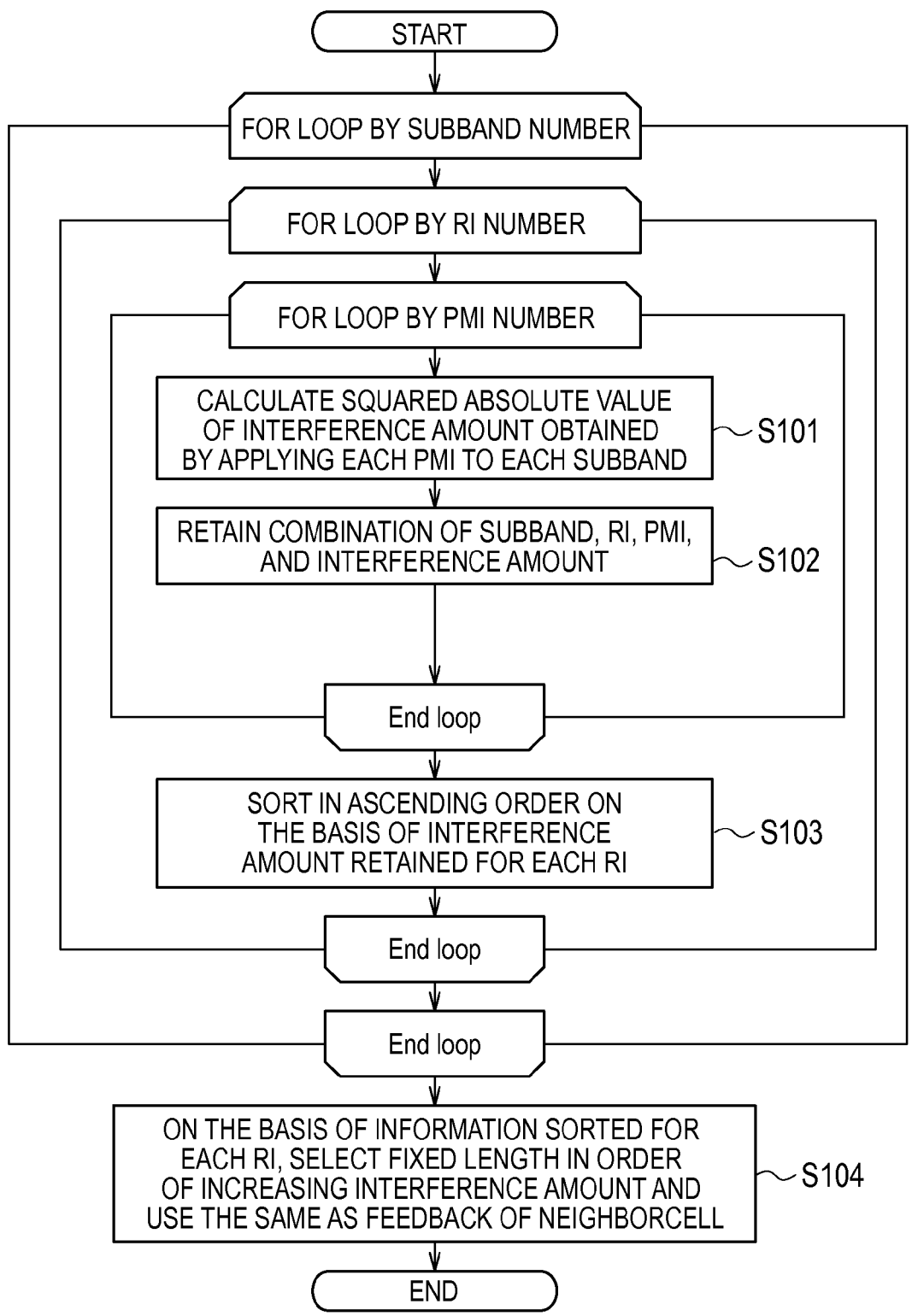
FIG. 11 is an operation flow diagram of the UE in the operation pattern 1 according to the first embodiment.

FIG. 11 is an operation flow diagram of the UE 100-1 in the operation pattern 1. In FIG. 11, a case of feedback for each subband is assumed.

As illustrated in FIG. 11, the processing of step S101 and S102 is executed for each subband, each RI, and each PMI (BC-PMI).

In step S101, the UE 100-1 calculates the squared absolute value of the amount of interference (interference level) in the target PMIs (BC-PMIs) under the condition of application of the target subbands and the target RIs.

In step S102, the UE 100-1 retains the combinations of the target subbands, the target RIs, the target PMIs (BC-PMI), and the interference level.

The processing of step S103 is executed for each subband and each RI.

In step S103, the UE 100-1 sorts each combination retained in step S102 in the ascending order on the basis of the interference level.

In step S104, on the basis of the combinations sorted in step S103, the UE 100-1 selects the combinations of the predetermined number (fixed length) of PMIs (BC-PMIs) starting from the PMI in which the interference level is the lowest, and RIs for each subband and each RI, and includes the combinations in the feedback information.

(1.3.3.2) Operation Pattern 2 In an operation pattern 2-1, for each of the plurality of RIs, the UE 100-1 selects BC-PMIs in which the interference level is equal to or less than the threshold value. The UE 100-1 includes the combinations of each of the plurality of RIs and the selected BC-PMIs in the feedback information.

In an operation pattern 2-2, for each of the plurality of RIs, the UE 100-1 selects BC-PMIs in which the difference as compared to the lowest interference level is less than the threshold value. The UE 100-1 includes the combinations of each of the RIs and the selected BC-PMIs in the feedback information.

It must be noted that the threshold value may either be set in accordance with the instruction from the eNB 200-1, or may be retained beforehand in the UE 100-1.

FIG. 12 is a diagram illustrating a configuration example of feedback information used in the operation pattern 2. In FIG. 12, a case of feedback for the entire band is assumed.

As illustrated in FIG. 12, the feedback information used in the operation pattern 2 includes the combinations of each of the plurality of RIs (RI 0 through RI N), and the BC-PMIs in which the interference level (the absolute value or the difference value) is equal to or less than the threshold value. In the operation pattern 2, the number of BC-PMIs corresponding to one RI is variable.

Figure 13:
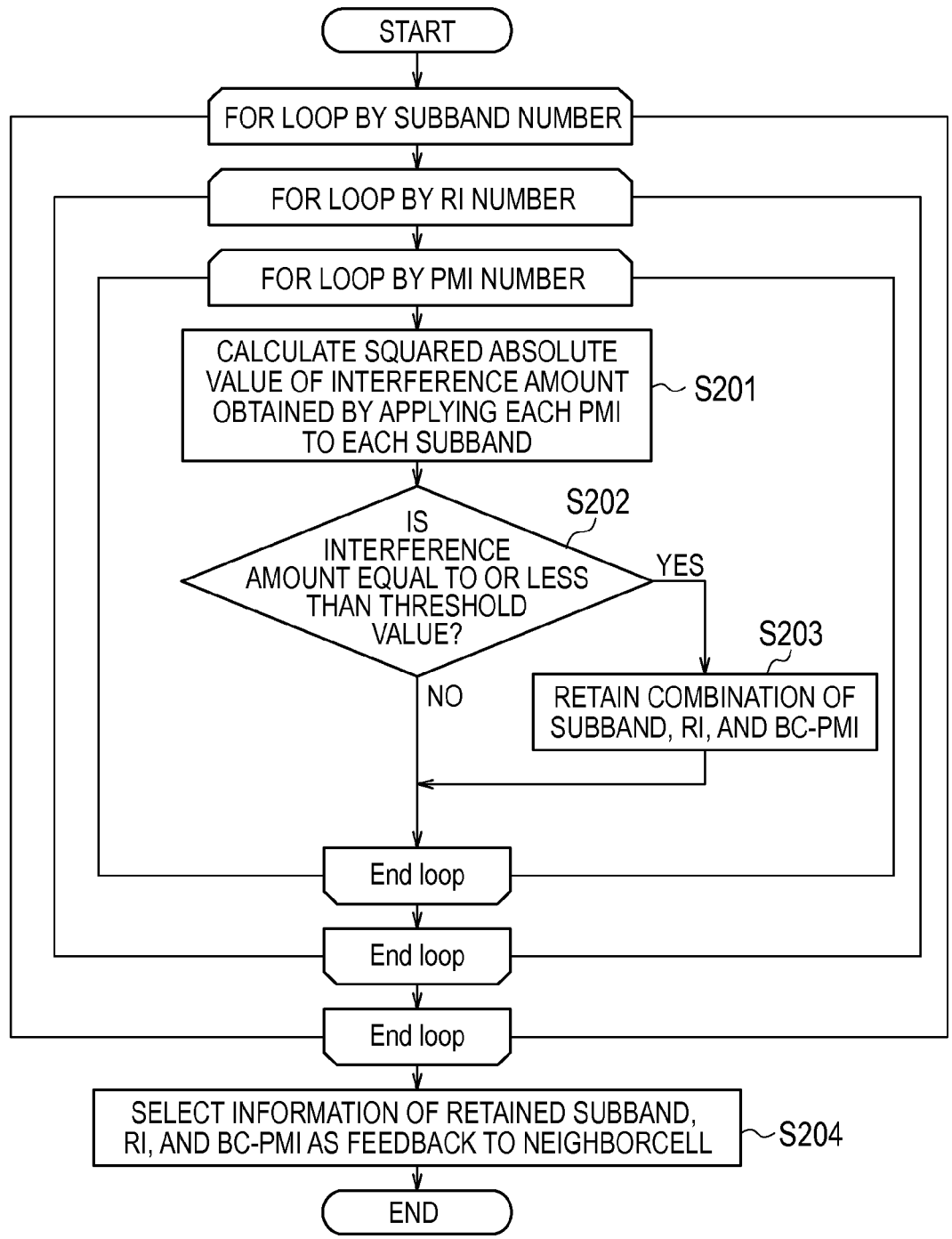
FIG. 13 is an operation flow diagram of the UE in an operation pattern2-1according to the first embodiment.

FIG. 13 is an operation flow diagram of the UE 100-1 in the operation pattern 2-1. In FIG. 13, a case of feedback for each subband is assumed.

As illustrated in FIG. 13, the processing of step S201 through S203 is executed for each subband, each RI, and each PMI (BC-PMI).

In step S201, the UE 100-1 calculates the squared absolute value of the amount of interference (interference level) in the target PMIs (BC-PMIs) under the condition of application of the target subbands and the target RIs.

In step S202, the UE 100-1 determines whether or not the interference level calculated in step S201 is equal to or less than the threshold value. If "YES" is determined in step S202, the processing proceeds to step S203.

In step S203, the UE 100-1 retains the combinations of the target subbands, the target RIs, and the target PMIs (BC-PMIs).

In step S204, the UE 100-1 selects the combinations retained in step S203, and includes the combinations in the feedback information.

Figure 14:
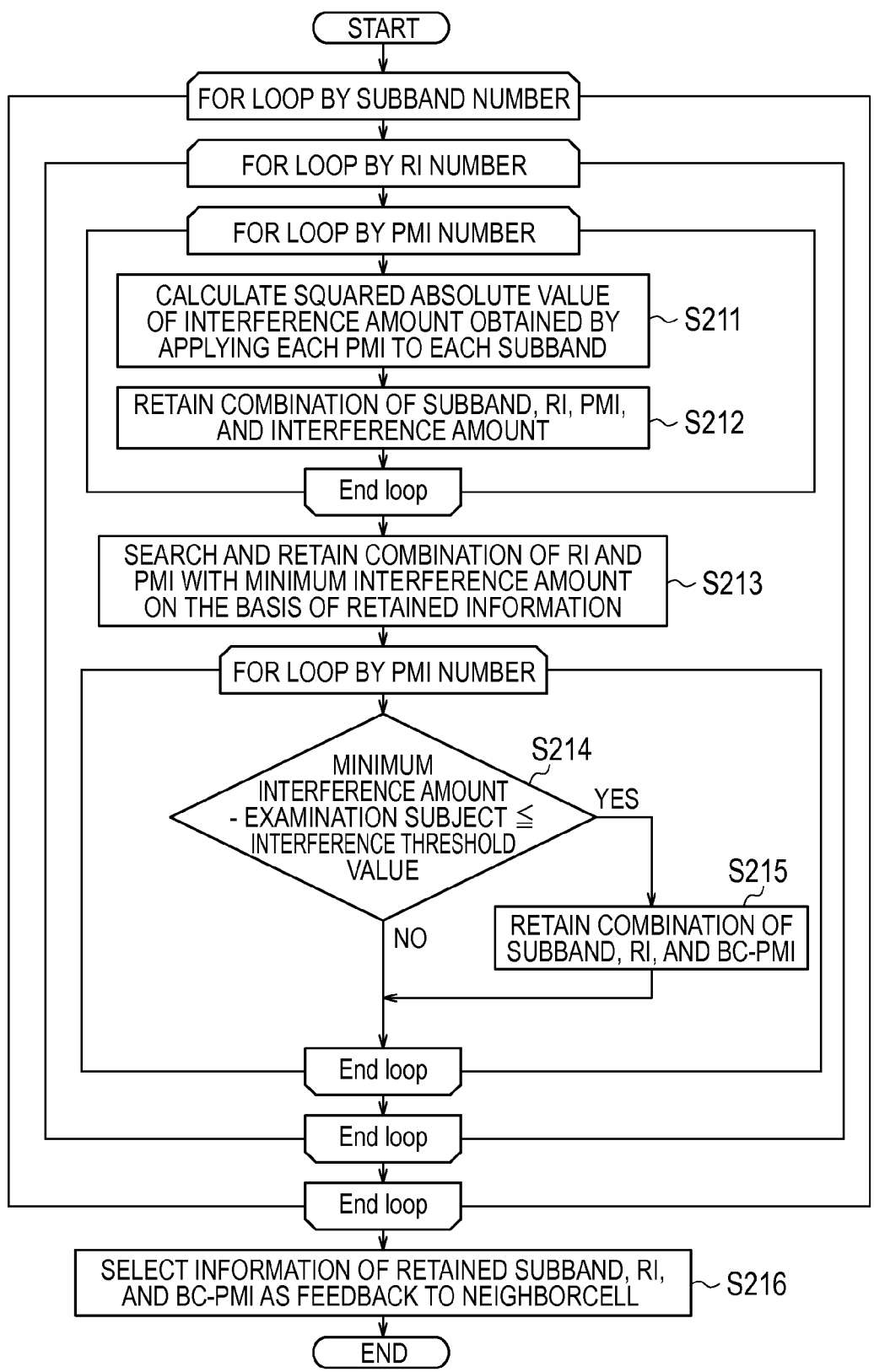
FIG. 14 is an operation flow diagram of the UE in an operation pattern 2-2according to the first embodiment.

FIG. 14 is an operation flow diagram of the UE 100-1 in the operation pattern 2-2. In FIG. 14, a case of feedback for each subband is assumed.

As illustrated in FIG. 14, the processing of step S211 and S212 is executed for each subband, each RI, and each PMI (BC-PMI).

In step S211, the UE 100-1 calculates the squared absolute value of the amount of interference (interference level) in the target PMIs (BC-PMIs) under the condition of application of the target subbands and the target RIs.

In step S212, the UE 100-1 retains the combinations of the target subbands, the target RIs, the target PMIs (BC-PMIs), and the interference level.

The processing of step S213 is executed for each subband and each RI.

In step S213, from among the combinations retained in step S212, the UE 100-1 searches and retains the combination in which the interference level is the minimum.

The processing of step S214 is executed for each subband, each RI, and each PMI (BC-PMI).

In step S214, the UE 100-1 determines whether or not the difference between the PMI (BC-PMI) in which the interference level is the minimum and the target PMI is equal to or less than the threshold value, on the basis of the combinations retained in step S212. If "YES" is determined in step S214, the processing proceeds to step S215.

In step S215, the UE 100-1 retains the combinations of the target subbands, the target RIs, and the target PMIs (BC-PMIs).

In step S216, the UE 100-1 selects each combination retained in step S215, and includes the combination in the feedback information.

(1.3.3.3) Operation Pattern 3

In the operation pattern 3, the UE 100-1 selects the combinations of the BC-PMIs in which the interference level is equal to or less than the threshold value and the RIs corresponding to the BC-PMIs. The UE 100-1 includes the selected combinations in the feedback information.

It must be noted that the threshold value may either be set in accordance with the instruction from the eNB 200-1, or may be retained beforehand in the UE 100-1.

Figure 15:
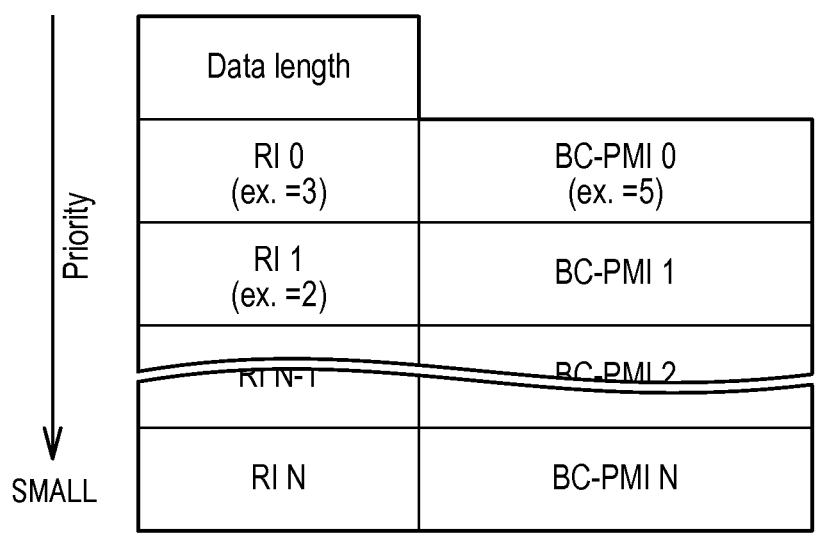
FIG. 15 is a diagram illustrating a configuration example of feedback information used in an operation pattern 3 according to the first embodiment.

FIG. 15 is a diagram illustrating a configuration example of feedback information used in the operation pattern 3. In FIG. 15, a case of feedback for the entire band is assumed.

As illustrated in FIG. 15, the feedback information used in the operation pattern 3 includes the combinations of the BC-PMIs in which the interference level is equal to or less than the threshold value and the RIs corresponding to the BC-PMIs. Furthermore, a priority order (Priority) is set, in order of increasing interference level, to each combination included in the feedback information. It must be noted that the feedback information has a variable length in the example illustrated in FIG. 15, because of which the data length field is provided.

Figure 16:
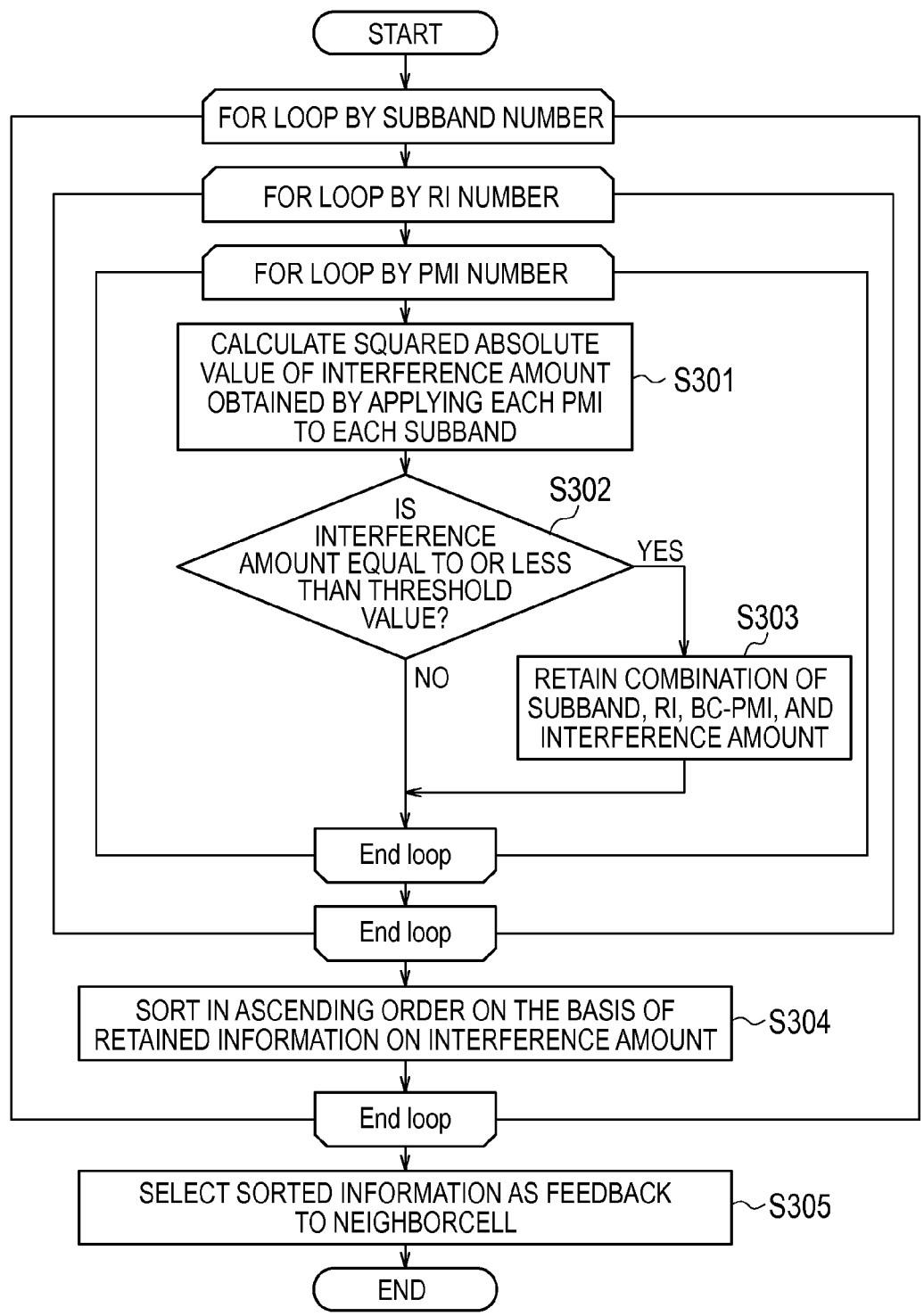
FIG. 16 is an operation flow diagram of the UE in the operation pattern 3 according to the first embodiment.

FIG. 16 is an operation flow diagram of the UE 100-1 in the operation pattern 3. In FIG. 16, a case of feedback for each subband is assumed.

As illustrated in FIG. 16, the processing of step S301 through S303 is executed for each subband, each RI, and each PMI (BC-PMI).

In step S301, the UE 100-1 calculates the squared absolute value of the amount of interference (interference level) in the target PMIs (BC-PMIs) under the condition of application of the target subbands and the target RIs.

In step S302, the UE 100-1 determines whether or not the interference level calculated in step S201 is equal to or less than the threshold value. If "YES" is determined in step S302, the processing proceeds to step S303.

In step S303, the UE 100-1 retains the combinations of the target subbands, the target RIs, and the target PMIs (BC-PMIs).

The processing of step S304 is executed for each subband.

In step S304, the UE 100-1 sorts each combination retained in step S303 in the ascending order on the basis of the interference level.

In step S305, the UE 100-1 selects the information (each combination) sorted in step S304 and includes the information in the feedback information.

(1.3.3.4) Operation Pattern 4

In the operation pattern 4, the UE 100-1 adds priority order information indicating the priority order (Priority) determined in accordance with the interference level, to each of the combinations of the BC-PMI and RI. The UE 100-1 includes the plurality of combinations to which the priority order information is added, in the feedback information.

FIG. 17 is a diagram illustrating a configuration example of feedback information used in the operation pattern 4. In FIG. 17, a case of feedback for the entire band is assumed.

As illustrated in FIG. 17, in the feedback information used in the operation pattern 4, the priority order information indicating the priority order (Priority) determined in accordance with the interference level is added to each of the combinations of the BC-PMI and RI.

Figure 18:
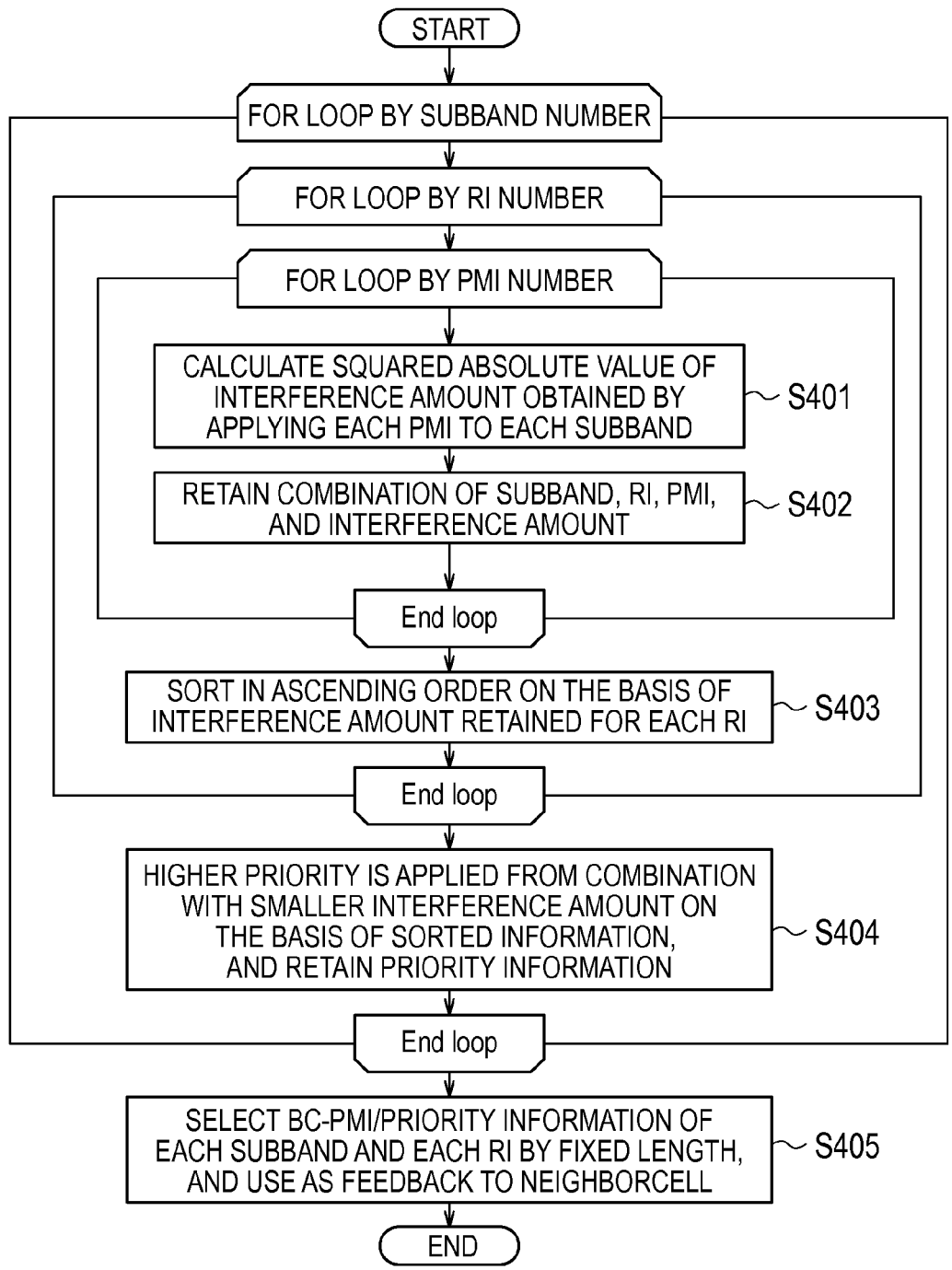
FIG. 18 is an operation flow diagram of the UE in the operation pattern 4 according to the first embodiment.

FIG. 18 is an operation flow diagram of the UE 100-1 in the operation pattern 4. In FIG. 18, a case of feedback for each subband is assumed.

As illustrated in FIG. 18, the processing of step S401 and S402 is executed for each subband, each RI, and each PMI (BC-PMI).

In step S401, the UE 100-1 calculates the squared absolute value of the amount of interference (interference level) in the target PMIs (BC-PMIs) under the condition of application of the target subbands and the target RIs.

In step S402, the UE 100-1 retains the combinations of the target subbands, the target RIs, the target PMIs (BC-PMIs), and the interference level.

The processing of step S403 is executed for each subband and each RI.

In step S403, the UE 100-1 applies a higher priority order, in order of increasing interference level, to each combination retained in step S402, and retains the priority order information.

The processing of step S404 is executed for each subband.

In step S404, UE 100-1 gives priorities to each combination stored in step S402 in order of increasing interference level, and stores priority order information.

In step S405, the UE 100-1 selects a predetermined number (fixed length) from the information items (combinations of BC-PMI, RI, and priority order information) retained in step S403, and includes the resultant information in the feedback information.

(1.3.3.5) Operation Pattern 5

In the operation pattern 5, the evaluated value of BC-PMI is the CQI (channel quality information) indicating the modulation and coding scheme (MCS) recommended when the precoder matrix corresponding to the BC-PMI is applied. The UE 100-1 selects the combinations of the BC-PMIs in which the CQI that is the evaluated value is equal to or more than the normal CQI to be fed back to the eNB 200-1, and the RIs corresponding to the BC-PMIs. The UE 100-1 includes the selected combinations in the feedback information.

Figure 19:
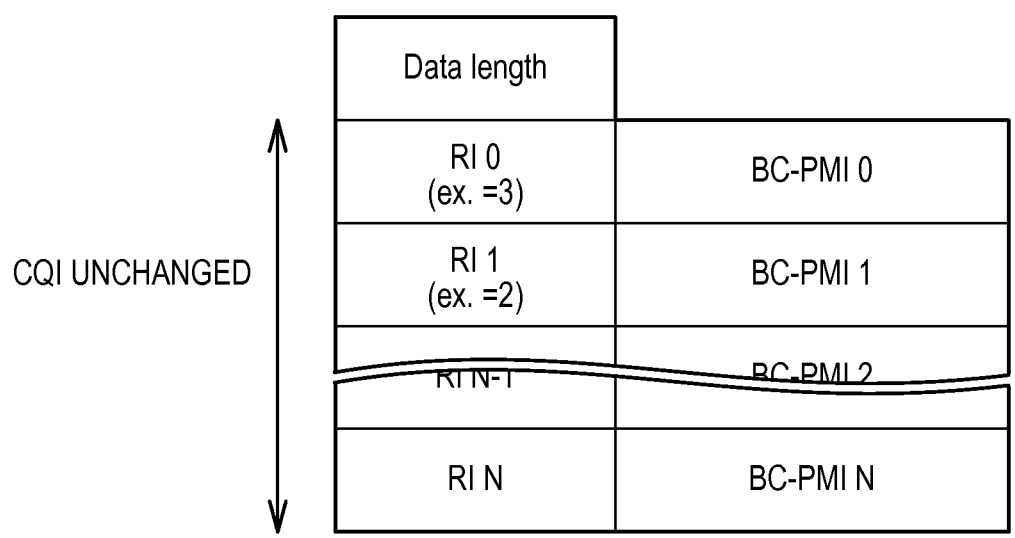
FIG. 19 is a diagram illustrating a configuration example of feedback information used in an operation pattern 5 according to the first embodiment.

FIG. 19 is a diagram illustrating a configuration example of feedback information used in the operation pattern 5. In FIG. 19, a case of feedback for the entire band is assumed.

As illustrated in FIG. 19, the feedback information used in the operation pattern 5includes the combinations of the BC-PMIs in which the CQI that is the evaluated value is equal to or more than the normal CQI to be fed back to the eNB 200-1, and the RIs corresponding to the BC-PMIs. It must be noted that the feedback information has a variable length in the example illustrated in FIG. 19, because of which the data length field is provided.

Figure 20:
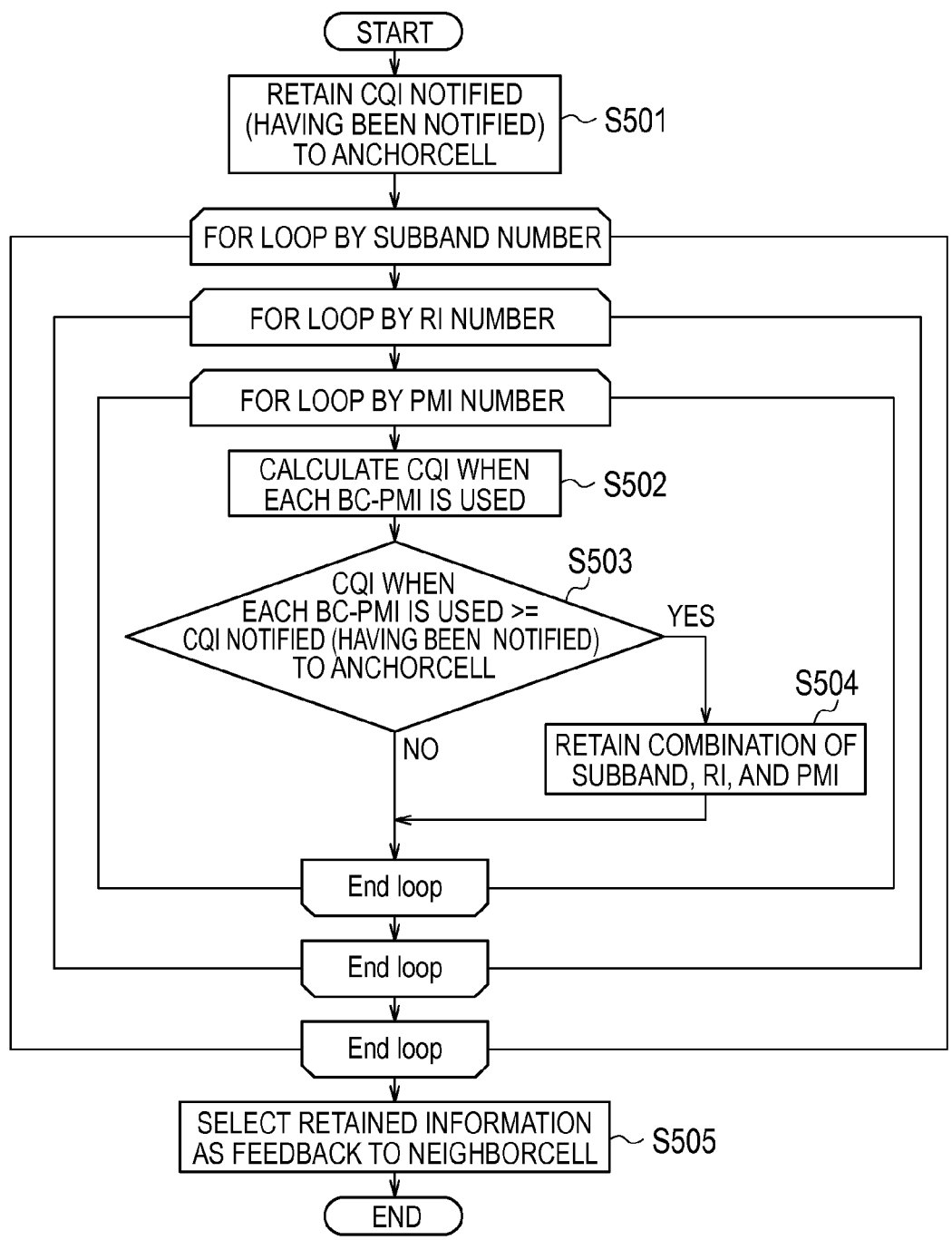
FIG. 20 is an operation flow diagram of the UE in the operation pattern 5 according to the first embodiment.

FIG. 20 is an operation flow diagram of the UE 100-1 in the operation pattern 5. In FIG. 20, a case of feedback for each subband is assumed. Furthermore, a case in which the feedback timing of the BC-PMI and the feedback timing of the CQI are different is assumed.

As illustrated in FIG. 20, in step S501, the UE 100-1 retains the normal CQI that is to be fed back or is already fed back to the eNB 200-1 (anchor cell).

The processing of step S502 through S504 is executed for each subband, each RI, and each PMI (BC-PMI).

In step S502, the UE 100-1 calculates the CQI for the case when a target PMI (BC-PMI) is applied under the condition of application of a target subband and a target RI.

In step S503, the UE 100-1 determines whether or not the CQI calculated in step S502 is equal to or more than the normal CQI retained in step S501. If the result of step S503 is "YES", the processing proceeds to step S504.

In step S504, the UE 100-1 retains the combinations of the target subbands, the target RIs, and the target PMIs (BC-PMIs).

In step S505, the UE 100-1 selects each combination retained in step S504, and includes the combination in the feedback information.

Figure 21:
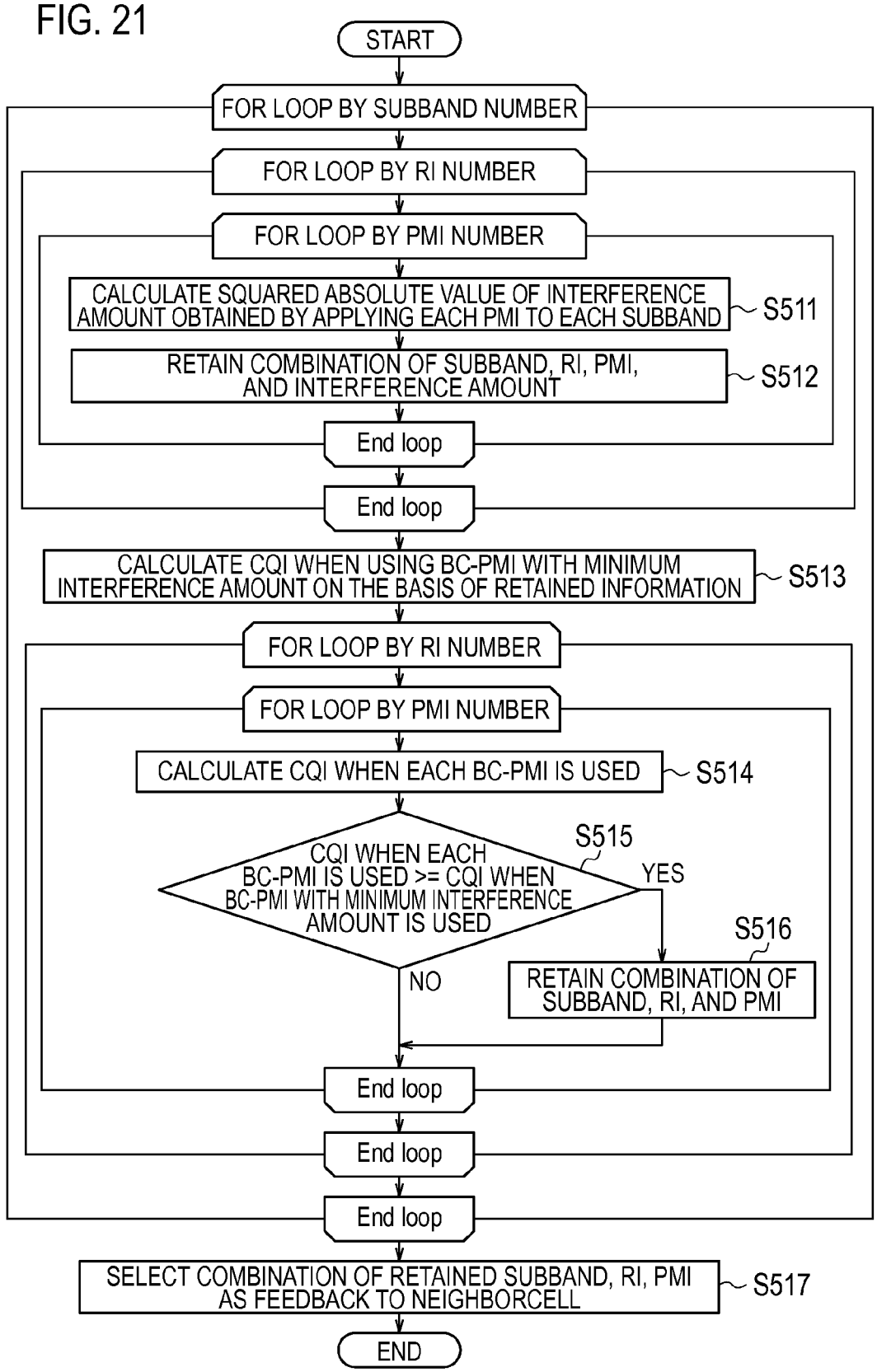
FIG. 21 is another operation flow diagram of the UE in the operation pattern 5according to the first embodiment.

The flow shown in FIG. 20 was set for a case in which the feedback timing of the BC-PMI and the feedback timing of the CQI are different; however, if the two timings are the same, the flow shown in FIG. 21 can be adopted.

FIG. 21 is an operation flow diagram of the UE 100-1 in the operation pattern 5. In FIG. 21, a case of feedback for each subband is assumed. Furthermore, a case in which the feedback timing of the BC-PMI and the feedback timing of the CQI are the same is assumed.

As illustrated in FIG. 21, the processing of step S511 and S512 is executed for each subband, each RI, and each PMI (BC-PMI).

In step S511, the UE 100-1 calculates the squared absolute value of the amount of interference (interference level) in the target PMIs (BC-PMIs) under the condition of application of the target subbands and the target RIs.

In step S512, the UE 100-1 retains the combinations of the target subbands, the target RIs, the target PMIs (BC-PMIs), and the interference level.

The processing of step S513 is executed for each subband.

In step S513, the UE 100-1 calculates the CQI for the case when the PMI (BC-PMI) in which the interference level is the minimum is used from among the combinations retained in step S512.

The processing of step S514 through S516 is executed for each subband, each RI, and each PMI (BC-PMI).

In step S514, the UE 100-1 calculates the CQI for the case when a target PMI (BC-PMI) is applied under the condition of application of a target subband and a target RI.

In step S515, the UE 100-1 determines whether or not the CQI calculated in step S502 is equal to or more than the CQI calculated in step S503. If the result of step S515 is "YES", the processing proceeds to step S516.

In step S516, the UE 100-1 retains the combinations of the target subbands, the target RIs, and the target PMIs (BC-PMIs).

In step S517, the UE 100-1 selects each combination retained in step S516, and includes the combination in the feedback information.

(1.3.3.6) Operation Pattern 6

In the operation pattern 6, the UE 100-1 additionally sets the unselected BC-PMIs in the operation pattern 2 to a null value (invalid value), and includes the resultant BC-PMI in the feedback information. That is, for each of the plurality of RIs, the UE 100-1 sets the BC-PMIs in which the interference level is equal to or more than the threshold value to a null value.

It must be noted that the threshold value may either be set in accordance with the instruction from the eNB 200-1, or may be retained beforehand in the UE 100-1.

FIG. 22 is a diagram illustrating a configuration example of feedback information used in the operation pattern 6. In FIG. 22, a case of feedback for the entire band is assumed.

As illustrated in FIG. 22, the feedback information used in the operation pattern 6 includes the combinations of each of the plurality of RIs (RI 0 through RI N), and a predetermined number (fixed length) of BC-PMIs. Thus, in the operation pattern 6, the number of BC-PMIs corresponding to one RI is fixed. However, the BC-PMIs in which the interference level is equal to or more than the threshold value are set to a null value.

Figure 23:
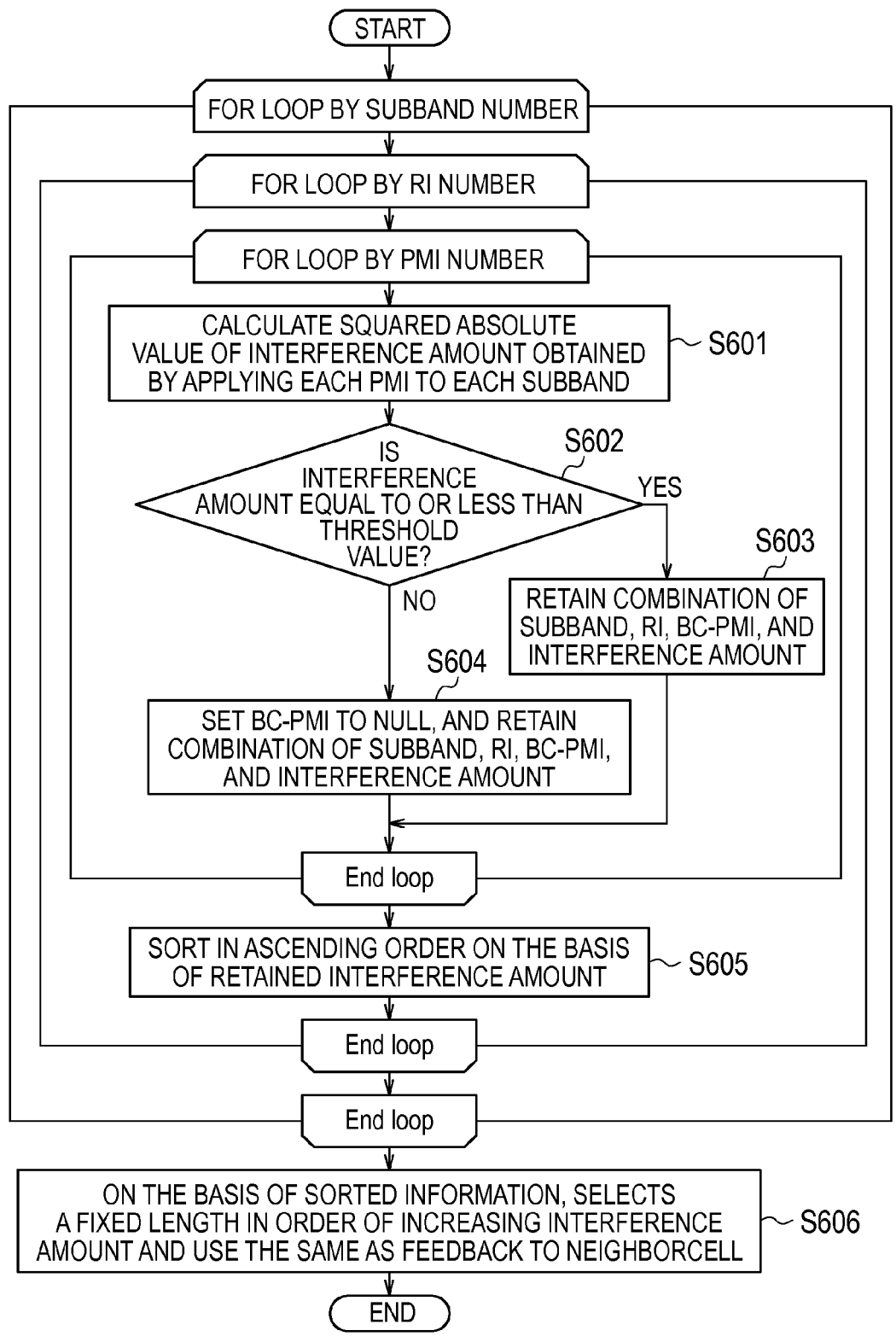
FIG. 23 is an operation flow diagram of the UE in the operation pattern 6 according to the first embodiment.

FIG. 23 is an operation flow diagram of the UE 100-1 in the operation pattern 6. In FIG. 23, a case of feedback for each subband is assumed.

As illustrated in FIG. 23, the processing of step S601 through S604 is executed for each subband, each RI, and each PMI (BC-PMI).

In step S601, the UE 100-1 calculates the squared absolute value of the amount of interference (interference level) in the target PMIs (BC-PMIs) under the condition of application of the target subbands and the target RIs.

In step S602, the UE 100-1 determines whether or not the interference level calculated in step S601 is equal to or less than the threshold value.

If "YES" is determined in step S602, the processing proceeds to step S603. In step S603, the UE 100-1 retains the combinations of the target subbands, the target RIs, the target PMIs (BC-PMI), and the interference level.

On the other hand, if "NO" is determined in step S602, the processing proceeds to step S604. In step S604, the UE 100-1 sets the target PMIs (BC-PMIs) to a null value, and retains the combinations of the target subbands, the target RIs, the target PMIs (BC-PMI), and the interference level.

The processing of step S605 is executed for each subband and each RI.

In step S605, the UE 100-1 sorts the combinations retained in step S603 and S604 in an ascending order on the basis of the interference level.

In step S606, the UE 100-1 selects a predetermined number of combinations in order of increasing interference level, on the basis of the combinations sorted in step S605, and includes the combinations in the feedback information.

(1.3.3.7) Operation Pattern 7

In the operation pattern 7, the UE 100-1 selects a predetermined number (fixed length), in order of increasing interference level, of combinations of BC-PMIs and RIs. The UE 100-1 includes the selected combinations in the feedback information. That is, in the operation pattern 7, instead of selecting the combinations by using the threshold value as in the operation pattern 3, a predetermined number of combinations is selected.

FIG. 24 is a diagram illustrating a configuration example of feedback information used in the operation pattern 7. In FIG. 24, a case of feedback for the entire band is assumed.

As illustrated in FIG. 24, the feedback information used in the operation pattern 7 includes a predetermined number (fixed length), in order of increasing interference level, of combinations of BC-PMIs and RIs. Furthermore, a priority order (Priority) is set, in order of increasing interference level, to each combination included in the feedback information.

Figure 25:
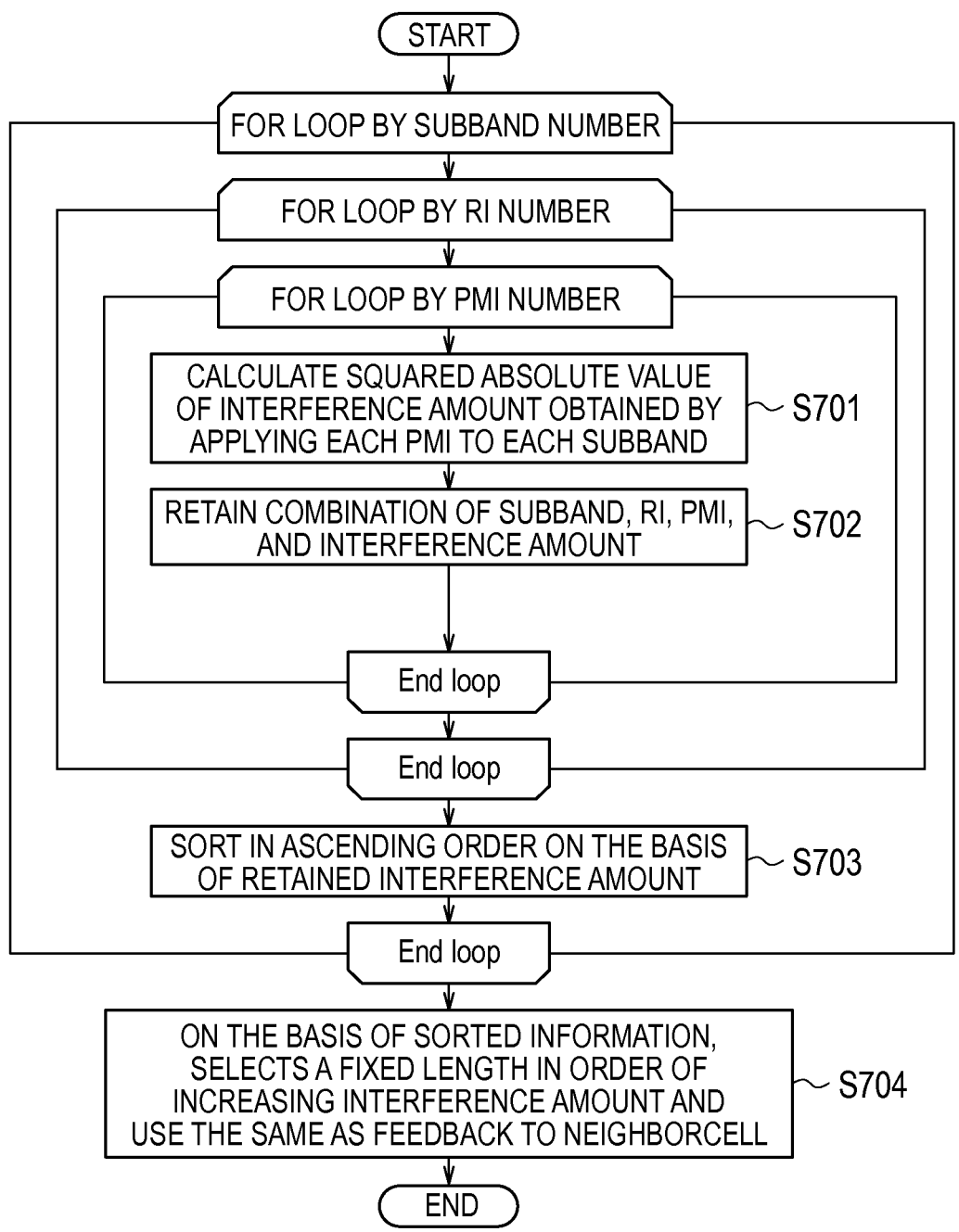
FIG. 25 is an operation flow diagram of the UE in the operation pattern 7 according to the first embodiment.

FIG. 25 is an operation flow diagram of the UE 100-1 in the operation pattern 7. In FIG. 25, a case of feedback for each subband is assumed.

As illustrated in FIG. 25, the processing of step S701 and S702 is executed for each subband, each RI, and each PMI (BC-PMI).

In step S701, the UE 100-1 calculates the squared absolute value of the amount of interference (interference level) in the target PMIs (BC-PMIs) under the condition of application of the target subbands and the target RIs.

In step S702, the UE 100-1 retains the combinations of the target subbands, the target RIs, the target PMIs (BC-PMI), and the interference level.

The processing of step S703 is executed for each subband.

In step S703, the UE 100-1 sorts the combinations retained in step S702 in the ascending order on the basis of the interference level.

In step S704, on the basis of the information (each combination) sorted in step S703, the UE 100-1 selects a predetermined number, in order of increasing interference level, of combinations and includes the combinations in the feedback information.

(1.3.3.8) Operation Pattern 8

In the operation pattern 8, the UE 100-1 selects a predetermined number (fixed length), in order of increasing interference level, of combinations of BC-PMIs and RIs. However, for the combinations in which the interference level is equal to or more than the threshold value, the BC-PMIs are set to a null value. The UE 100-1 includes the selected combinations in the feedback information. That is, in the operation pattern 8, the BC-PMIs in which the interference level is equal to or more than the threshold value in the operation pattern 7 are set to a null value.

Figure 26:
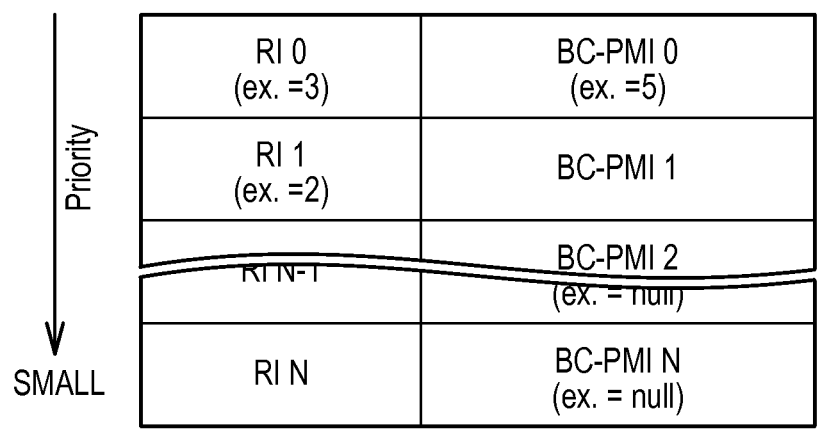
FIG. 26 is a diagram illustrating a configuration example of feedback information used in an operation pattern 8 according to the first embodiment.

FIG. 26 is a diagram illustrating a configuration example of feedback information used in the operation pattern 8. In FIG. 26, a case of feedback for the entire band is assumed.

As illustrated in FIG. 26, the feedback information used in the operation pattern 8includes a predetermined number (fixed length), in order of increasing interference level, of combinations of BC-PMIs and RIs. However, for the combinations in which the interference level is equal to or more than the threshold value, the BC-PMIs are set to a null value. Furthermore, a priority order (Priority) is set, in order of increasing interference level, to each combination included in the feedback information.

Figure 27:
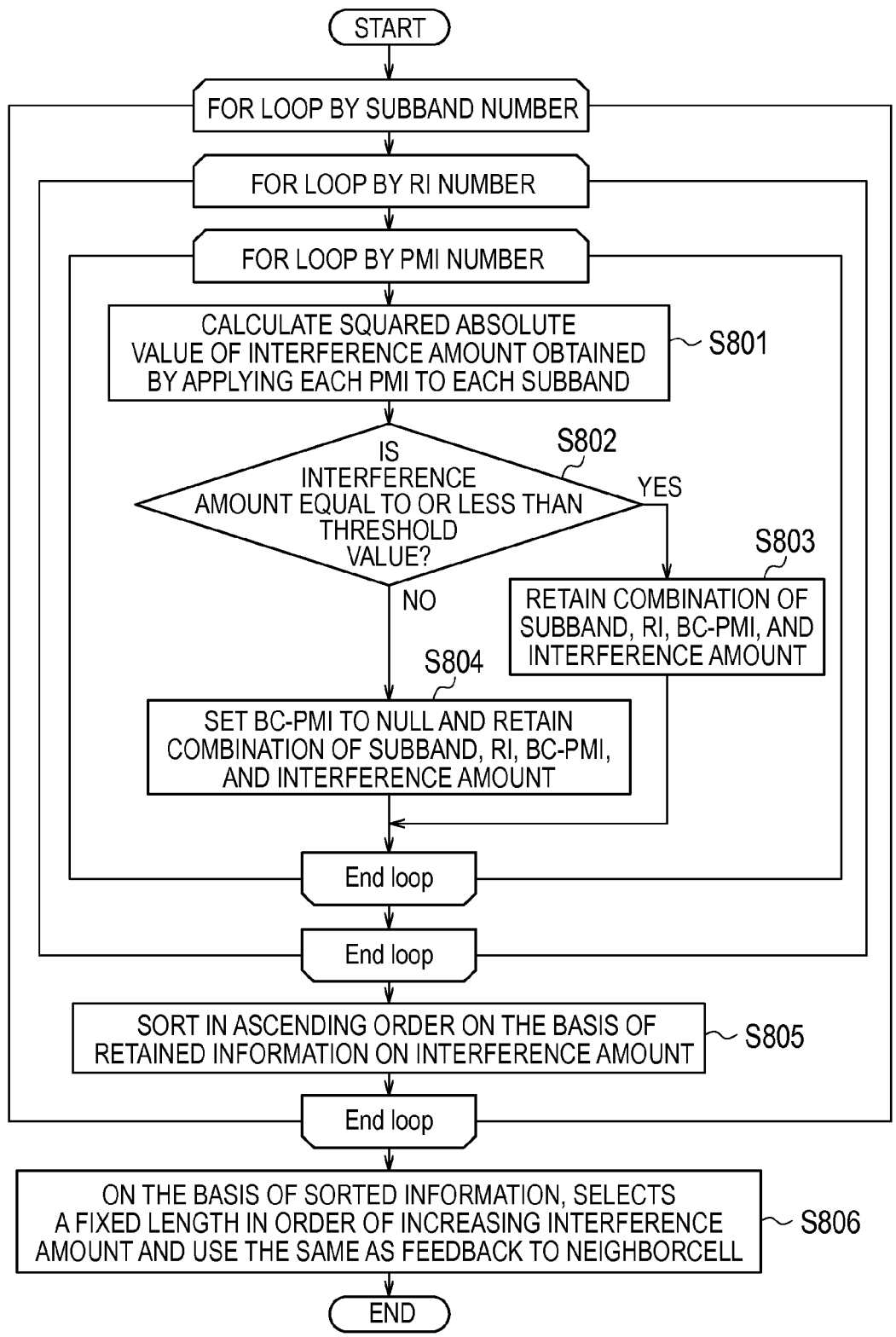
FIG. 27 is an operation flow diagram of the UE in the operation pattern 8 according to the first embodiment.

FIG. 27 is an operation flow diagram of the UE 100-1 in the operation pattern 8. In FIG. 27, a case of feedback for each subband is assumed.

As illustrated in FIG. 27, the processing of step S801 through S804 is executed for each subband, each RI, and each PMI (BC-PMI).

In step S801, the UE 100-1 calculates the squared absolute value of the amount of interference (interference level) in the target PMIs (BC-PMIs) under the condition of application of the target subbands and the target RIs.

In step S802, the UE 100-1 determines whether or not the interference level calculated in step S801 is equal to or less than the threshold value.

If "YES" is determined in step S802, the processing proceeds to step S603. In step S603, the UE 100-1 retains the combinations of the target subbands, the target RIs, the target PMIs (BC-PMI), and the interference level.

On the other hand, if "NO" is determined in step S802, the processing proceeds to step S804. In step S804, the UE 100-1 sets the target PMIs (BC-PMIs) to a null value, and retains the combinations of the target subbands, the target RIs, the target PMIs (BC-PMI), and the interference level.

The processing of step S805 is executed for each subband.

In step S805, the UE 100-1 sorts the combinations retained in step S603 and S604 in an ascending order on the basis of the interference level.

In step S806, the UE 100-1 selects a predetermined number, in order of increasing interference level, of combinations, on the basis of the combinations sorted in step S805, and includes the combinations in the feedback information.

(1.4) First Modification of First Embodiment

In the above-described first embodiment, a case in which the UE 100-1 that is the target of CoMP feeds back a plurality of combinations of BC-PMIs and RIs of the target frequency band was described.

However, not only the UE 100-1 that is the target of CoMP, but also the UE 100-2 that is not a target of CoMP may feed back a plurality of combinations of PMIs and RIs of the target frequency band. For example, the UE 100-2 feeds back n (n≥2) of combinations of PMIs and RIs starting from the most preferable ones.

Thus, the probability of the feedback information (combinations of BC-PMIs and RIs) from the UE 100-1 matching the feedback information (combinations of PMIs and RIs) from the UE 100-2 can be improved.

(1.5) Second Modification of First Embodiment

In the above-described first embodiment, a case of using BC-PMI in CB-CoMP was described. However, instead of BC-PMI, WC (Worst Companion)-PMI may also be used.

The WC-PMI is information indicating the precoder matrix (the precoder matrix in which a beam is directed toward the UE 100-1) in which the influence of the interference on the UE 100-1 is large. In other words, the WC-PMI is information indicating a precoder matrix that is not preferred for the UE 100-1.

In the present modification, the UE 100-1 includes a plurality of combinations of PMIs (WC-PMIs) in which the influence of the interference exerted on the UE 100-1 by the eNB 200-2 is large, and RIs in the feedback information to the eNB 200-2. In the present modification, the WC-PMI corresponds to the precoder matrix information. In the case of the settings in which the feedback of the WC-PMIs and RIs is performed for each subband, the feedback information of one subband includes a plurality of combinations of the WC-PMIs and RIs.

If PMI and RI that do not match any of the combinations of the WC-PMI and RI fed back from the UE 100-1 are fed back by the UE 100 (for example, the UE 100-2) within the cell of the eNB 200-2, the eNB 200-2 assigns the same radio resource as that of the UE 100-1 to the UE 100 within the cell of the eNB 200-2, and applies the non-matching PMI and RI to the transmission toward the UE 100 within the cell of the eNB 200-2.

When WC-PMIs are fed back, then in the above-described operation patterns 1 through 8, rather than selecting PMIs in which the interference level is low, PMIs in which the interference level is high are selected.

(2) Second Embodiment

Hereinafter, a second embodiment will be described while focusing on the differences from the first embodiment. The second embodiment is an embodiment for reducing the amount of calculation and overheads accompanying a feedback.

(2.1) Overview of Second Embodiment

The mobile communication system according to the second embodiment includes a base station that performs downlink multi-antenna transmission by using a precoder matrix that defines the transmission directionality of the downlink and a rank that defines the number of signal sequences of the downlink; and a user terminal that feeds back the feedback information of a target frequency band to the base station. The base station notifies, to the user terminal, usage status information indicating a usage status of the rank and/or the precoder matrix in the base station. Thus, the user terminal can understand the usage status of the rank and/or the precoder matrix in the base station, which makes it possible for the user terminal to not perform unnecessary feedback.

The feedback information includes combinations of the precoder matrix information indicating the precoder matrix and the rank information indicating the rank. On the basis of the usage status information, the user terminal regards only the combinations corresponding to the ranks and/or the precoder matrices that are in use by the base station, as a combination to be fed back to the base station. Thus, the user terminal can reduce the amount of calculation and overheads accompanying a feedback.

The precoder matrix information indicates the precoder matrix that is preferred for the user terminal. The base station assigns the same radio resource as that of the user terminal to another user terminal that notifies the feedback information matching the combinations included in the feedback information, and then performs transmission to the other user terminal according to the matching feedback information.

Alternatively, the precoder matrix information indicates the precoder matrix that is not preferred for the user terminal. The base station assigns the same radio resource as that of the user terminal to another user terminal that notifies feedback information that does not match the combinations included in the feedback information, and then performs transmission to the other user terminal according to the non-matching feedback information.

When all the prescribed ranks and/or the precoder matrices are in use, the base station stops the notification of the usage status information.

The usage status information indicates the usage status of the rank and/or the precoder matrix in the radio resource corresponding to the assigned radio resource of the user terminal.

The base station starts the notification of the usage status information at any of the timings including when the CoMP communication starts, when the feedback information is fed back from the user terminal, or when the assigned radio resource of the user terminal is notified from another base station.

The base station ends the notification of the usage status information at any of the timings including when the CoMP communication ends, or when a predetermined time period has elapsed since the stop of feedback of the feedback information from the user terminal.

A base station according to the second embodiment performs downlink multi-antenna transmission by using a precoder matrix that defines the transmission directionality of the downlink and a rank that defines the number of signal sequences of the downlink. A base station includes a control unit that notifies, to a user terminal that feeds back the feedback information about the target frequency band, the usage status information indicating the usage status of the rank and/or the precoder matrix in the base station.

A processor according to the second embodiment is provided in a base station that performs downlink multi-antenna transmission by using a precoder matrix that defines the transmission directionality of the downlink and a rank that defines the number of signal sequences of the downlink. The processor performs a process by which the base station notifies, to a user terminal that feeds back the feedback information about the target frequency band, the usage status information indicating the usage status of the rank and/or the precoder matrix in the base station.

The user terminal according to the second embodiment feeds back the feedback information about the target frequency band to a base station that performs downlink multi-antenna transmission by using a precoder matrix that defines the transmission directionality of the downlink and a rank that defines the number of signal sequences of the downlink. The user terminal includes a reception unit that receives the usage status information notified from the base station. The usage status information indicates the usage status of the rank and/or the precoder matrix in the base station.

A processor according to the second embodiment is provided in a user terminal that feeds back the feedback information about the target frequency band to a base station that performs downlink multi-antenna transmission by using a precoder matrix that defines the transmission directionality of the downlink and a rank that defines the number of signal sequences of the downlink. The processor performs a process by which the user terminal receives the usage status information notified from the base station. The usage status information indicates the usage status of the rank and/or the precoder matrix in the base station.

(2.2) Operation According to Second Embodiment (2.2.1) Operation Overview

The operation environment according to the second embodiment is the same as that in FIG. 7 and FIG. 8. In the second embodiment, the eNB 200-2 notifies, to the UE 100-1, the usage status information indicating the usage status of the rank and/or the precoder matrix in the eNB 200-2. The eNB 200-2 may indirectly notify the usage status information to the UE 100-1 via the eNB 200-1, or may directly notify the usage status information to the UE 100-1, not via the eNB 200-1. Furthermore, the usage status information may be information indicating a rank and/or a precoder matrix that is in use, or may be information indicating a rank and/or a precoder matrix that is not in use.

When all the prescribed ranks and/or the precoder matrices are in use, the eNB 200-2 may stop the notification of the usage status information.

On the basis of the usage status information from the eNB 200-2, the UE 100-1 regards only the RIs and/or the BC-PMIs corresponding to the ranks and/or the precoder matrices that are in use by the eNB 200-2, as a target to be fed back to the eNB 200-2.

In the first embodiment, the UE 100-1 calculated the interference level for the combinations of all RIs and all BC-PMIs, but in the second embodiment, the UE 100-1 may calculate the interference level for only the combinations of the RIs (RIs in use) and/or the PMIs (PMIs in use) corresponding to the ranks and/or the precoder matrix that are in use by the eNB 200-2.

Specifically, in the operation patterns 1 through 8 of the UE 100-1 according to the first embodiment, by restricting the processing performed for all RIs to only the RIs in use, the amount of calculation of the UE 100-1 can be reduced. Furthermore, by restricting the processing performed for all PMIs to only the PMIs in use, the amount of calculation of the UE 100-1 can be reduced.

The eNB 200-2 assigns the same radio resource as that of the UE 100-1 to the UE 100-2 that feeds back the feedback information matching the feedback information from the UE 100-1, and then performs transmission to the UE 100-2 according to the matching feedback information.

(2.2.2) Operation Sequence

Next, operation sequences 1 through 3 according to the second embodiment will be described.

(2.2.2.1) Operation Sequence 1

Figure 28:
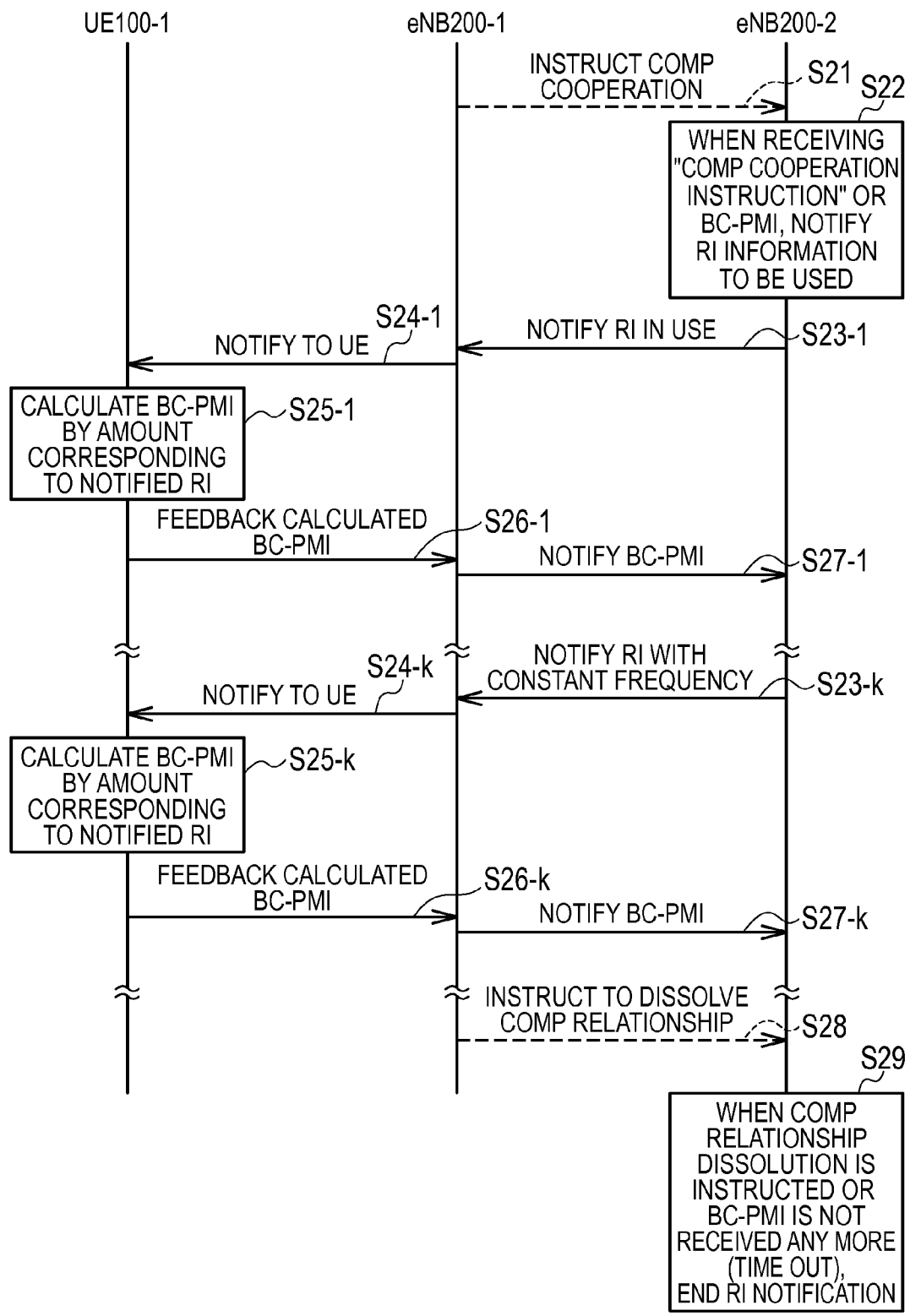
FIG. 28 is a sequence diagram of an operation sequence 1 according to the second embodiment.

FIG. 28 is a sequence diagram of the operation sequence 1 according to the second embodiment. In the present sequence, the usage status information is the in-use rank information (RIs in use) indicating the ranks that are in use by the eNB 200-1.

As illustrated in FIG. 28, in step S21, the eNB 200-1 transmits a CoMP cooperation instruction to the eNB 200-2.

In step S22, upon receiving the CoMP cooperation instruction from the eNB 200-1, or upon receiving the feedback information from the UE 100-1 for the first time, the eNB 200-2 starts the notification of the RIs in use.

In step S23-1, the eNB 200-2 transmits the RIs in use to the eNB 200-1. If all ranks (RIs) are in use, the eNB 200-2 need not necessarily notify the RIs in use. Alternatively, if all ranks (RIs) are in use, the eNB 200-2 may notify the fact that all ranks (RIs) are in use.

In step S24-1, the eNB 200-1 transmits, to the UE 100-1, the RIs in use that are received from the eNB 200-2.

Thus, in the present sequence, the eNB 200-2 indirectly notifies the UE 100-1 of the RIs in use via the eNB 200-1.

In step S25-1, on the basis of the RIs in use that are received from the eNB 200-1, the UE 100-1 calculates the BC-PMIs only for the ranks (RIs) that are in use by the eNB 200-2. Rather than calculating the BC-PMIs for all RIs, the UE 100-1 may calculate the BC-PMIs only for the RIs in use. However, if there is no notification about the RIs in use, or if it is notified that all ranks (RIs) are in use, the UE 100-1 may calculate the BC-PMIs for all RIs.

In step S26-1, the UE 100-1 transmits, to the eNB 200-1, the combinations of the RIs and BC-PMIs as the feedback information.

In step S27-1, the eNB 200-1 transmits, to the eNB 200-2, the feedback information received from the UE 100-1.

Thus, in the present sequence, the UE 100-1 indirectly feeds back the feedback information to the eNB 200-2 via the eNB 200-1.

Following this, in steps S23-$k$ through S27-$k$, the same procedure as that of steps S23-1 through S27-1 is repeated. The frequency of notification of the RIs in use by the eNB 200-2 is, for example, less than the BC-PMI feedback frequency by the UE 100-1. Alternatively, the eNB 200-2 may notify the RIs in use when it is determined that the BC-PMIs from the UE 100-1 are either too many or too less.

In step S28, the eNB 200-1 transmits a CoMP relation dissolution instruction to the eNB 200-2.

In step S29, the eNB 200-2 ends the notification of RIs in use when a CoMP relationship dissolution instruction from the eNB 200-1 is received, or when a timeout period (predetermined time period) since the stop of the reception of the feedback information from the UE 100-1 elapses. The timeout period, for example, is more than (for example, 1.5 times) the BC-PMI feedback interval of the UE 100-1.

(2.2.2.2) Operation Sequence 2

Figure 29:
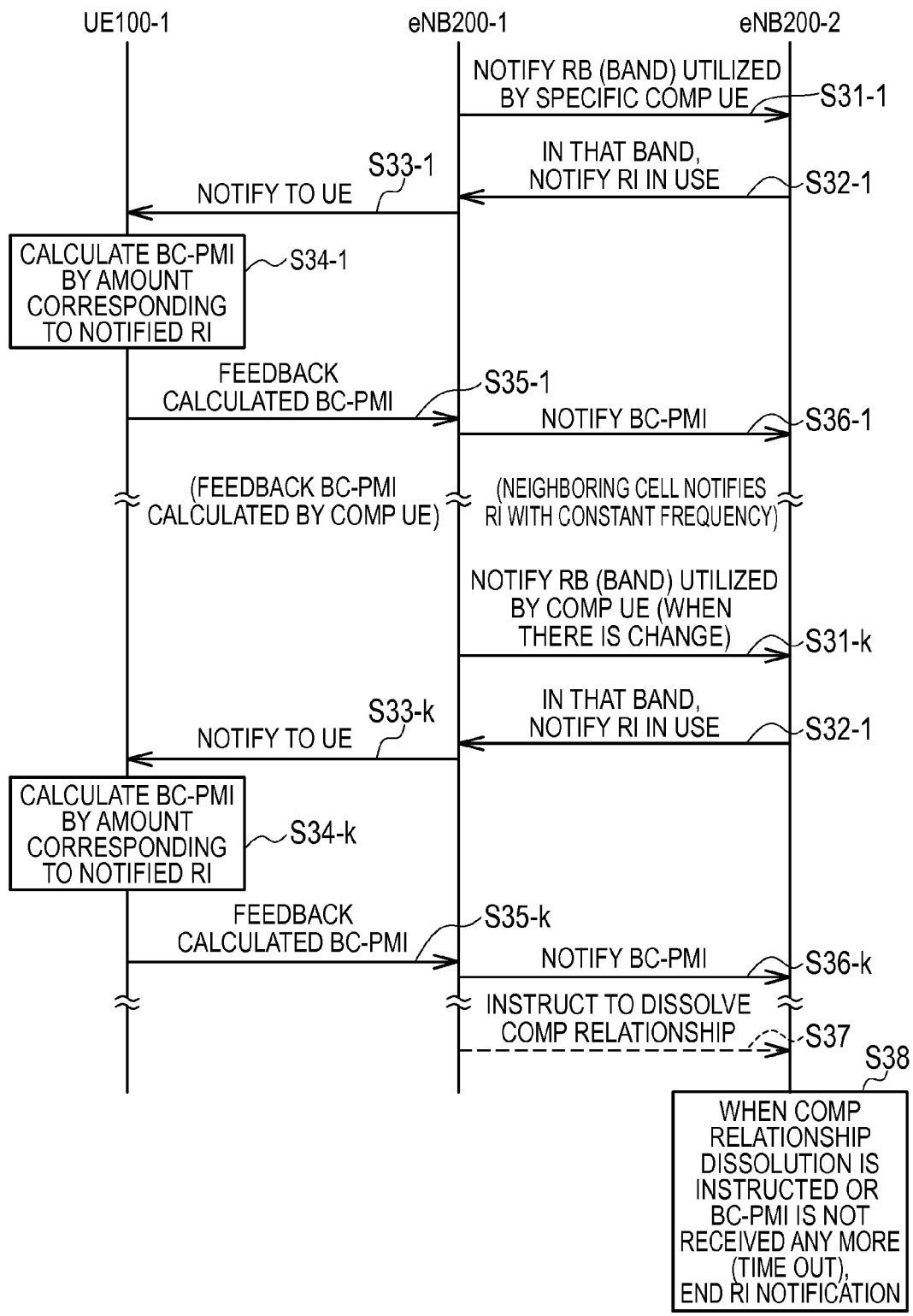
FIG. 29 is a sequence diagram of an operation sequence 2 according to the second embodiment.

FIG. 29 is a sequence diagram of the operation sequence 2 according to the second embodiment. Here, the differences from the operation sequence 1 are mainly described. When there are a plurality of UEs 100 that are the target of CoMP, consideration must be given to the fact that the operation sequence 1 is applicable commonly to the plurality of UEs 100, but the operation sequence 2 is applicable separately in each of the plurality of UEs 100.

As illustrated in FIG. 29, in step S31-1, the eNB 200-1 notifies the assigned resource block (the frequency band) of the UE 100-1 to the eNB 200-2.

In step S32-1, upon receiving the notification of the assigned resource block from the eNB 200-1, the eNB 200-2 starts the notification of the RIs in use.

In the operation sequence 1, the eNB 200-2 notified the ranks that were in use in the entire downlink frequency as the RIs in use, but in the operation sequence 2, only the ranks that are in use in the frequency band corresponding to the assigned resource block of the UE 100-1 are notified as the RIs in use.

Because there is a high possibility of the use of all ranks in the entire downlink frequency, by restricting to only the frequency band corresponding to the assigned resource block of the UE 100-1, the RIs in use can be notified effectively.

In step S33-1, the eNB 200-1 transmits, to the UE 100-1, the RIs in use that are received from the eNB 200-2.

In step S34-1, on the basis of the RIs in use that are received from the eNB 200-1, the UE 100-1 calculates the BC-PMIs only for the ranks (RIs) that are in use by the eNB 200-2.

In step S35-1, the UE 100-1 transmits, to the eNB 200-1, the combinations of the RIs and BC-PMIs as the feedback information.

In step S36-1, the eNB 200-1 transmits, to the eNB 200-2, the feedback information received from the UE 100-1.

Following this, in steps S31-$k$ through S37-$k$, the same procedure as that in steps S33-1 through S37-1 is repeated. When the assigned resource block of the UE 100-1 is changed, the eNB 200-1 notifies the eNB 200-2 of the assigned resource block of the UE 100-1. Furthermore, upon receiving the notification of the assigned resource block from the eNB 200-1, the eNB 200-2 notifies the RIs in use.

In step S37, the eNB 200-1 transmits a CoMP relation dissolution instruction to the eNB 200-2.

In step S38, the eNB 200-2 ends the notification of the RIs in use when a CoMP relationship dissolution instruction from the eNB 200-1 is received, or when a timeout period (predetermined time period) since the stop of the reception of the feedback information from the UE 100-1 elapses.

(2.2.2.3) Operation Sequence 3

Figure 30:
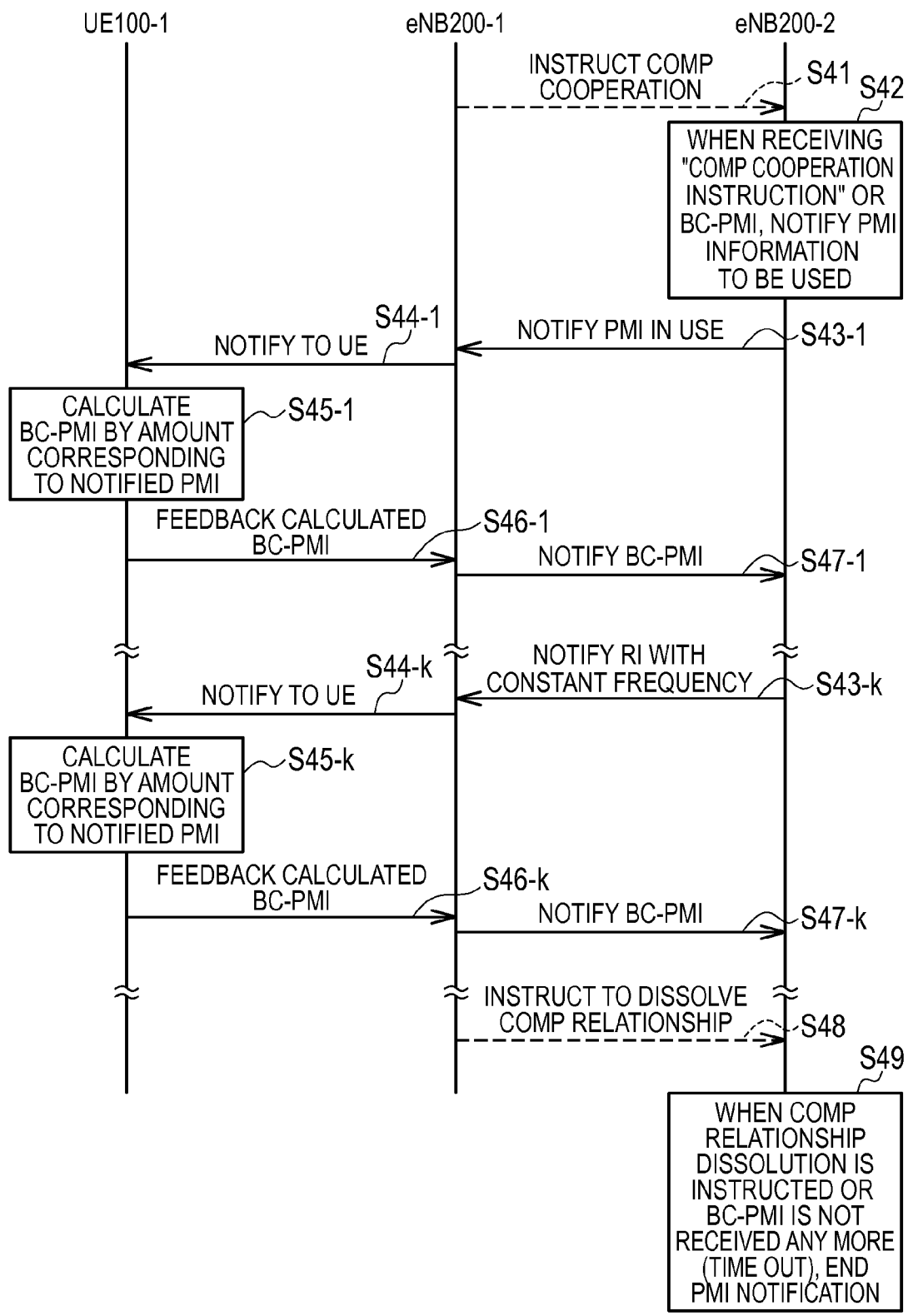
FIG. 30 is a sequence diagram of an operation sequence 3 according to the second embodiment.

FIG. 30 is a sequence diagram of the operation sequence 3 according to the second embodiment. In the present sequence, the usage status information is the in-use precoder matrix information (PMIs in use) indicating the precoder matrices that are in use by the eNB 200-1.

As illustrated in FIG. 30, in step S41, the eNB 200-1 transmits a CoMP cooperation instruction to the eNB 200-2.

In step S42, upon receiving the CoMP cooperation instruction from the eNB 200-1, or upon receiving the feedback information from the UE 100-1 for the first time, the eNB 200-2 starts the notification of the PMIs in use.

In step S43-1, the eNB 200-2 transmits the PMIs in use to the eNB 200-2. If all precoder matrices (PMIs) are in use, the eNB 200-2 need not necessarily notify the PMIs in use. Alternatively, if all precoder matrices (PMIs) are in use, the eNB 200-2 may notify the fact that all precoder matrices (PMIs) are in use. In addition, same as the operation sequence 2, only the precoder matrices that are in use in the frequency band corresponding to the assigned resource block of the UE 100-1 may be notified as the PMIs in use.

In step S44-1, the eNB 200-1 transmits, to the UE 100-1, the PMIs in use that are received from the eNB 200-2.

Thus, in the present sequence, the eNB 200-2 indirectly notifies the UE 100-1 of the PMIs in use via the eNB 200-1.

In step S45-1, on the basis of the PMIs in use that are received from the eNB 200-1, the UE 100-1 calculates the BC-PMIs only for the precoder matrices (PMIs) that are in use by the eNB 200-2. The UE 100-1 may calculate the BC-PMIs only for the PMIs in use. The calculation method includes, for example, calculating the interference level of the target PMIs under the condition of application of the target subbands and the target RIs, and then adding the priority information in order of increasing the interference level. As regard a specific example of the calculation method, the calculation method described in the first embodiment can be applied.

However, if there is no notification about the PMIs in use, or if it is notified that all precoder matrices (PMIs) are in use, the UE 100-1 may calculate the BC-PMIs for all PMIs.

In step S46-1, the UE 100-1 transmits, to the eNB 200-1, the combinations of the RIs and BC-PMIs as the feedback information.

In step S47-1, the eNB 200-1 transmits, to the eNB 200-2, the feedback information received from the UE 100-1.

Thus, in the present sequence, the UE 100-1 indirectly feeds back the feedback information to the eNB 200-2 via the eNB 200-1.

Following this, in steps S43-k through S47-k, the same procedure as that in steps S43-1 through S47-1 is repeated. The frequency of notification of the PMIs in use by the eNB 200-2 is, for example, less than the BC-PMI feedback frequency of the UE 100-1. Alternatively, the eNB 200-2 may notify the PMIs in use when it is determined that the BC-PMIs from the UE 100-1 are too many or too less.

In step S48, the eNB 200-1 transmits a CoMP relation dissolution instruction to the eNB 200-2.

In step S49, the eNB 200-2 ends the notification of PMIs in use when a CoMP relationship dissolution instruction from the eNB 200-1 is received, or when a timeout period (predetermined time period) since the stop of the reception of the feedback information from the UE 100-1 elapses. The timeout period, for example, is more than (for example, 1.5 times) the BC-PMI feedback interval of the UE 100-1.

(3) Third Embodiment

Hereinafter, a third embodiment will be described while focusing on the differences from the first and the second embodiments.

(3.1) Overview of Third Embodiment

A mobile communication system according to the third embodiment performs downlink multi-antenna transmission by applying a precoder matrix that defines transmission directionality of downlink. The mobile communication system includes a user terminal that feeds back a plurality of precoder matrix information items to a base station as feedback information of target frequency band. If the user terminal selects all precoder matrix information items as the feedback information, then instead of feeding back all the precoder matrix information items to the base station, the user terminal feeds back an index indicating all the precoder matrix information items to the base station. Thus, rather than feeding back all the precoder matrix information items to the base station, it is only necessary to feed back an index indicating all the precoder matrix information items to the base station, which enables a reduction in the amount of information to be fed back.

The user terminal according to the third embodiment is used in a mobile communication system that performs downlink multi-antenna transmission by applying a precoder matrix that defines transmission directionality of downlink. The user terminal includes a control unit that feeds back a plurality of precoder matrix information items to the base station as feedback information of target frequency band. If the control unit selects all precoder matrix information items as the feedback information, then instead of feeding back all the precoder matrix information items to the base station, the control unit feeds back an index indicating all the precoder matrix information items to the base station.

A processor according to the third embodiment is provided in a user terminal of a mobile communication system that performs downlink multi-antenna transmission by applying a precoder matrix that defines transmission directionality of downlink, such that the processor feeds back a plurality of precoder matrix information items to a base station as the feedback information of the target frequency band. If the processor selects all precoder matrix information items as the feedback information, then instead of feeding back all the precoder matrix information items to the base station, the processor feeds back an index indicating all the precoder matrix information items to the base station.

(3.2) Operation According to Third Embodiment (3.2.1) Operation Overview

The operation environment according to the present embodiment is the same as that in FIG. 7 and FIG. 8.

In the above-described first and second embodiments, the UE 100-1 (COMP UE) feeds back a plurality of combinations of the BC-PMI and the RI to the eNB 200-2.

However, depending on the selection method of the BC-PMI, there may occur cases where the UE 100-1 selects all BC-PMIs for one RI, and then feeds back all the BC-PMIs to the eNB 200-2. In such a case, the amount of information to be fed back (overheads) is large, which is not preferable from the viewpoint of saving on radio resources.

Thus, in the present embodiment, if the UE 100-1 selects all BC-PMIs for one RI, then instead of feeding back all the BC-PMIs to the eNB 200-2, the UE 100-1 feeds back an index indicating all the BC-PMIs to the eNB 200-2. Upon receiving the index indicating all BC-PMIs, the eNB 200-2 interprets that all BC-PMIs are selected in the UE 100-1. The other operations are the same as the first and the second embodiments.

It must be noted that even in the present embodiment, same as the second modification of the first embodiment, WC-PMI may be used instead of BC-PMI.

(3.2.2) Feedback Information

Figure 31:
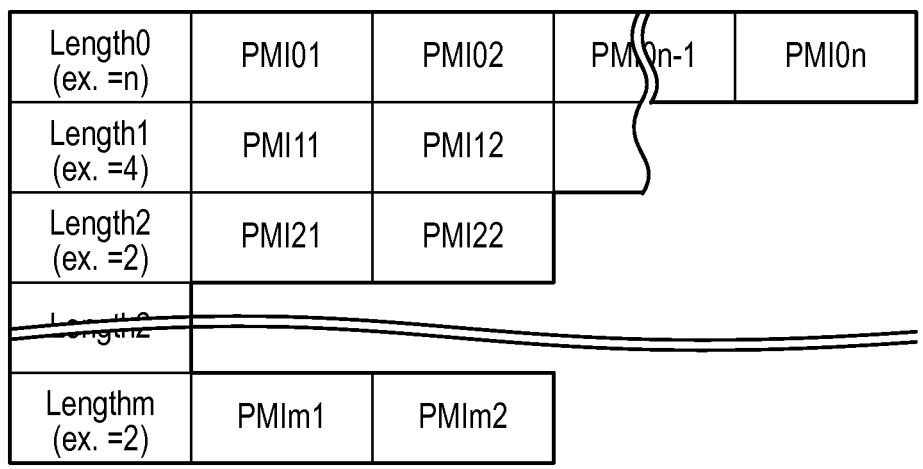
FIG. 31 is a diagram illustrating a message configuration example of feedback information according to the first and second embodiments.
Figure 32:
FIG. 32 is a diagram illustrating a message configuration example 1 of feedback information according to the third embodiment.
Figure 33:
FIG. 33 is a diagram illustrating a message configuration example 2 of feedback information according to the third embodiment.

Next, the message configuration of the feedback information according to the present embodiment will be described in comparison to the first and the second embodiments by using FIG. 31 through FIG. 33. In FIG. 31 through FIG. 33, a case of feedback for the entire downlink band is assumed.

FIG. 31 is a diagram illustrating a message configuration example of the feedback information according to the first and the second embodiments.

As illustrated in FIG. 31, the UE 100-1 selects one or more BC-PMIs (PMIs) for each RI (RI0 through Rim). Here, it is assumed that all BC-PMIs (PMIs) are selected for RI0. If the number of all BC-PMIs (PMIs) is n, then n number of BC-PMIs corresponding to RI0 must be fed back, because of which the amount of information to be fed back is large. It must be noted that a field indicating the number (data length) of BC-PMIs is added to each RI.

FIG. 32 is a diagram illustrating a message configuration example 1 of the feedback information according to the present embodiment.

As illustrated in FIG. 32, when the UE 100-1 selects all the BC-PMIs for one RI, the UE 100-1 includes an index indicating all the BC-PMIs in the feedback information. The index indicating all the BC-PMIs (PMIs) for RI0 is included in the feedback information. By replacing n number of BC-PMIs corresponding to RI0 with one index, the amount of information to be fed back can be reduced.

FIG. 33 is a diagram illustrating a message configuration example 2 of the feedback information according to the present embodiment.

As illustrated in FIG. 33, the message configuration example 2 is different from the message configuration example 1 in that the message configuration example 2 includes the index indicating all the BC-PMIs in the field indicating the number (data length) of the BC-PMIs. The number (data length) of the BC-PMIs for RI0 is "n" that indicates all the BC-PMIs (PMIs). Thus, the amount of information to be fed back can be reduced more than that in the message configuration example 1.

(3.2.3) Operation Flow

Figure 34:
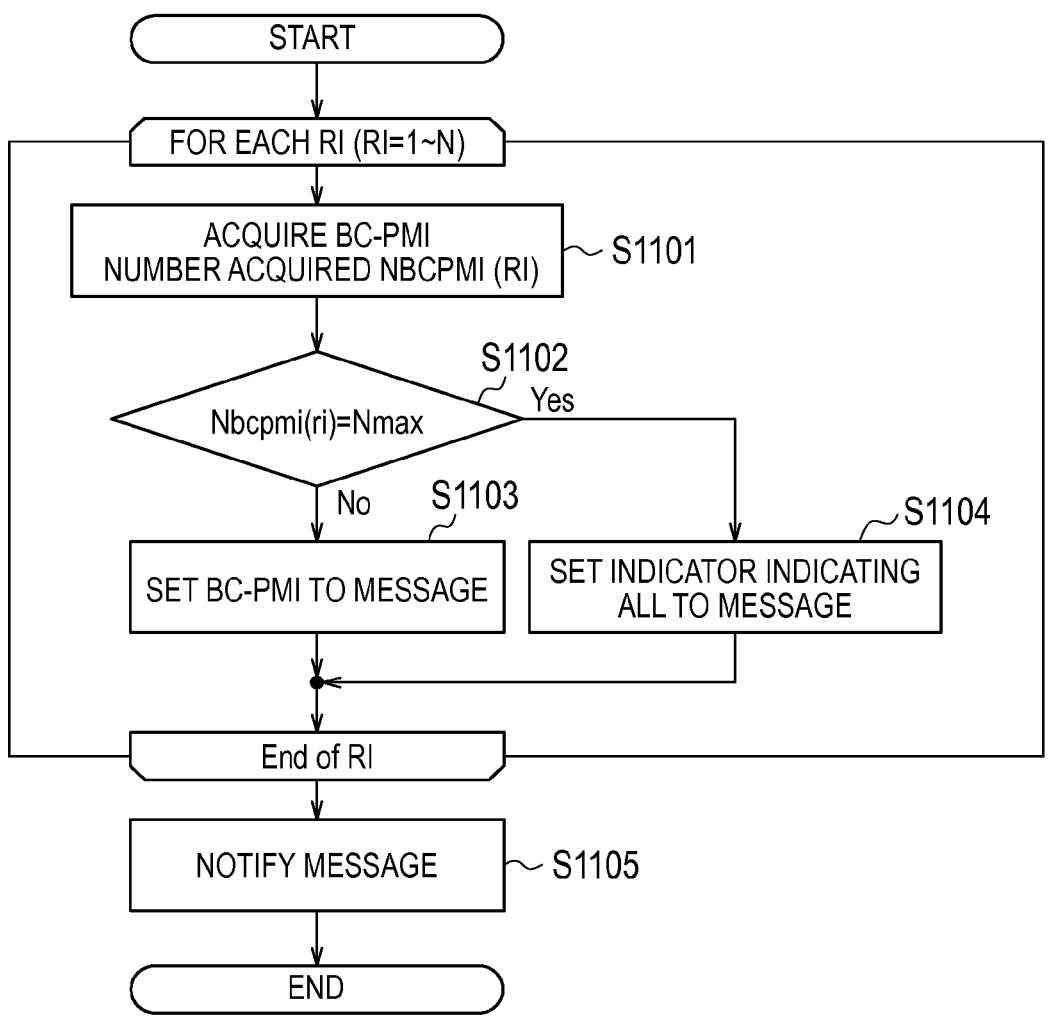
FIG. 34 is an operation flow diagram of the UE according to the third embodiment.

FIG. 34 is an operation flow diagram of the UE 100-1 according to the present embodiment.

As illustrated in FIG. 34, the processing of step S1101 through S1104 is executed for each RI.

In step S1101, the UE 100-1 selects the BC-PMIs to be fed back by the same method as in the first and the second embodiments. The number of selected BC-PMIs is Nbcpmi (ri).

In step S1102, the UE 100-1 determines whether or not Nbcpmi (ri) is same as Nmax, which is the number of all the BC-PMIs (PMIs).

If the result of step S1102 is "NO", the processing proceeds to step S1103. In step S1103, the UE 100-1 includes the BC-PMIs selected in step S1101 in the feedback information (feedback message).

On the other hand, if the result of step S1102 is "YES", the processing proceeds to step S1104. In step S1104, the UE 100-1 includes the index (indicator) indicating all the BC-PMIs in the feedback information (feedback message).

Following this, in step S1105, the UE 100-1 transmits the feedback information including the combinations of the RIs and the BC-PMIs (or the index indicating all the BC-PMIs).

Thus, according to the present embodiment, rather than feeding back all the BC-PMIs to the eNB 200-2, it is only necessary to feed back an index indicating all the BC-PMIs to the eNB 200-2, which enables a reduction in the amount of information to be fed back.

(4) Fourth Embodiment

Hereinafter, a fourth embodiment will be described while focusing on the differences from the first through the third embodiments.

(4.1) Overview of Fourth Embodiment

A mobile communication system according to the fourth embodiment performs downlink multi-antenna transmission by applying a precoder matrix that defines transmission directionality of downlink. The mobile communication system includes a user terminal that feeds back one or more precoder matrix information items to a base station as the feedback information of the target frequency band. The number of the precoder matrix information items fed back to the base station is set according to the number of user terminals connected to the base station.

In the fourth embodiment, as compared to a case in which the number of user terminals connected to the base station is less than a threshold value, in the case in which the number of user terminals connected to the base station is equal to or more than the threshold value, the number of precoder matrix information items fed back to the base station is reduced.

The user terminal according to the fourth embodiment is used in a mobile communication system that performs the downlink multi-antenna transmission by applying a precoder matrix that defines the transmission directionality of the downlink. The user terminal includes a control unit that feeds back one or more precoder matrix information items to the base station as the feedback information of the target frequency band. The number of the precoder matrix information items fed back to the base station is set according to the number of user terminals connected to the base station.

A processor according to the fourth embodiment is provided in a user terminal of a mobile communication system that performs the downlink multi-antenna transmission by applying a precoder matrix that defines the transmission directionality of the downlink, such that the processor feeds back one or more precoder matrix information items to a base station as the feedback information of the target frequency band. The number of the precoder matrix information items fed back to the base station is set according to the number of user terminals connected to the base station.

(4.2) Operation According to Fourth Embodiment

The operation environment according to the present embodiment is the same as that in FIG. 7 and FIG. 8.

In the above-described first embodiment through the third embodiment, by feeding back a plurality of combinations of the BC-PMIs and the RIs about the target frequency band to the eNB 200-2, the UE 100-1 (CoMP UE) improves the probability of matching (the match probability) the combinations of the PMIs and the RIs fed back by the UE 100-2.

However, when the number of UEs 100-2 (that is, the UEs 100 that establish a connection with the eNB 200-2) is large, a certain degree of match probability can be expected even when the UE 100-1 does not feed back a plurality of combinations of the BC-PMIs and the RIs about the target frequency band, but feeds back a single combination.

Thus, in the present embodiment, the number of combinations of the BC-PMIs and the RIs fed back to the eNB 200-2 is set according to the number of UEs 100-2. In a case in which there exists UE 100-2 that does not feed back PMI, the number of the combinations may be set according to the number of the UEs 100-2 that feed back PMI.

For example, when the number of UEs 100-2 is less than the threshold value, the eNB 200-2 notifies the UE 100-1 to feed back a plurality of combinations of the BC-PMIs and the RIs. In contrast, when the number of UEs 100-2 is equal to or more than the threshold value, the eNB 200-2 notifies the UE 100-1 to feed back one combination of BC-PMI and RI.

Depending on the notification, the UE 100-1 sets whether to feed back a plurality of combinations or to feed back one combination of the BC-PMI and the RI. The operation in the case in which a plurality of combinations of the BC-PMIs and the RIs are fed back is the same as that in the first embodiment through the third embodiment. When one combination of BC-PMI and RI is to be fed back, the UE 100-1 feeds back one BC-PMI and one RI to the eNB 200-2 as the feedback information about the target frequency band.

Alternatively, the eNB 200-2 notifies the number of UEs 100-2 to the UE 100-1. When the number of UEs 100-2 is less than the threshold value, the UE 100-1 makes the setting to feed back a plurality of combinations of the BC-PMIs and the RIs. In contrast, when the number of UEs 100-2 is equal to or more than the threshold value, the UE 100-1 makes the setting to feed back one combination of BC-PMI and RI.

Thus, according to the present embodiment, the form of feedback can be appropriately set according to the number of UEs 100-2 that establish a connection with the eNB 200-2.

It must be noted that even in the present embodiment, same as the second modification of the first embodiment, WC-PMI may be used instead of BC-PMI.

(5) Modification of First to Fourth Embodiments

In the above-described first embodiment through the fourth embodiment, a case in which a plurality of combinations of the BC-PMIs (or the WC-PMIs) and the RIs are fed back in the CB-CoMP is described. However, the present invention is not limited to CB-CoMP, and can also be applied to MU (Multi User)-MIMO (Multiple Input Multiple Output).

Figure 35:
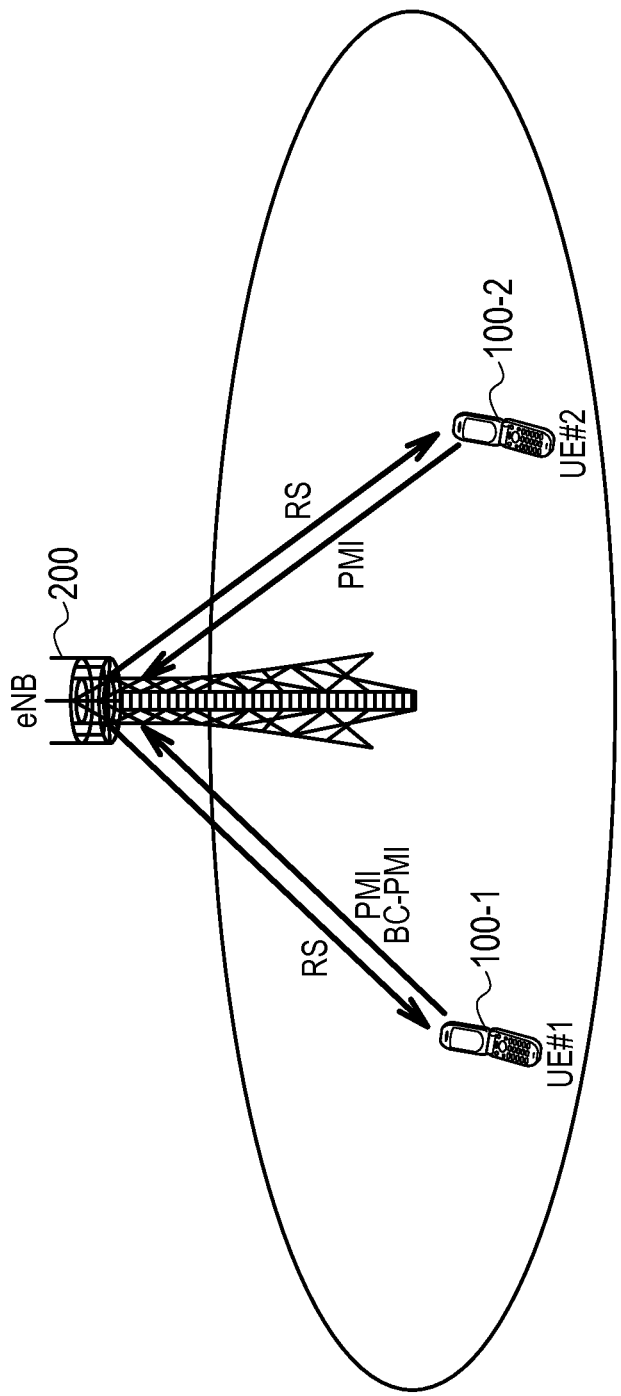
FIG. 35 is a diagram illustrating an operation environment according to modification of first to fourth embodiments.
Figure 36:
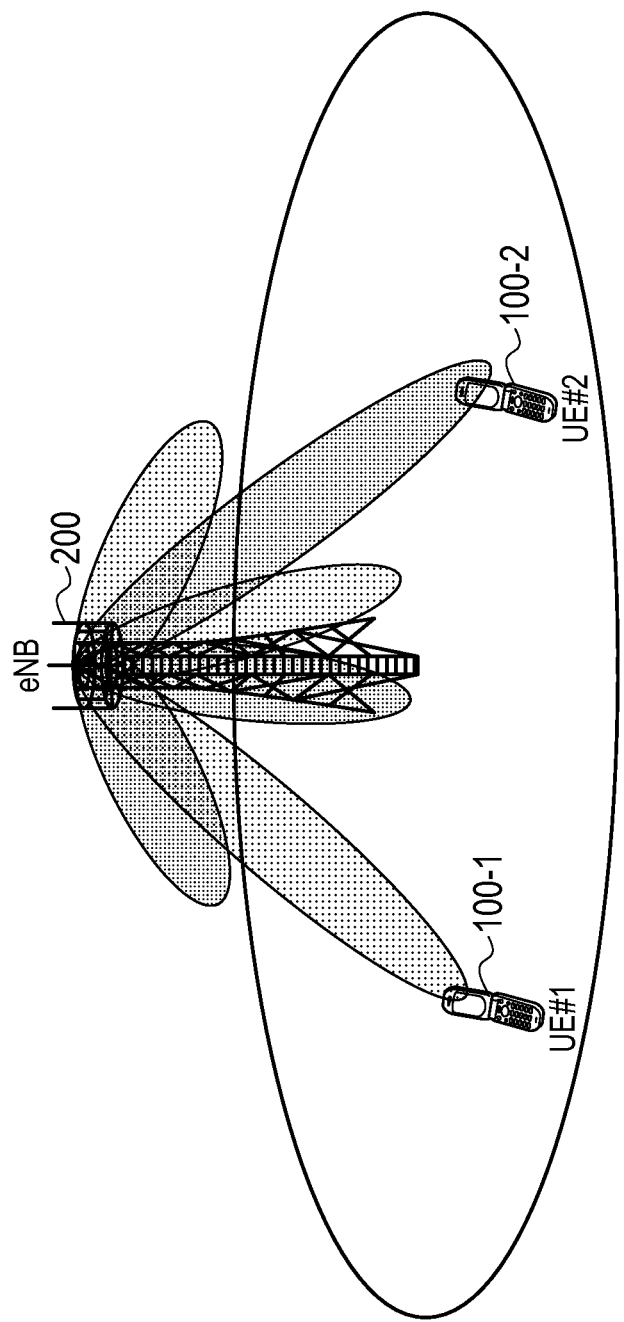
FIG. 36 is a diagram illustrating an operation environment according to modification of first to fourth embodiments.

FIG. 35 and FIG. 36 are diagrams illustrating the operation environments according to another embodiment.

As illustrated in FIG. 35, the UE 100-1 and the UE 100-2 establish a connection with a cell of the eNB 200. That is, the UE 100-1 and the UE 100-2 perform communication with assuming the cell of the eNB 200 as the serving cell.

In order to improve the utilization efficiency of a frequency, the eNB 200 performs MU-MIMO. Specifically, the eNB 200 performs transmission to the UE 100-1 and the UE 100-2 by using the same radio resource.

In addition to the normal feedback (the PMIs, the RIs, and the CQI) to the eNB 200, the UE 100-1 feeds back a plurality of combinations of the BC-PMIs and RIs to the eNB 200. As regard the feedback of the BC-PMIs and RIs, it is only necessary to change the feedback destination to a serving cell (the eNB 200) in the feedback method according to the first embodiment and the second embodiment.

The eNB 200 assigns the same radio resource as that of the UE 100-1 to the UE 100-2 that feeds back the PMI and the RI matching any one of the combinations of the BC-PMIs and RIs fed back from the UE 100-1. Also, the eNB 200 performs transmission to the UE 100-2 according to the matching PMI and the RI.

As a result, as illustrated in FIG. 36, the eNB 200 can perform transmission to the UE 100-2 with directing a beam to the UE 100-2 while directing a null to the UE 100-1. Furthermore, the eNB 200 performs transmission to the UE 100-1 according to the normal PMIs and RIs that are fed back from the UE 100-1. As a result, the eNB 200 is able to direct a beam to the UE 100-1.

It must be noted that in the MU-MIMO as well, the WC-PMIs can be used instead of the BC-PMIs. In such a case, the UE 100-1 feeds back the plurality of combinations of the WC-PMIs and RIs to the eNB 200.

Furthermore, the UE 100-2 may feed back not only one combination of the PMI and the RI to the eNB 200 but also a plurality of combinations of the PMIs and RIs to the eNB 200.

(6) Examples

As described above, Coordinated control between base stations (Coordinated Multi Point (CoMP)) has been studied with the purpose of improving the throughput of the cell-edge user in LIE-Advanced, whose specifications have been under progress in 3rd Generation Partnership Project (3GPP). Coordinated Beamforming CoMP (CB CoMP), where a transmission precoder is adjusted to reduce the effect of the interference by the base station that acts as the main interference source on the CoMP user equipment, has been studied as one of the CoMP schemes, and in the past, Best Companion Precoding Matrix Indicator (BCI) was proposed as a Channel State Information (CSI) feedback from the CoMP user equipment that was necessary for CB CoMP. However, the system performance may deteriorate if the BCI that is fed back from the CoMP user equipment during scheduling at the interfering station cannot be used effectively. A method of feeding back a plurality of BCIs from the CoMP user equipment with the purpose of improving system performance, with increasing the degree of freedom of scheduling in the interfering station. Furthermore, theoretical verification and system level simulation were performed for evaluating the performance of the throughput characteristics in the case of usage of this proposed method, and the effectiveness of the proposed method was confirmed.

The technical specification of LTE-Advanced, which is an advanced system of Long Term Evolution (LTE) that several domestic and overseas mobile telecommunications providers have either adopted or are expressing the intent to adopt, is standardized as Release 10 in 3rd Generation Partnership Project (3GPP), and currently, with the aim of further advancement, Release 11 and Release 12 have been discussed in continuation. As one of the examination items of LTE-Advanced, the introduction of coordinated control between base stations (Coordinated Multi Point: CoMP) has been examined in Release 11 with the purpose of improving the throughput of the cell-edge user. In CoMP, a plurality of geographically distant base stations perform transmission in coordination, and an improvement in throughput is achieved by improving the signal to interference and noise power ratio (SINR) of the cell-edge user.

In 3GPP, CoMP is classified into a plurality of schemes depending on the coordination method of base stations, and one of these is Coordinated Beamforming CoMP (CB CoMP), where one interfering station operates to direct a null toward the CoMP user equipment (CoMP UE). In the Time Division Duplex (TDD) scheme, through the calculation of the transmission precoder by estimating the channel status from an uplink signal, and using the reversibility of the propagation path, CB CoMP can be realized in a relatively easy manner, but in the Frequency Division Duplex (FDD) scheme, the desired operation cannot be performed unless channel information is fed back from the UE.

Best Companion Precoding Matrix Indicator (BCI) has been proposed as the feedback information for realizing CB CoMP, and the BCI is the Precoding Matrix Indicator (PMI) for minimizing the effect of interference on the CoMP UE from the interfering station.

Figure 37:
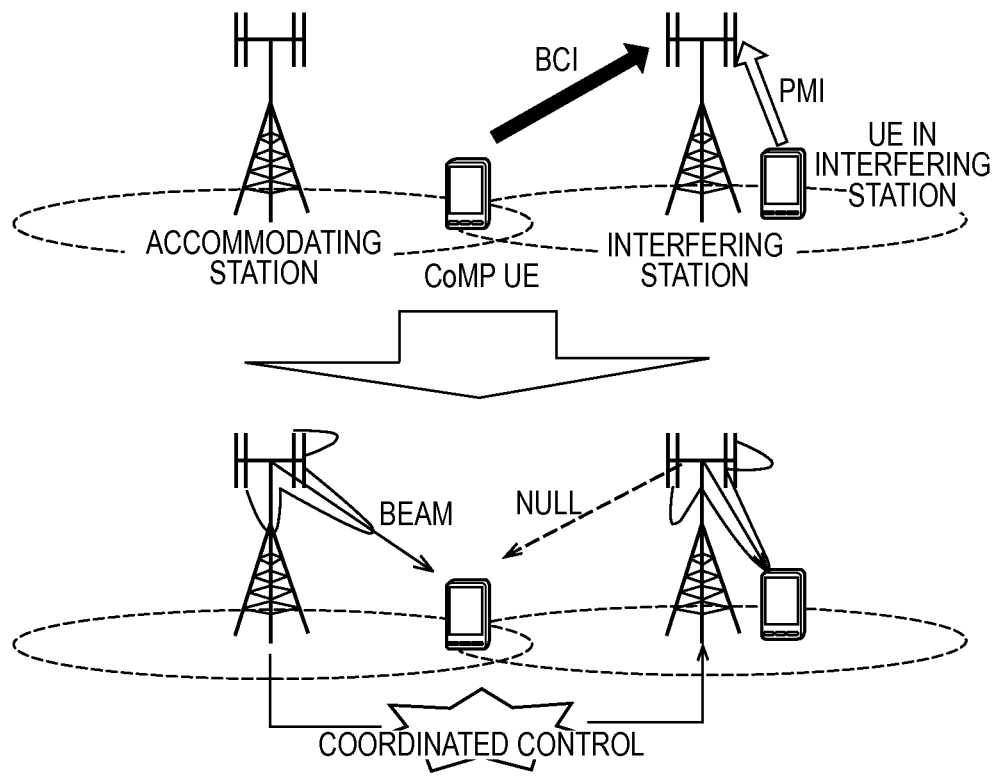
FIG. 37 is a diagram illustrating CB-CoMP using BCI according to examples.

FIG. 37 is a diagram illustrating CB-CoMP using BCI. As illustrated in FIG. 37, as a coordinated operation between base stations during the use of BCI, an operation in which the UE that reports the PMI matching the BCI from among the UEs connected to the interfering station is assigned to the same resource as the CoMP UE is considered. Here, the following two operations with respect to the same resource as that of the CoMP UE are considered, if the UE that reports a matching PMI does not exist in the interfering station, no assignment is performed (assignment A), an assignment is performed even if the PMI does not match (assignment B). In the former, although the interference suppression effect on the CoMP UE can be guaranteed, there is a problem that a decline in throughput occurs due to a reduction in the resources that can be used in the interfering station. On the other hand, in the latter, while a deterioration in the throughput at the interfering station side can be suppressed, there is a problem that the interference suppression effect on the CoMP UE is not guaranteed.

Figure 38:
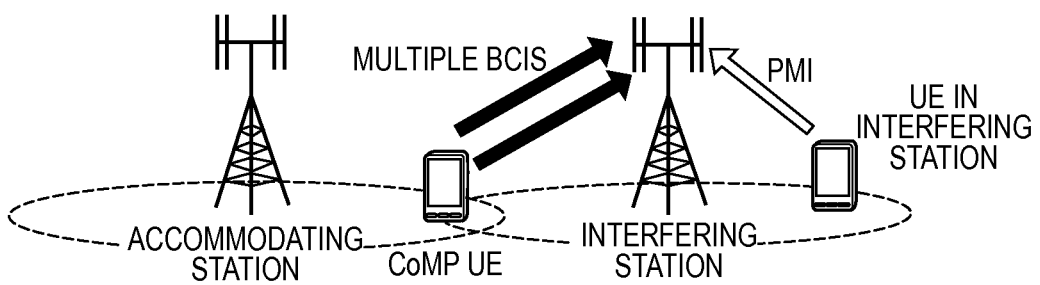
FIG. 38 is a diagram illustrating proposed method (inventions according to first to fourth embodiments).

FIG. 38 is a diagram illustrating proposed method (inventions according to first to fourth embodiments). As illustrated in FIG. 38, as a solution to the previously-described issues, a scheme that feeds back a plurality of BCIs is proposed. That is, the chances of a match between BCI and PMI that is fed back from UE within the interfering station are increased by selecting and feeding back a predetermined number of PMIs from those that are preferable for the CoMP UEs from among the feedback candidate PMI sets.

Thus, when the previously-described assignment A is used, a deterioration in the throughput due to a reduction in the resources used at the interfering station side can be suppressed, and when the previously-described assignment B is used, a deterioration in the throughput due to an increase in the interference on the CoMP UE can be suppressed. On the other hand, due to an increase in the amount of the feedback information, a trade-off with performance improvement needs to be taken into consideration.

The amount of improvement by the previously-described proposed method is examined by performing a theoretical calculation.

The number of PMIs taken into consideration is $N_{PMI}$, the number of BCIs fed back simultaneously per one CoMP UE is $N_{BCI}$, the number of CoMP UEs per each cell is $M_C$, the number of non CoMP UEs per each cell is $M_I$, and the number of resource blocks of the cell is $N_{RB}$.

If it is assumed that the probability of selecting each index from a plurality of selection options is uniform for both PMI and BCI, the probability p of matching the BCI of a certain CoMP UE with the PMI of a non CoMP UE of the neighboring cell is given by $$p = 1 - \left(\frac{N_{PMI} - N_{BCI}}{N_{PMI}}\right)^{M_I} \quad \text{[formula 1]}$$

Figure 39:
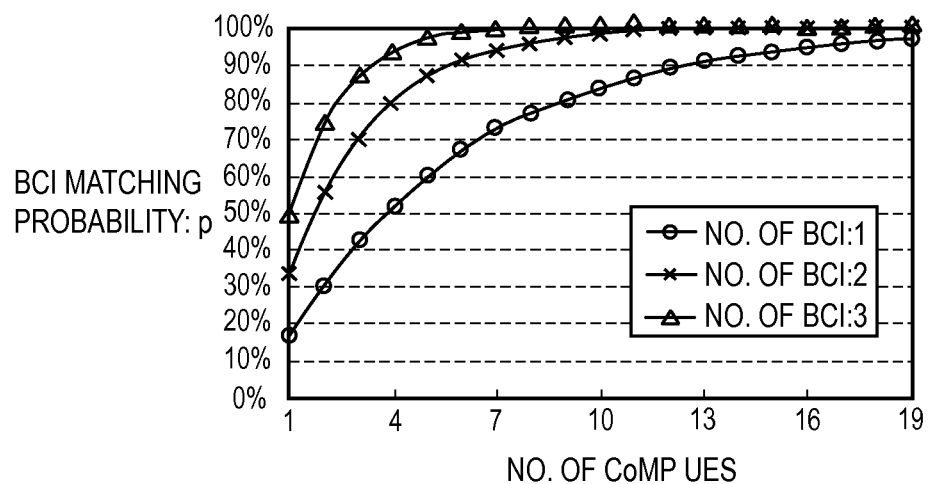
FIG. 39 is a diagram illustrating match probability of CoMP UE with BCI due to change in the number of non CoMP UEs according to examples.

Thus, as a result of a change in the number of non CoMP UEs within a cell, the probability p transits as shown in the graph in FIG. 39. FIG. 39 is a diagram illustrating match probability of CoMP UE with BCI due to change in the number of non CoMP UEs (No. of CoMP UEs $M_C$=1). When there are a plurality of BCIs, then even if the number of non CoMP UEs is less, it is possible to construct an environment in which the BCIs and the PMIs match at a relatively high probability. Furthermore, when the number of non CoMP UEs in a cell is seven or more, the difference in the effect between two and three of the number of the BCIs is less. However, the difference between one and two of the number of the BCIs is approximately 14% even when the number of non CoMP UEs is 10, and therefore, the effect of feedback of a plurality of BCIs is seen. Furthermore, the probability $p_m$ when only m number of the number $M_c$ of CoMP UEs match the BCIs is given by $$p_m = \binom{M_C}{m} p^m (1-p)^{M_C - m} \quad \text{[formula 2]}$$

Here, it is assumed that $M_C$ number of CoMP UEs and $M_I$ number of non CoMP UEs exist uniformly in each cell. The expected value $n_{RB}$ of the number of resource blocks that each UE can use is the value obtained by dividing the number $N_{RB}$ of cell resource blocks with the number of UEs within the cell, and is therefore given by:

$$n_{RB} = \frac{N_{RB}}{M_C + M_I} \quad \text{[formula 3]}$$

According to the above expression, when the previously-described assignment A is used, the expected value E of the total consumption of resource blocks in the cell is given by $$E = \sum_{m=0}^{M_C} \{N_{RB} - n_{RB}(M_C - m)\} p_m \quad \text{[formula 4]}$$

Here, it is assumed that at the time of matching of BCIs and PMIs, the PMIs of the CoMP UE are not included.

Figure 40:
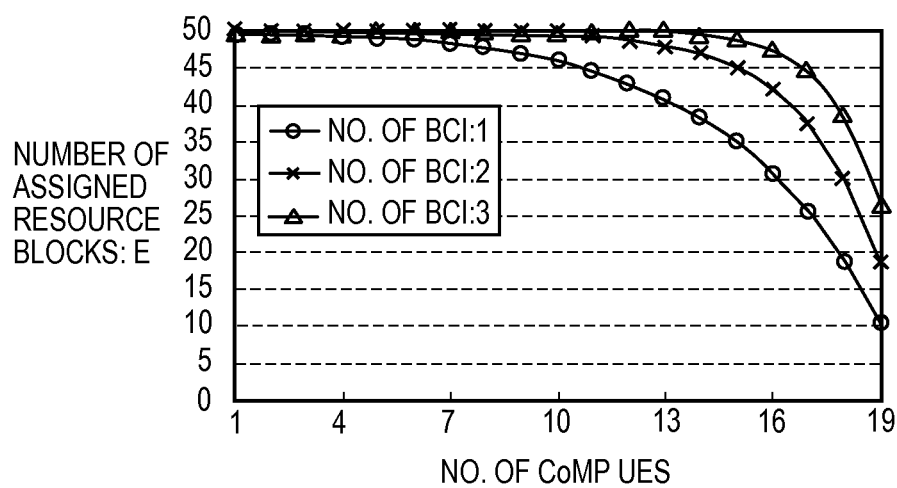
FIG. 40 is a diagram illustrating the transition in the expected value of the total number of assigned resource blocks due to the variation in the numbers of BCIs and CoMP UEs according to examples.

When the above expression is used for a system having a 2×2 antenna configuration, and $N_{PMI}$=6, the number of UEs in the cell ($M_C+M_I$)=20, and $N_{RB}$=50, the graph showing the transition in the expected value of the total number of assigned resource blocks due to the variation in the numbers of BCIs and CoMP UEs is shown in FIG. 40. From the graph in FIG. 40, it is estimated that the expected value of the number of assigned resource blocks increases by feeding back a plurality of BCIs. Furthermore, the more the proportion of the number of CoMP UEs among the UEs within the cell, the larger the effect. If the focus is put on the number of BCIs, then when the proportion of the number of CoMP UEs among the UEs within the cell is large, the number of assigned resource blocks can be increased by feeding back a larger number of BCIs.

Figure 41:
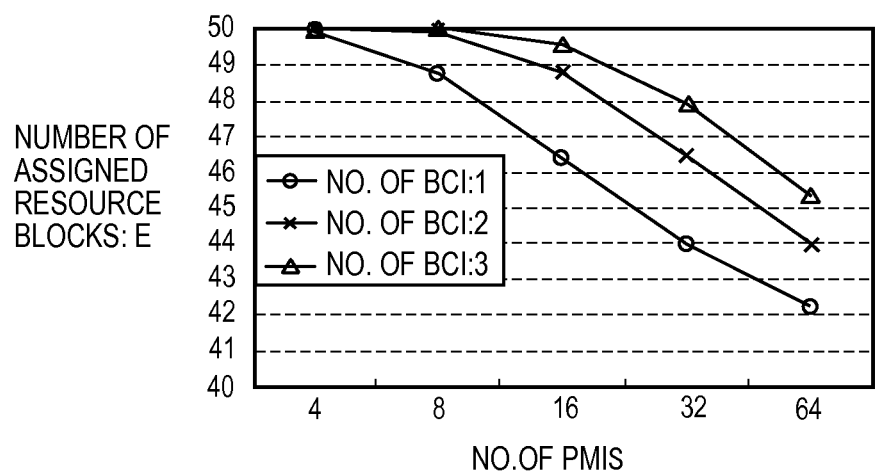
FIG. 41 is a diagram illustrating the expected value of the number of assigned resource blocks due to the change in the number of PMIs according to examples.

FIG. 41 illustrates the expected value of the number of assigned resource blocks due to the change in the number of PMIs. Here, the total number of UEs for each cell is 20, of which the number of CoMP UEs is four (the proportion of the number of CoMP UEs among the UEs within the cell is 20%). From the graph, it is understood that when the number of PMIs increases, then the reduction in the number of assigned resource blocks is remarkable if the number of BCI is one. By using a plurality of BCIs, an improvement by almost two resource blocks is constantly brought about when the number of the BCIs is two. It is understood that as the number of PMIs increases, the proportion of improvement in the number of assigned resource blocks also increases.

From the above, it can be considered that as the number of transmission and reception antenna increases, the degree of freedom of the number of PMIs increases, and therefore, the improvement effect based on the present proposed technology is realized more remarkably. In addition, because a better improvement effect is seen in a case where the proportion of the number of CoMP UEs is large with respect to the number of UEs within the cell, the effect is better in a configuration scenario where a large number of small cells are arranged, for example.

Perform simulation based on the above and confirm the effect of the proposed method.

The simulation specifications of a cell are indicated in Table 1, those of UE are indicated in Table 2, and those of the system are indicated in Table 3. A system level simulation model is defined in RAN WG1 (Radio Access Network Working Group 1) of 3GPP, and in the present paper, the system level simulation is performed according to the conditions defined.

The number of cells is 21, the number of UEs is 210, and 20 UEs are arranged in each cell. The number of trial subframes is 2000 and the number of drops is three.

Furthermore, the BCI feedback count in the proposed method is two, and the previously-described assignment A is used as the resource assignment method. As regard the resources of the CoMP UE, because sharing of dynamic resource assignment between base stations is not assumed, the resource assignment of 10 subframes that is predetermined according to the number of UEs within the cell is used repeatedly within the simulation drops.

TABLE 1

| Parameter | | Assumption |
|---|---|---|
| Cellular layout | | Hexagonal grid, 7 sites, 3 cells per site |
| Shadowing correlation | Cells Sites | 1.0 0.5 |

TABLE 1-continued

| Parameter | Assumption |
|---|---|
| Inter-site distance | 500 m |
| Total Transmission power | 46 dBm |
| Horizontal antenna pattern | $A_H(\varphi) = -\min\left[12\left(\frac{\varphi}{\varphi_{3dB}}\right)^2, SLA_H\right]$ $\varphi_{3dB} = 70°, SLA_H = 25$ dB |
| Vertical antenna pattern | $A_V(\theta) = -\min\left[12\left(\frac{\theta - \theta_{etilt}}{\theta_{3dB}}\right)^2, SLA_V\right]$ $\theta_{etilt} = 15°, \theta_{3dB} = 10°,$ $SLA_V = 20$ dB |
| 3D antenna pattern | $A(\varphi, \theta) = -\min[-\{A_H(\varphi) + A_V(\theta)\}, A_m]$ $A_m = 20$ dB |
| Antenna height | 32 m |
| Antenna gain | 14 dBi |
| Number of Transmission antennas | 2 |
| Minimum distance from UE | 35 m |

TABLE 2

| Parameter | Assumption |
|---|---|
| Antenna pattern | Omni-directional |
| Antenna height | 1.5 m |
| Antenna gain | 0 dBi |
| Number of Reception antennas | 2 |
| Channel estimation | Ideal |
| Reception of PDCCH | Ideal |
| Mobile speed | 3 km/h |

TABLE 3

| Parameter | Assumption |
|---|---|
| Duplex mode | FDD |
| Carrier frequency | 2.0 GHz |
| System bandwidth | 10 MHz (50 RBs) |
| Number of UEs per cell | 20 (geographically uniform) |
| Traffic model | Full buffer |
| Cell Transmission scheme | Closed loop spatial multiplexing |
| UE Reception scheme | MMSE without IRC |
| Scheduling algorithm for non CoMP UE | Proportional fairness in time and frequency |
| Scheduling algorithm for CoMP UE | Statically Pre-defined |
| Channel model | Spatial Channel Model |
| Distance-dependent Pathloss | 128.1 + 37.6 log10(R) dB R in km |
| Shadowing standard deviation | 8 dB |
| Penetration loss | 20 dB |
| Number of CoMP set | 2 |
| RSRP difference | 5 dB |
| Threshold for CoMP Set decision | |
| Number of Subframe | 2000 |
| Number of Drop | 3 |

The increased effect of the match count of BCIs and PMIs due to the proposed method is reviewed. Table 4 shows the match count between BCIs and PMIs obtained from the simulation results.

TABLE 4

| Method | Match count |
|---|---|
| Single BCI (conventional method) | 1376203 |
| Plurality of BCIs (proposed method) | 2802355 (+103.63%) |

Based on the results of Table 4, as compared to the conventional method, the match count of the proposed method increases by approximately two times, and it can be said that there is an effect of increase in the match count by the proposed method.

Furthermore, Table 5 shows the results of comparison of the average number of total resource blocks used per one cell and one subframe at this time.

TABLE 5

| Method | Average number of resource blocks |
|---|---|
| Single BCI (conventional method) | 47.48 |
| Plurality of BCIs (proposed method) | 49.54 (+4.35%) |

From Table 5, it is understood that when a plurality of BCIs are used, the number of resource blocks per cell has increased by two, and in terms of proportion, there is an increase of 4.35% in the used number, and the increase in the BCI match count is reflected in an increase in the actual number of assigned resources.

In the previous section, an increase in the match count of BCIs and PMIs by the proposed method was confirmed. Next, the effect of improvement in throughput due to the effect of increase in the match count of BCIs and PMIs is shown. Table 6 shows the results of the average downlink throughput of CoMP UEs, Table 7 shows the results of the average downlink throughput of non CoMP UEs, and Table 8 shows the results of the average downlink throughput of all UEs.

TABLE 6

| Method | Average throughput [kbps] |
|---|---|
| Single BCI (conventional method) | 272.69 |
| Plurality of BCIs (proposed method) | 251.56 (−7.75%) |

TABLE 7

| Method | Average throughput [kbps] |
|---|---|
| Single BCI (conventional method) | 906.22 |
| Plurality of BCIs (proposed method) | 947.61 (+4.57%) |

TABLE 8

| Method | Average throughput [kbps] |
| --- | --- |
| Single BCI (conventional method) | 617.11 |
| Plurality of BCIs (proposed method) | 629.97 (+2.08%) |

Based on the results of Table 6, there is no improvement in the throughput value of the CoMP UEs, and as compared to the conventional method, there is deterioration by almost 7.7%. This is considered to be the effect of the fact that as a result of selection of PMI with a low interference suppression effect as the second BCI candidate that is fed back, the null transmitted from the interfering station is not sufficiently directed to the CoMP UE, which increases the interference on CoMP UE, and the fact that as a result of an increase in the frequency of resource assignment in the neighboring cell due to an increase in the match probability of BCIs, the interference on the CoMP UEs increases.

On the other hand, based on the results of Table 7, by applying the proposed method, the value of the downlink throughput of the non CoMP UEs improves by approximately 4.5% as compared to the conventional method. This is considered to be due to an increase in the assigned resources as a result of an increase in the match probability of BCIs.

Based on the results of Table 8, as seen from the average for all UEs, an improvement by approximately 2% is seen in the throughput by the proposed method as compared to the conventional method. Although there is a difference in the effect between the CoMP UEs and the other UEs, the throughput of the system as a whole has improved.

Here, a comparison is made with the theoretical calculation. The number of CoMP UEs in the present simulation is 192 on an average per each drop, and the number of CoMP UEs per each cell is approximately nine. In a case where the number of UEs within a cell is 20 and the number of CoMP UEs is nine, the expected value of assigned resource blocks based on the theoretical calculation is 46.97 when the number of BCIs is one, and 49.74 when the number of BCIs is two, which indicates that the effect of improvement in the assigned resource blocks due to an increase in the number of BCIs from one to two is approximately 5.9%. Because the overall throughput improvement based on the simulation results is 2%, the effect by the improvement in assignment is not achieved. The cause of the difference is, first of all, a deterioration in the throughput of the CoMP UE due to an increase in the interference on CoMP UE. Furthermore, if focus is put on the assigned resources that have increased as a result of an increase in the BCI feedback count, the assignment candidate UEs for the resources are only the non CoMP UEs with which the BCIs match, and therefore, in comparison with other resources, the effect of user diversity is also considered to be reduced. As a result of these causes, the amount of improvement in throughput obtained from the simulation results is thought to be lesser than the theoretical values. The deterioration from these theoretical values can be improved by performing optimum scheduling and coordinated control between base stations, which enables moving closer to the theoretical values. From the above, the effect of improvement in the throughput due to an increase in the transmission in which the BCIs and the PMIs match was confirmed, and the effect of improvement in the throughput by the proposed method was confirmed.

[Overview of Fifth to Eighth Embodiments]

A communication control method according to fifth to eighth embodiments is used in a mobile communication system including a first base station; a user terminal that establishes a connection with the first base station; and a second base station that cooperates with the first base station, and supporting downlink multi-antenna transmission. The communication control method includes a step A of determining, by the user terminal, a plurality of combinations of transmission control information indicating a precoder matrix and/or a rank for the downlink multi-antenna transmission, and channel quality information indicating a modulation and coding scheme that is recommended when the transmission control information is applied, and then notifying a plurality of transmission control information items included in the plurality of determined combinations to the second base station; a step B of selecting, by the second base station, any transmission control information from among the plurality of transmission control information items, and then notifying predetermined information related to the selected transmission control information to the first base station; and a step C of determining, by the first base station, on the basis of the predetermined information, channel quality information corresponding to the transmission control information selected by the second base station, and then using the determined channel quality information for scheduling the user terminal. Hereinafter, "notifying" is not limited to a case of direct notification from a notification source to a notification destination, but also includes a case of indirect notification from a notification source to a notification destination via a predetermined device.

According to such a communication control method, the first base station can use the transmission control information selected by the second base station, that is, the first base station can use the channel quality information in which the usage status of the precoder matrix and/or the rank of the second base station is reflected, in the scheduling of the user terminal. Therefore, CB-CoMP can be implemented appropriately.

The step C may comprise a step of using the transmission control information selected by the second base station in the scheduling of the user terminal, in addition to the determined channel quality information, or in place of the determined channel quality information.

In the fifth embodiment, the step A comprises a step of transmitting the plurality of combinations by the user terminal to the first base station. The step B comprises a step of notifying, by the second base station, to the first base station, the selected transmission control information as the predetermined information. The step C comprises a step of using, by the first base station, the channel quality information corresponding to the transmission control information as the predetermined information from among the plurality of combinations, in the scheduling of the user terminal.

In the sixth embodiment, the step A comprises a step of notifying, by the user terminal, to the second base station, the plurality of combinations. The step B comprises a step of notifying, by the second base station, to the first base station, the channel quality information corresponding to the selected transmission control information from among the plurality of combinations, as the predetermined information. The step C comprises a step of using, by the first base station, the channel quality information as the predetermined information, in the scheduling of the user terminal.

In the sixth embodiment, the step A further comprises a step of transmitting, by the user terminal, to the first base station, normal channel quality information indicating a modulation and coding scheme recommended on the basis of the status of the reception signal. The step C further comprises a step of using, by the first base station, the normal channel quality information in the scheduling of the user terminal, when there is no notification of the predetermined information from the second base station.

In the seventh embodiment, the step A comprises: a step of transmitting, by the user terminal, to the first base station, the normal channel quality information indicating a modulation and coding scheme recommended on the basis of the status of the reception signal; and a step of notifying, by the user terminal, to the second base station, difference information indicating the difference from the normal channel quality information for each of the plurality of channel quality information items included in the plurality of combinations. The step B comprises a step of notifying, by the second base station, to the first base station, the difference information corresponding to the selected transmission control information from among the plurality of combinations, as the predetermined information. The step C comprises a step of using, by the first base station, the channel quality information obtained from the normal channel quality information, and the difference information as the predetermined information, in the scheduling of the user terminal.

In the eighth embodiment, the step A comprises: a step of setting, by the user terminal, a priority order for each of the plurality of combinations, and then transmitting, to the first base station, specific channel quality information corresponding to a specific priority order, and the first priority order set in the combination for which the channel quality information changes with respect to the specific channel quality information; and a step of correlating, by the user terminal, each of the plurality of transmission control information items to the priority order, and then notifying the second base station of the resulant information. The step B comprises a step of notifying, by the second base station, to the first base station, the second priority order corresponding to the selected transmission control information as the predetermined information. The step C comprises a step of using, by the first base station, the channel quality information obtained from the specific channel quality information, and the relative between the first priority order and the second priority order, in the scheduling of the user terminal.

A user terminal according to fifth to eighth embodiments establishes a connection with a first base station in a mobile communication system having the first base station and a second base station cooperating with the first base station, and supporting downlink multi-antenna transmission. The user terminal comprises: a control unit that determines a plurality of combinations of transmission control information indicating a precoder matrix and/or a rank for the downlink multi-antenna transmission, and channel quality information indicating a modulation and coding scheme that is recommended when the transmission control information is applied, and then notifies, to the second base station, a plurality of transmission control information items included in the plurality of determined combinations.

A processor according to fifth to eighth embodiments is provided in a user terminal that establishes a connection with a first base station in a mobile communication system having the first base station and a second base station cooperating with the first base station, and supporting downlink multi-antenna transmission. The processor performs a process of determining a plurality of combinations of transmission control information indicating a precoder matrix and/or a rank for the downlink multi-antenna transmission, and channel quality information indicating a modulation and coding scheme that is recommended when the transmission control information is applied, and then notifying, to the second base station, a plurality of transmission control information items included in the plurality of determined combinations.

A base station according to fifth to eighth embodiments cooperates with a first base station in a mobile communication system having the first base station and a user terminal that establishes a connection with the first base station, and supporting downlink multi-antenna transmission. The base station comprises: a control unit that selects any transmission control information from among a plurality of transmission control information items notified from the user terminal and indicating a precoder matrix and/or a rank for the downlink multi-antenna transmission, and then notifies, to the first base station, predetermined information related to the selected transmission control information.

A processor according to fifth to eighth embodiments is provided in a base station that cooperates with a first base station in a mobile communication system having the first base station and a user terminal that establishes a connection with the first base station, and supporting downlink multi-antenna transmission. The processor performs a process of selecting any transmission control information from among a plurality of transmission control information items notified from the user terminal and indicating a precoder matrix and/or a rank for the downlink multi-antenna transmission, and then notifying, to the first base station, predetermined information related to the selected transmission control information.

A base station according to fifth to eighth embodiments cooperates with a second base station and establishes a connection with a user terminal in a mobile communication system supporting downlink multi-antenna transmission. The base station comprises: a control unit that receives, from the second base station, predetermined information related to the transmission control information selected by the second base station, determines channel quality information corresponding to the transmission control information selected by the second base station on the basis of the predetermined information, and then uses the determined channel quality information for scheduling the user terminal.

A processor according to fifth to eighth embodiments is provided in a base station that cooperates with a second base station and establishes a connection with a user terminal in a mobile communication system supporting downlink multi-antenna transmission. The processor performs a process of receiving, from the second base station, predetermined information related to the transmission control information selected by the second base station, determining channel quality information corresponding to the transmission control information selected by the second base station on the basis of the predetermined information, and then using the determined channel quality information for scheduling the user terminal.

[Fifth Embodiment]

Hereinafter, with reference to the drawings, a description will be provided for an embodiment when the present invention is applied to a mobile communication system (an LIE system) configured to conform to the 3GPP standards.

(Operation According to Fifth Embodiment)

Figure 42:
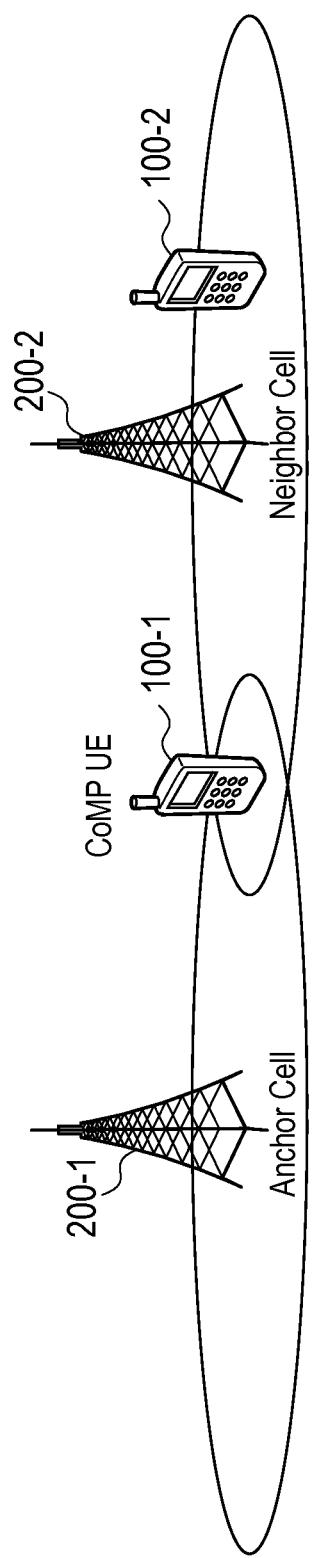
FIG. 42 is a diagram illustrating an operation environment according to fifth to eighth embodiments.
Figure 43:
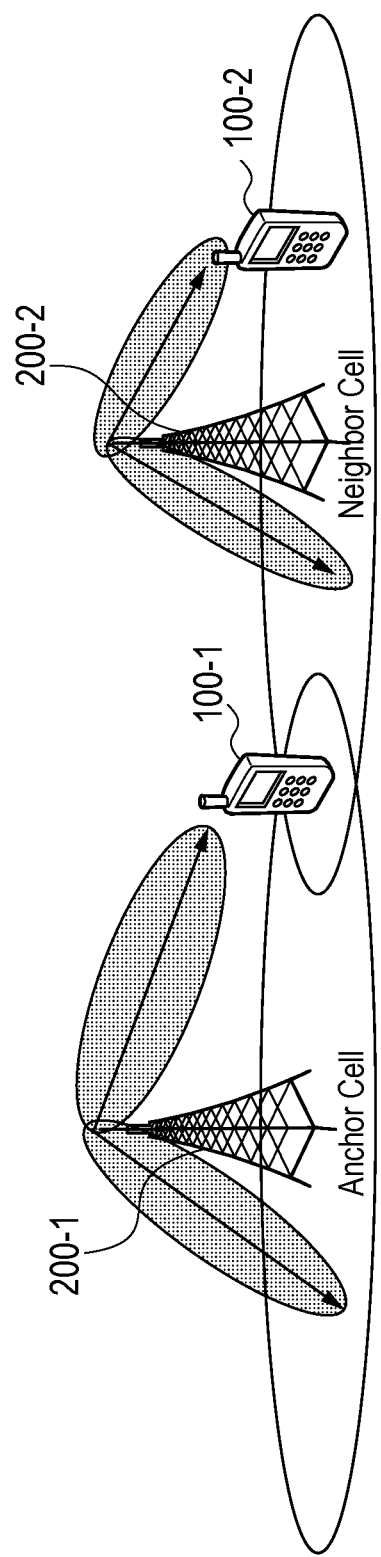
FIG. 43 is a diagram illustrating an operation environment according to the fifth to eighth embodiments.

Hereinafter, an operation according to the present embodiment will be described. FIG. 42 and FIG. 43 are diagrams illustrating operation environments according to the present embodiment. In FIG. 42 and FIG. 43, eNB 200-1 and eNB 200-2 constitute cells that are adjacent to each other.

As illustrated in FIG. 42, UE 100-1 establishes a connection with the cell of the eNB 200-1. That is, the UE 100-1 performs communication by assuming the cell of the eNB 200-1 as the serving cell.

In the present embodiment, the UE 100-1 is positioned in the boundary region of the respective cells of the eNB 200-1 and the eNB 200-2. In such a case, normally, the UE 100-1 receives the influence of the interference from the cell of the eNB 200-2.

UE 100-2 establishes a connection with the cell of the eNB 200-2. That is, the UE 100-2 performs communication by assuming the cell of the eNB 200-2 as the serving cell.

In order to improve the throughput of the UE 100-1 that is positioned at the cell edge of the eNB 200-1, the eNB 200-1 and the eNB 200-2 perform CB-CoMP. In the CB-CoMP, the serving cell of the UE 100-1 is called an "anchor cell".

Furthermore, in the CB-CoMP, the eNB 200-2, which acts as the main interference source, adjusts the transmission directionality so as to reduce the influence of the interference exerted on the UE 100-1. Specifically, the eNB 200-2 performs transmission to the UE 100-2 by directing a beam to the UE 100-2 while directing a null to the UE 100-1.

The UE 100-1 that is the target of the CB-CoMP performs a special feedback to the eNB 200-2 in addition to the normal feedback (the PMI, the RI, and the CQI) to the eNB 200-1. In the present embodiment, the UE 100-1 feeds back the special PMI and the RI to the eNB 200-2.

The normal PMI, which is the information indicating the precoder matrix (the precoder matrix in which a beam is directed to the UE 100-1) preferable for the UE 100-1, is used to determine the precoder matrix applicable in the downlink multi-antenna transmission to the UE 100-1. The UE 100-1 performs the feedback of the normal PMI on the basis of the reference signal, for example, received from the eNB 200-1.

In contrast, the special PMI, which is the information indicating the precoder matrix (the precoder matrix in which a null is directed to the UE 100-1) preferable for the UE 100-1, is used to determine the precoder matrix applicable in the downlink multi-antenna transmission to the UE 100 (for example, UE 100-2) other than the UE 100-1. Such PMI is called BC (Best Companion)-PMI. The UE 100-1 performs the feedback of the BC-PMI on the basis of, for example, the reference signal received from the eNB 200-2.

In the present embodiment, the feedback information to the eNB 200-2 includes a plurality of combinations of the BC-PMI and the RI in which the influence of the interference exerted on the UE 100-1 by the eNB 200-2 is less. In the case of the settings in which the feedback of the BC-PMI and the RI is performed for each subband, the feedback information of one subband includes a plurality of combinations of the BC-PMI and the RI.

For example, the combinations may include n (n≤2) of BC-PMIs starting from the BC-PMI in which the influence of the interference is the smallest, or the combinations may include BC-PMIs in which the influence of the interference is less than the threshold value. In the present embodiment, the BC-PMI/RI corresponds to the transmission control information.

The UE 100-1 may feed back the combinations of the BC-PMI and the RI to the eNB 200-2 via the serving cell (the eNB 200-1), or may directly feed back to the eNB 200-2.

For example, the eNB 200-2 assigns the same radio resource as that of the UE 100-1 to the UE 100 (for example, the UE 100-2) within the cell of the eNB 200-2 that feeds back the PMI and the RI matching any one of the combinations of the BC-PMI and the RI fed back from the UE 100-1. In this case, the eNB 200-2 must dynamically or quasi-statically share the scheduling information of the UE 100-1 with the eNB 200-1. Also, the eNB 200-2 performs transmission to the UE 100-2 according to the matching PMI and the RI.

As a result, as illustrated in FIG. 43, the eNB 200-2 can perform transmission to the UE 100-2 by directing a beam to the UE 100-2 while directing a null to the UE 100-1. Thus, the interference exerted on the UE 100-1 can be suppressed.

It must be noted that if the UE 100 within the cell of the eNB 200-2 that feeds back the PMI and the RI matching any one of the combinations of the BC-PMIs and RIs fed back from the UE 100-1 does not exist, the eNB 200-2 is believed to perform either of two operations, namely that of not assigning the same radio resource as that of the UE 100-1, and that of assigning a radio resource even when the PMI is not matching.

On the other hand, the eNB 200-1 performs transmission to the UE 100-1 according to the normal PMI and RI that is fed back from the UE 100-1. As a result, the eNB 200-1 is able to direct a beam to the UE 100-1.

However, because the eNB 200-1 does not comprehend the BC-PMI and the RI selected by the eNB 200-2, the eNB 200-1 cannot appropriately schedule the UE 100-1, specifically, the eNB 200-1 cannot appropriately determine the modulation and coding scheme (MCS) and the rank applicable in the transmission to the UE 100-1.

For example, in the case when the eNB 200-2 favorably directs a null to the UE 100-1, if the eNB 200-1 determines the MCS according to the normal CQI that is fed back from the UE 100-1, MCS having a low transmission speed as compared to the MCS appropriate for the real environment is determined, because of which the throughput cannot be improved.

Conversely, in the case when the eNB 200-2 does not direct a null to the UE 100-1, if the eNB 200-1 determines the MCS according to the normal CQI that is fed back from the UE 100-1, MCS having a high transmission speed (that is, MCS having a low error tolerance) as compared to the MCS appropriate for the real environment is determined, because of which re-transmission occurs frequently and the throughput declines.

In order to avoid such a situation, the eNB 200-1 is expected to infer the BC-PMI and the RI selected by the eNB 200-2, and then schedule the UE 100-1. However, when the inference is incorrect, the error rate of communication with the UE 100-1 shifts greatly from the target error rate, making it impossible to perform effective scheduling.

Figure 44:
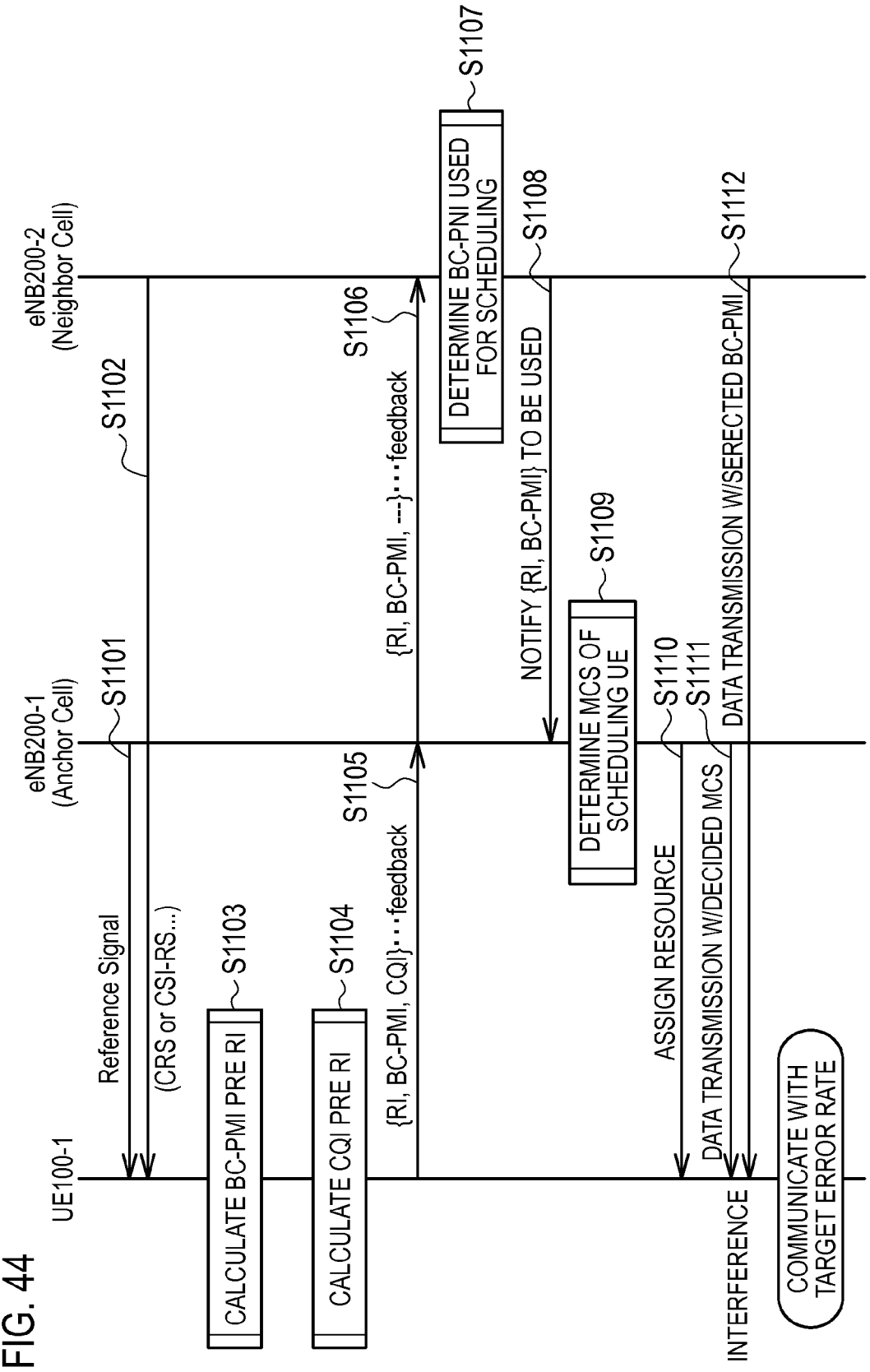
FIG. 44 is an operation sequence diagram according to the fifth embodiment.

Thus, in the present embodiment, the CB-CoMP can be implemented appropriately according to the operation described below. FIG. 44 is an operation sequence diagram according to the present embodiment. In FIG. 44, a feedback in the entire downlink band is assumed, however a feedback for each subband may also be assumed.

First of all, an overview of an operation sequence according to the present embodiment will be described. As illustrated in FIG. 44, firstly, the UE 100-1 determines a plurality of combinations of the BC-PM/RI, and the CQI indicating the recommended MCS when the BC-PM/RI is applied, and then, the UE 100-1 notifies, to the eNB 200-2, a plurality of BC-PMIs/RIs included in the plurality of combinations that have been determined (steps S1103 through S1106). In the present embodiment, a plurality of BC-PMIs/RIs are indirectly notified (fed back) from the UE 100-1 to the eNB 200-2 via the eNB 200-1.

Secondly, the eNB 200-2 selects any one BC-PM/RI from among the plurality of BC-PMIs/RIs, and then notifies the selected BC-PM/RI to the eNB 200-1 (step S1107 and S1108).

Thirdly, the eNB 200-1 determines the CQI corresponding to the BC-PMI/RI selected by the eNB 200-2, and then uses the determined CQI for scheduling the UE 100-1 (step S1109). It must be noted that in addition to the determined CQI, or in place of the determined CQI, the eNB 200-1 may use the BC-PMI/RI selected by the eNB 200-2 for scheduling the UE 100-1.

Next, the details of the operation sequence according to the present embodiment will be described.

As illustrated in FIG. 44, in steps S1101 and S1102, the UE 100-1 receives a reference signal from the eNB 200-1 and the eNB 200-2, respectively. The reference signal is either CRS or CSI-RS.

In step S1103, for each of the plurality of RIs corresponding to the plurality of ranks that can be applied to the downlink multi-antenna transmission, the UE 100-1 calculates the evaluated value of each of the plurality of BC-PMIs corresponding to the plurality of precoder matrices that can be applied to the downlink multi-antenna transmission. The evaluated value of BC-PMI, for example, is the estimated amount of interference when the BC-PMI is applied. In addition, the UE 100-1 selects a plurality of BC-PMIs and the RI corresponding thereto {RI, BC-PMI} on the basis of the evaluated value.

In step S1104, the UE 100-1 selects the CQI indicating the recommended MCS when the RI and/or the BC-PMI is applied to each pair {RI, BC-PMI} selected in step S1103. For example, the recommended MCS can be determined on the basis of the evaluated value (the amount of interference) calculated in step S1103.

In step S1105, the UE 100-1 notifies, to the eNB 200-1, a plurality of combinations {RI, BC-PMI, CQI} . . . of the pair {RI, BC-PMI} selected in step S1103, and the CQI selected in step S1104.

The eNB 200-1 retains the plurality of combinations {RI, BC-PMI, CQI} . . . received from the UE 100-1 in step S1105.

In step S1106, the eNB 200-1 notifies, to the eNB 200-2, a plurality of pairs {RI, BC-PMI} . . . included in the plurality of combinations {RI, BC-PMI, CQI} . . . received from the UE 100-1 in step S1105. The notification is performed on an X2 interface, for example.

In step S1107, the eNB 200-2 selects any one pair {RI, BC-PMI} from among the plurality of pairs {RI, BC-PMI} . . . received from the eNB 200-1 in step S1106. For example, when there exists UE 100 (for example, the UE 100-2) within the cell of the eNB 200-2 that feeds back a pair {RI, PMI} matching any one of the plurality of pairs {RI, BC-PMI} . . . , the eNB 200-2 selects the matching pair {RI, BC-PMI}.

In step S1108, the eNB 200-2 notifies the pair {RI, BC-PMI} selected in step S1107 to the eNB 200-1. The notification is performed on an X2 interface, for example. However, instead of notifying the selected pair {RI, BC-PMI}, only either one (for example, the RI) may be notified, or the index of the selected pair {RI, BC-PMI} may be notified. In addition, the eNB 200-2 may notify, to the eNB 200-1, the information indicating the frequency band (the resource block) in which the selected pair {RI, BC-PMI} is applied, and/or the information indicating the time (such as a subframe) when the selected pair {RI, BC-PMI} is applied as the additional information.

In step S1109, from among the plurality of combinations {RI, BC-PMI, CQI} . . . that are retained, the eNB 200-1 determines the CQI corresponding to the pair {RI, BC-PMI} notified from the eNB 200-2, and uses the determined CQI for scheduling the UE 100-1. For example, the eNB 200-1 determines the MCS and the rank to be applied to the transmission to the UE 100-1 on the basis of the determined CQI. Furthermore, the eNB 200-1 may determine the radio resource (the time and frequency resource) to be assigned to the UE 100-1 on the basis of the additional information notified from the eNB 200-1.

In step S1110, the eNB 200-1 notifies, to the UE 100-1, the information indicating the MCS, the RI, the radio resource and the like determined in step S1109.

In step S1111, the eNB 200-1 performs transmission to the UE 100-1 according to the MCS, the RI, the radio resource and the like determined in step S1109.

In step S1112, the eNB 200-2 performs transmission to the UE 100-2 according to the {RI, BC-PMI}, for example, determined in step S1107. When a null is not directed to the UE 100-1, the UE 100-1 receives the influence of the interference from the eNB 200-2.

Thus, the eNB 200-1 can use the BC-PMI/RI selected by the eNB 200-2, that is, the eNB 200-1 can use the CQI in which the usage status of the precoder matrix/rank of the eNB 200-2 is reflected, for scheduling the UE 100-1. Therefore, in any of the case when the eNB 200-2 favorably directs a null to the UE 100-1, and the case when the eNB 200-2 does not direct a null to the UE 100-1, MCS appropriate for the real environment is applied, because of which communication with the target error rate can be realized.

[Sixth Embodiment]

Hereinafter, a sixth embodiment will be described while focusing on the differences from the fifth embodiment.

In the above-described fifth embodiment, a plurality of pairs {RI, BC-PMI} . . . were notified to the eNB 200-2. In contrast, in the sixth embodiment, a plurality of combinations {RI, BC-PMI, CQI} . . . including the plurality of pairs {RI, BC-PMI} . . . are notified to the eNB 200-2.

Furthermore, in the above-described fifth embodiment, the eNB 200-2 notified the selected pair {RI, BC-PMI} to the eNB 200-1. In contrast, in the sixth embodiment, the eNB 200-2 notifies the CQI corresponding to the selected pair {RI, BC-PMI} to the eNB 200-1.

In addition, in the above-described fifth embodiment, the eNB 200-1 used the CQI corresponding to the pair {RI, BC-PMI} notified from the eNB 200-2 in the scheduling. In contrast, in the sixth embodiment, the eNB 200-1 uses the CQI notified from the eNB 200-2 in the scheduling.

Figure 45:
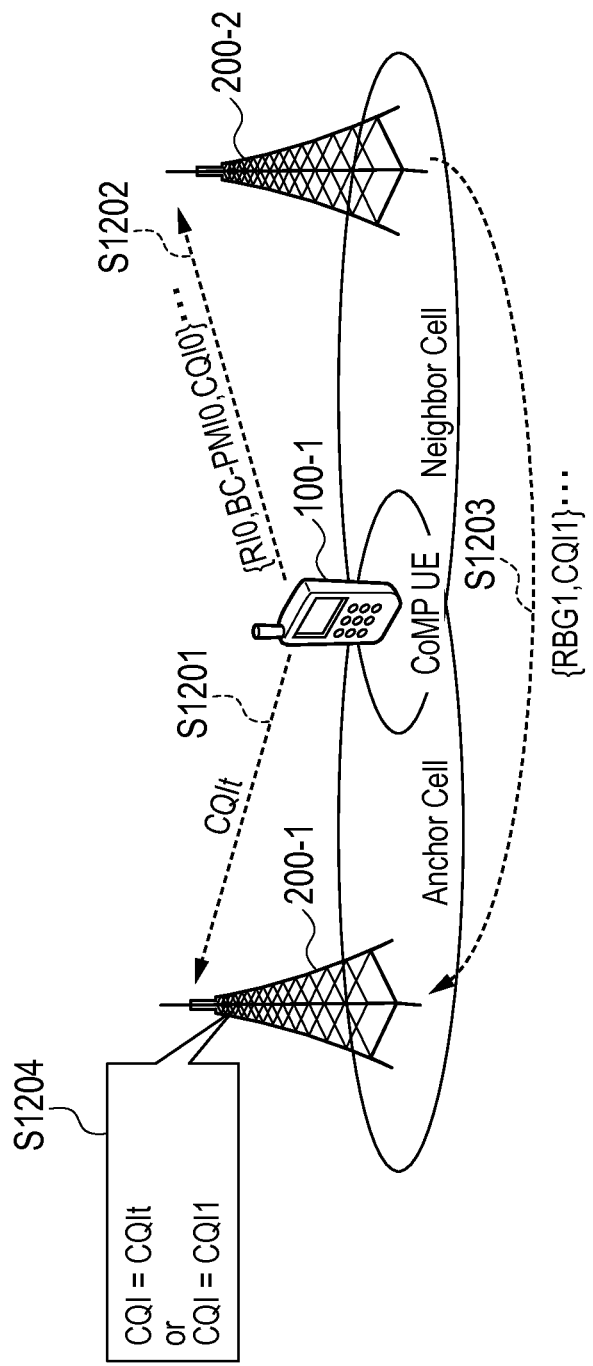
FIG. 45 is a diagram illustrating an operation sequence according to the sixth embodiment.

FIG. 45 is a diagram illustrating an operation sequence according to the present embodiment.

As illustrated in FIG. 45, in step S1201, the UE 100-1 feeds back the normal CQI (hereinafter, "CQIt") to the eNB 200-1. The CQIt is information indicating the MCS recommended on the basis of the status of the reception signal from the eNB 200-1. The CQIt is selected without taking into consideration the PM/RI.

In step S1202, the UE 100-1 notifies a plurality of combinations {RI, BC-PMI, CQI} . . . to the eNB 200-2. The method of generating a plurality of combinations {RI, BC-PMI, CQI} . . . is the same as that in step S1101 through step S1104 of the fifth embodiment.

It must be noted that the UE 100-1 need not necessarily notify the plurality of combinations {RI, BC-PMI, CQI} . . . directly to the eNB 200-2, but may indirectly notify the plurality of combinations {RI, BC-PMI, CQI} . . . to the eNB 200-2 via the eNB 200-1.

In step S1203, the eNB 200-2 selects any one pair {RI, BC-PMI} from among the plurality of combinations {RI, BC-PMI, CQI} . . . . The method of selecting any one pair {RI, BC-PMI} is the same as that in step S1107 of the fifth embodiment. In addition, the eNB 200-2 notifies the CQI corresponding to the selected pair {RI, BC-PMI} to the eNB 200-1. The additional information (such as the resource block information) that is the same as that in the fifth embodiment may be notified together with the CQI to the eNB 200-1.

In step S1204, the eNB 200-1 uses the CQI notified from the eNB 200-2 for scheduling the UE 100-1. The method of scheduling is the same as that in step S1109 of the fifth embodiment. However, if there is no CQI notification from the eNB 200-2, the eNB 200-1 uses the CQIt for scheduling the UE 100-1.

Thus, the eNB 200-1 can use the BC-PMI/RI selected by the eNB 200-2, that is, the eNB 200-1 can use the CQI in which the usage status of the precoder matrix/rank of the eNB 200-2 is reflected, for scheduling the UE 100-1. Therefore, MCS appropriate for the real environment is applied, because of which communication with the target error rate can be realized.

[Seventh Embodiment]

Hereinafter, a seventh embodiment will be described while focusing on the differences from the fifth embodiment.

In the above-described fifth embodiment, a plurality of pairs {RI, BC-PMI} . . . were notified to the eNB 200-2. In contrast, in the seventh embodiment, a plurality of combinations {RI, BC-PMI, ΔCQI} . . . of the pairs of {RI, BC-PMI} and the ΔCQI (difference information) corresponding to the pairs are notified to the eNB 200-2. The details of ΔCQI will be described later.

Furthermore, in the above-described fifth embodiment, the eNB 200-2 notified the selected pair {RI, BC-PMI} to the eNB 200-1. In contrast, in the seventh embodiment, the eNB 200-2 notifies the ΔCQI corresponding to the selected pair {RI, BC-PMI} to the eNB 200-1.

In addition, in the above-described fifth embodiment, the eNB 200-1 used the CQI corresponding to the pair {RI, BC-PMI} notified from the eNB 200-2 in the scheduling. In contrast, in the seventh embodiment, the eNB 200-1 uses the CQI obtained from the CQIt and the ΔCQI notified from the eNB 200-2 in the scheduling.

Figure 46:
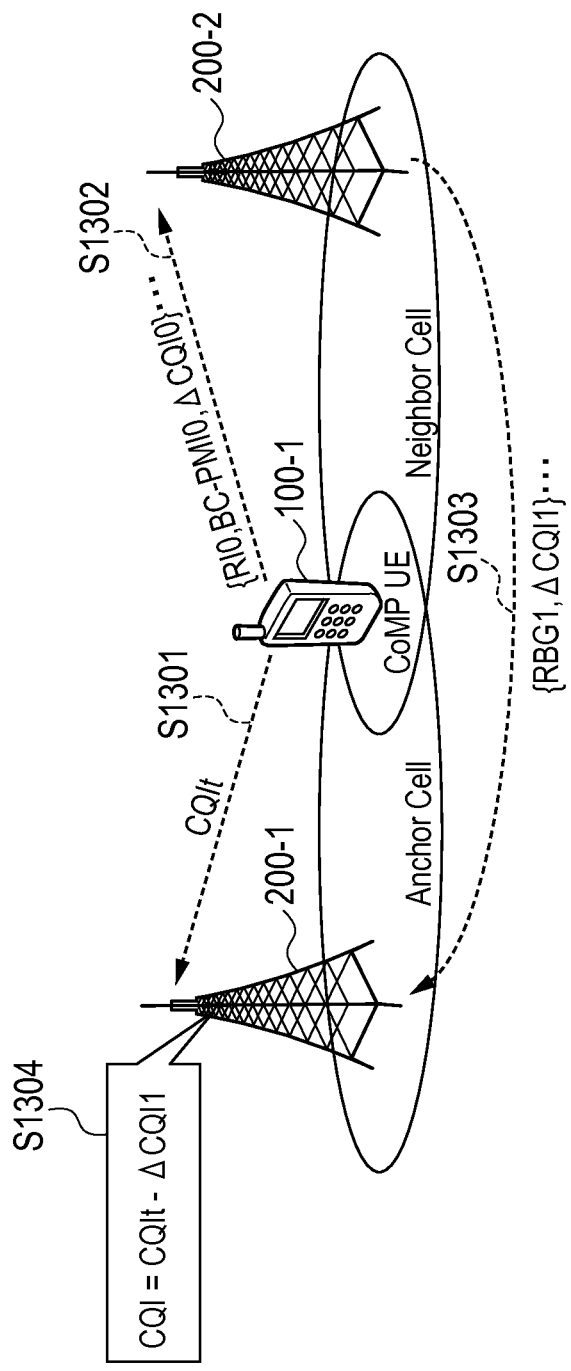
FIG. 46 is a diagram illustrating an operation sequence according to the seventh embodiment.

FIG. 46 is a diagram illustrating an operation sequence according to the present embodiment.

As illustrated in FIG. 46, in step S1301, the UE 100-1 feeds back the CQIt to the eNB 200-1.

In step S1302, the UE 100-1 generates a plurality of combinations of the pairs of {RI, BC-PMI}, and the ΔCQI indicating the difference between the CQI corresponding to the pairs and the CQIt. That is, in place of the CQI included in the combinations {RI, BC-PMI, CQI} . . . described in the fifth embodiment, the UE 100-1 uses the ΔCQI indicating the difference between the CQI and the CQIt. In addition, the UE 100-1 notifies a plurality of combinations {RI, BC-PMI, ΔCQI} . . . to the eNB 200-2.

It must be noted that the UE 100-1 need not necessarily notify the plurality of combinations {RI, BC-PMI, ΔCQI} . . . directly to the eNB 200-2, but may indirectly notify the plurality of combinations {RI, BC-PMI, ΔCQI} . . . to the eNB 200-2 via the eNB 200-1.

In step S1303, the eNB 200-2 selects any one pair {RI, BC-PMI} from among the plurality of combinations {RI, BC-PMI, ΔCQI} . . . . The method of selecting any one pair {RI, BC-PMI} is the same as that in step S1107 of the fifth embodiment. In addition, the eNB 200-2 notifies the ΔCQI corresponding to the selected pair {RI, BC-PMI} to the eNB 200-1. The additional information (such as the resource block information) that is the same as the fifth embodiment may be notified together with the ΔCQI to the eNB 200-1.

In step S1304, the eNB 200-1 uses the CQI determined from the CQIt and the ΔCQI notified from the eNB 200-2 for scheduling the UE 100-1. For example, the value obtained by subtracting the ΔCQI from the CQIt is determined as the CQI to be used in the scheduling. The method of scheduling is the same as that in step S1109 of the fifth embodiment.

Thus, the eNB 200-1 can use the BC-PMI/RI selected by the eNB 200-2, that is, the eNB 200-1 can use the CQI in which the usage status of the precoder matrix/rank of the eNB 200-2 is reflected, for scheduling the UE 100-1. Therefore, MCS appropriate for the real environment is applied, because of which communication with the target error rate can be realized.

[Eighth Embodiment]

Hereinafter, an eighth embodiment will be described while focusing on the differences from the fifth embodiment.

In the above-described fifth embodiment, a plurality of pairs {RI, BC-PMI} . . . were notified to the eNB 200-2. In contrast, in the eighth embodiment, a plurality of pairs {RI, BC-PMI} . . . are correlated with the priority order and notified to the eNB 200-2. Furthermore, the UE 100-1 notifies, to the eNB 200-1, CQI0 (specific channel quality information) corresponding to the highest priority order (specific priority order), and the priority order (the first priority order) set in the pair {RI, BC-PMI} of which the QQI changes with respect to the CQI0.

FIG. 47 is a diagram illustrating an operation of the UE 100-1 according to the present embodiment.

As illustrated in FIG. 47, the UE 100-1 sets a priority order (Priority) for the plurality of pairs {RI, BC-PMI} . . . in the order of the higher evaluated value. Furthermore, the CQI that is recommended when the pair is applied is selected for each of the plurality of pairs {RI, BC-PMI}.

From the highest priority order (Priority 0) up to the fourth highest priority order (Priority 3), the CQI has the same value (CQI0), however, the CQI changes from the fifth highest priority order (Priority 4), and the CQI further changes from the seventh highest priority order (Priority 6). In such a case, the UE 100-1 notifies, to the eNB 200-1, the CQI0 corresponding to the highest priority order (Priority 0), and the priority order at the time of change of the priority order (Priority 4 and Priority 6).

Furthermore, in the above-described fifth embodiment, the eNB 200-2 notified the selected pair {RI, BC-PMI} to the eNB 200-1. In contrast, in the eighth embodiment, the eNB 200-2 notifies, to the eNB 200-1, the priority order (the second priority order) corresponding to the selected RI/BC-PMI.

In addition, in the above-described fifth embodiment, the eNB 200-1 used the CQI corresponding to the pair {RI, BC-PMI} notified from the eNB 200-2 in the scheduling. In contrast, in the eighth embodiment, the eNB 200-1 uses the CQI obtained from the CQI0, and the relative between the first priority order (Priority 4 and Priority 6) and the second priority order, for scheduling the UE 100-1.

Figure 48:
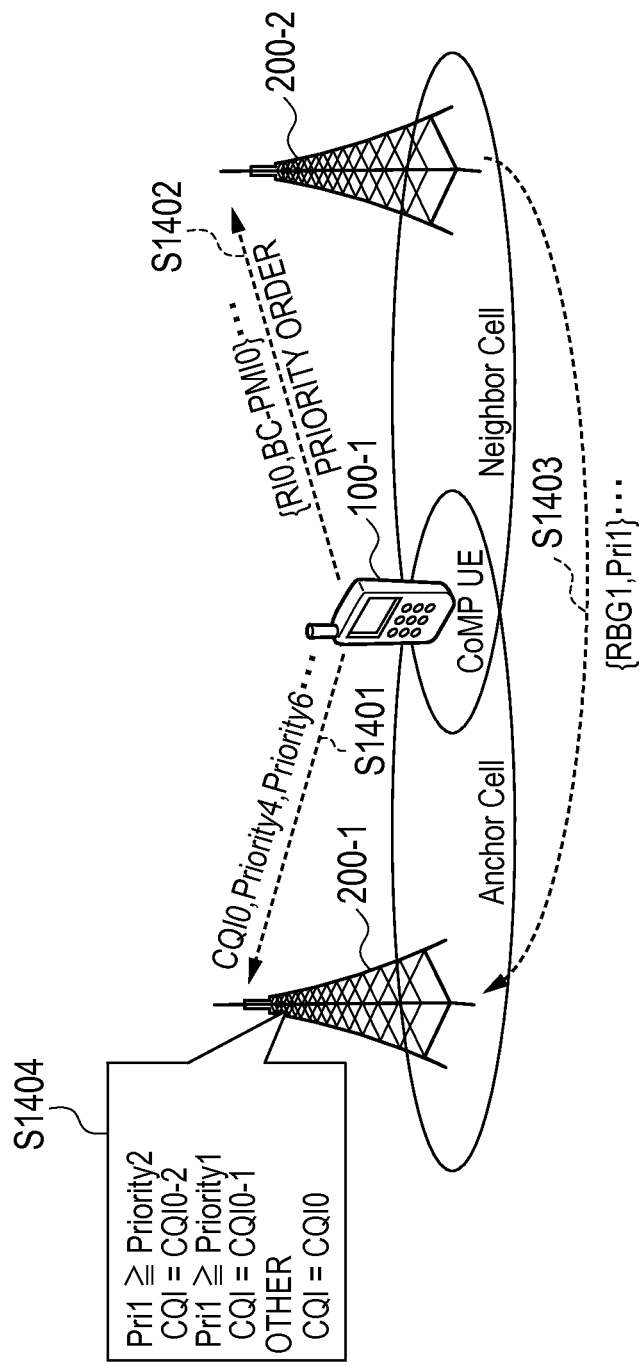
FIG. 48 is a diagram illustrating an operation sequence according to the eighth embodiment.

FIG. 48 is a diagram illustrating an operation sequence according to the present embodiment.

As illustrated in FIG. 48, in step S1401, the UE 100-1 notifies, to the eNB 200-1, the CQI0 (specific channel quality information), and the priority order (Priority 4 and Priority 6) set in the pair {RI, BC-PMI} of which the QQI changes with respect to the CQI0.

In step S1402, the UE 100-1 correlates the plurality of pairs {RI, BC-PMI} . . . with the priority order and notifies to the eNB 200-2.

It must be noted that the UE 100-1 need not necessarily notify the plurality of pairs {RI, BC-PMI} . . . directly to the eNB 200-2, but may indirectly notify the plurality of pairs {RI, BC-PMI} . . . to the eNB 200-2 via the eNB 200-1.

In step S1403, the eNB 200-2 selects any one pair {RI, BC-PMI} from among the plurality of pairs {RI, BC-PMI} . . . . The method of selecting any one pair {RI, BC-PMI} is the same as that in step S1107 of the fifth embodiment. In addition, the eNB 200-2 notifies the priority order (Pri1) corresponding to the selected pair {RI, BC-PMI} to the eNB 200-1. The additional information (such as the resource block information) that is the same as that in the fifth embodiment may be notified together with the priority order (Pri1) to the eNB 200-1.

In step S1404, the eNB 200-1 uses the CQI obtained from the CQI0 and the priority order (Priority 4 and Priority 6) notified from the UE 100-1, and the priority order (Pri1) notified from the eNB 200-2, for scheduling the UE 100-1. Specifically, the eNB 200-1 determines the CQI corresponding to the priority order (Pri1) by comparing the Priority 6 and the priority order (Pri1) notified from the eNB 200-2 with the priority order (Priority 4 and Priority 6) notified from the UE 100-1. For example, if the priority order (Pri1) is equal to or higher than Priority 6, it can be determined that the CQI corresponding to the priority order (Pri1) is CQI that is two stages lower than the CQI0. Furthermore, if the priority order (Pri1) is less than Priority 6 and equal to or higher than Priority 4, it can be determined that the CQI corresponding to the priority order (Pri1) is CQI that is one stage lower than the CQI0. The method of scheduling is the same as that in step S1109 of the fifth embodiment.

Thus, the eNB 200-1 can use the BC-PMI/RI selected by the eNB 200-2, that is, the eNB 200-1 can use the CQI in which the usage status of the precoder matrix/rank of the eNB 200-2 is reflected, for scheduling the UE 100-1. Therefore, MCS appropriate for the real environment is applied, because of which communication with the target error rate can be realized.

Furthermore, in the present embodiment, as compared to each of the above-described embodiments, the UE 100-1 can reduce the amount of information that must be fed back.

[Modification of Fifth to Eighth Embodiments]

For example, the above-described fifth to the eighth embodiments need not necessarily be executed individually, and each embodiment can be executed with combining mutually.

In the above-described fifth embodiment through the eighth embodiment, an example of using BC-PMI in the CB-CoMP was described, however, in place of the BC-PMI, a WC (Worst Companion)-PMI may be used. The WC-PMI is information indicating the precoder matrix (the precoder matrix in which a beam is directed toward the UE 100-1) in which the influence of the interference exerted on the UE 100-1 is large. If PMI that does not match the WC-PMI from the UE 100-1 is fed back by the UE 100 within the cell of the eNB 200-2 (for example, the UE 100-2), the eNB 200-2 assigns the same radio resource as that of the UE 100-1 to the UE 100 within the cell of the eNB 200-2, and applies the PMI that does not match the WC-PMI to the downlink multi-antenna transmission toward the UE 100 within the cell of the eNB 200-2.

[Other Embodiments]

In the first embodiment to eighth embodiment described above, although not mentioned in detail about the feedback timing of the precoder matrix information (PMI/BC-PMI), and may be used in combination periodic feedback and aperiodic feedback.

Mobile communication system according to other embodiments, by applying a precoder matrix to determine the transmission directionality of the downlink perform downlink multi-antenna transmission. The mobile communication system includes a user terminal (UE 100) for feeding back precoder matrix information on the serving cell (eNB 200) as feedback information about the target frequency band. The user terminal, while periodically provide feedback of the first precoder matrix information, aperiodic feedback of the second precoder matrix information is also performed.

The first precoder matrix information indicates a preferred precoder matrices for the user terminal in communication with the serving cell (i.e., the normal PMI). The second precoder matrix information indicates a precoder matrix preferred for the user terminal from the perspective of interference with other cells gives (i.e., BC-PMI), or a precoder matrix not preferred for the user terminal from the perspective of interference (i.e., WC-PMI). The user terminal is aperiodically multiple feeds back the second precoder matrix information. For example, UE 100 is, while periodically fed back PMI (first precoder matrix information), an aperiodic BC-PMI (second precoder matrix information) or WC-PMI (second precoder matrix information) multiple feedback. Each of the plurality of BC-PMI (or WC-PMI), may be RI is associated.

Alternatively, the first precoder matrix information includes a precoder matrix information indicating precoder matrix preferred for the user terminal (that is, a normal PMI) in communication with the serving cell. In addition, the first precoder matrix information includes precoder matrix information indicating a precoder matrix most preferred for the user terminal in perspective of interference from other cells is given to the user terminal (1st BC-PMI), or a most unfavorable precoder matrix in perspective of the interference (1st WC-PMI). The second precoder matrix information includes precoder matrix information indicating a precoder matrix second or subsequent preferred for the user terminal in perspective of the interference (BC-PMI after or equal to 2nd), or a precoder matrix second or subsequent not preferred for the user terminal in perspective of the interference (WC-PMI after or equal to 2nd). The user terminal is aperiodically multiple feeds back the second precoder matrix information. For example, UE 100, while periodically feeding back PMI (first precoder matrix information) and 1st BC-PMI (first precoder matrix information) or 1st WC-PMI (first precoder matrix information), aperiodically multiple feeds back 2nd or subsequent BC-PMI (second precoder matrix information) or 2nd or subsequent WC-PMI (second precoder matrix information). Each of the plurality of BC-PMI may be associated with RI.

In the first to eighth embodiments described above, BC-PMI (or WC-PMI) to be fed back is determined on the basis of the interference level (interference power) assuming when applying the BC-PMI (or WC-PMI) is applied, as the evaluation value of BC-PMI (or WC-PMI). However, not only the interference level, it is possible to determine the BC-PMI (or WC-PMI) in consideration of reception weights in the UE 100. For example, it is possible to determine the BC-PMI (or WC-PMI) based on the interference level after reception weight applied.

CROSS-REFERENCE

The entire content of U.S. Provisional Application No. 61/715,588 (filed on Oct. 18, 2012), U.S. Provisional Application No. 61/715,632 (filed on Oct. 18, 2012), U.S. Provisional Application No. 61/715,651 (filed on Oct. 18, 2012), and U.S. Provisional Application No. 61/723,069 (filed on Nov. 6, 2012) are incorporated herein by reference.

INDUSTRIAL APPLICABILITY

The present invention is useful in wireless communication field such as mobile communications.

The invention claimed is:

1. A mobile communication system that performs downlink multi-antenna transmission, comprising:
a base station that manages a serving cell,
a first user terminal that camps on a neighboring cell of the serving cell, and
a plurality of second user terminals that camp on the serving cell, wherein
the base station includes a first processor configured to apply a precoder matrix that defines transmission directionality of downlink to each signal layer of a plurality of signal layers of the downlink, and a rank that indicates the number of signal layers of the downlink; and
the first user terminal includes a second processor configured to feed back first feedback information on a target frequency band, to the base station, wherein
the first feedback information includes a plurality of combinations of precoder matrix information and rank information, wherein
the combinations include a plurality of ranks and at least one precoder matrix corresponding to each of the plurality of ranks,
each combination of the plurality of combinations includes a piece of precoder matrix information and a piece of rank information,
the piece of precoder matrix information indicates a special precoder matrix in which the influence of the interference exerted on the first user terminal is less,
the pieces of rank information included in the plurality of combinations indicate different ranks, and
the first processor is further configured to:
use the special precoder matrix to specify one second user terminal to be assigned with same radio resource as that of the first user terminal, from among the plurality of second user terminals, and assign the same radio resource to the one second user terminal.

2. The mobile communication system according to claim 1, wherein
the first processor specifies the one second user terminal that feeds back second feedback information matching any of the plurality of combinations included in the first feedback information, and then performs transmission to the one second user terminal according to the matching feedback information, wherein
the second feedback information includes a combination of a piece of precoder matrix in which a beam is directed to the second user terminal and a piece of rank information indicating the rank.

3. The mobile communication system according to claim 1, wherein
for each of several pieces of prescribed rank information, the second processor calculates evaluated value of each of the several pieces of prescribed precoder matrix information, and the second processor includes the plurality of combinations in the first feedback information on the basis of the evaluated value.

4. The mobile communication system according to claim 3, wherein
for each of the several pieces of rank information, the second processor selects a predetermined number of pieces of matrix information in accordance with the evaluated value, and
the second processor includes the plurality of combinations of each of the several pieces of rank information and the selected predetermined number of pieces of precoder matrix information in the first feedback information.

5. The mobile communication system according to claim 3, wherein
for each of the several pieces of rank information, the second processor selects the precoder matrix information in accordance with comparison result of the evaluated value and threshold value, and
the second processor includes the plurality of combinations of each of the several pieces of rank information and the selected precoder matrix information in the first feedback information.

6. The mobile communication system according to claim 3, wherein
for each of the several pieces of rank information, the second processor selects a piece of precoder matrix information in which difference from maximum evaluated value or from minimum evaluated value is less than threshold value, and
the second processor includes combinations of each of the several pieces of rank information and the selected piece of precoder matrix information in the feedback information.

7. The mobile communication system according to claim 3, wherein
the second processor selects, in accordance with comparison result of the evaluated value and threshold value, a combination of a piece of precoder matrix information and a piece of rank information corresponding to the piece of precoder matrix information, and
the second processor includes the selected combination in the first feedback information.

8. The mobile communication system according to claim 3, wherein
the second processor adds priority order information indicating a priority order determined in accordance with the evaluated value, to each of the plurality of combinations, and
the second processor includes the plurality of combinations, to which the priority order information is added, in the first feedback information.

9. The mobile communication system according to claim 3, wherein
the evaluated value of the precoder matrix information is channel quality information indicating modulation and coding scheme recommended when the precoder matrix corresponding to the precoder matrix information is applied, and
the second processor selects combination of a piece of precoder matrix information, which is in accordance with comparison result of the evaluated value and the channel quality information to be fed back, and a piece of rank information corresponding to the piece of precoder matrix information, and the second processor includes the selected combination in the first feedback information.

10. The mobile communication system according to claim 5, wherein
the second processor additionally sets unselected precoder matrix information to a null value, and includes the resultant information in the first feedback information.

11. The mobile communication system according to claim 3, wherein
the second processor selects a predetermined number of combinations in accordance with the evaluated value, and
the second processor includes the selected combinations in the first feedback information.

12. The mobile communication system according to claim 11, wherein
from among the selected combinations, the second processor sets a piece of precoder matrix information, in accordance with comparison result of the evaluated value and threshold value, to a null value, and includes the resultant information in the first feedback information.

13. The mobile communication system according to claim 1, wherein
when the second processor selects all pieces of precoder matrix information as the feedback information, then instead of feeding back the all pieces of precoder matrix information to the base station, the second processor feeds back an index indicating the all pieces of precoder matrix information to the base station.

14. The mobile communication system according to claim 1, wherein
if number of user terminals connected to the base station is equal to more than a predetermined value, the second processor includes only one of the plurality of combinations in the first feedback information instead of including the plurality of combinations in the first feedback information.

15. A communication control method in a mobile communication system supporting downlink multi-antenna transmission and including a first base station, a user terminal that establishes a connection with the first base station, and a second base station that cooperates with the first base station, comprising:
a step A of determining, by the user terminal, a plurality of combinations of transmission control information and channel quality information, wherein
each combination of the plurality of the combinations includes a piece of transmission control information and a piece of channel quality information, the piece of transmission control information indicates a pair of a precoder matrix and a rank for the downlink multi-antenna transmission,
the piece of channel quality information indicates a modulation and coding scheme that is recommended when the piece of transmission control information is applied;
a step X of notifying, by at least one of the first base station and the user terminal, to the second base station, several pieces of transmission control information included in the plurality of combinations, wherein the several pieces of transmission control information include a plurality of different ranks and the corresponding precoder matrices;
a step B of selecting, by the second base station, a piece of transmission control information from among the several pieces of transmission control information, and then notifying, to the first base station, predetermined information related to the selected transmission control information; and
a step C of determining, by the first base station, based on the predetermined information, channel quality information corresponding to the piece of transmission control information selected by the second base station, and then using the determined channel quality information for scheduling the user terminal.

16. The communication control method according to claim 15, wherein
the step C comprises a step of using the piece of transmission control information selected by the second base station in the scheduling of the user terminal, in addition to the determined channel quality information, or in place of the determined channel quality information.

17. The communication control method according to claim 15, wherein
the step A comprises a step of transmitting the plurality of combinations by the user terminal to the first base station,
the step B comprises a step of notifying, by the second base station, to the first base station, the selected piece of transmission control information as the predetermined information, and
the step C comprises a step of using, by the first base station, the channel quality information corresponding to the piece of transmission control information as the predetermined information from among the plurality of combinations, in the scheduling of the user terminal.

18. The communication control method according to claim 15, wherein
the step A comprises a step of notifying, by the user terminal, to the second base station, the plurality of combinations,
the step B comprises a step of notifying, by the second base station, to the first base station, the channel quality information corresponding to the selected piece of transmission control information from among the plurality of combinations, as the predetermined information, and
the step C comprises a step of using, by the first base station, the channel quality information as the predetermined information, in the scheduling of the user terminal.

19. The communication control method according to claim 17, wherein
the step A further comprises a step of transmitting, by the user terminal, to the first base station, normal channel quality information indicating a modulation and coding scheme recommended on the basis of status of a reception signal, and
the step C further comprises a step of using, by the first base station, the normal channel quality information in the scheduling of the user terminal, when there is no notification of the predetermined information from the second base station.

20. The communication control method according to claim 15, wherein
the step A comprises:
a step of transmitting, by the user terminal, to the first base station, normal channel quality information indicating a modulation and coding scheme recommended on the basis of status of a reception signal, and a step of notifying, by the user terminal, to the second base station, difference information indicating the difference from the normal channel quality information for each of the several pieces of channel quality information included in the plurality of combinations, and the step B comprises a step of notifying, by the second base station, to the first base station, the difference information corresponding to the selected piece of transmission control information from among the plurality of combinations, as the predetermined information, and the step C comprises a step of using, by the first base station, channel quality information generated from the normal channel quality information and the difference information as the predetermined information, in the scheduling of the user terminal.

21. The communication control method according to claim 15, wherein the step A comprises:

a step of setting, by the user terminal, a priority order for each of the plurality of combinations, and then transmitting, to the first base station, specific channel quality information corresponding to a specific priority order, and a first priority order set in a combination for which channel quality information changes with respect to the specific channel quality information, and a step of correlating, by the user terminal, each of the several pieces of transmission control information to the priority order, and then notifying the second base station of the resultant information, and the step B comprises a step of notifying, by the second base station, to the first base station, the second priority order corresponding to the selected transmission control information as the predetermined information, and the step C comprises a step of using, by the first base station, channel quality information generated from the specific channel quality information and the relative between the first priority order and the second priority order, in the scheduling of the user terminal.

22. A first user terminal comprising:

a controller including at least one processor and at least one memory, the processor configured to feed back first feedback information on a target frequency band, to a base station, wherein the first feedback information includes a plurality of combinations of precoder matrix information and rank information, the base station manages a serving cell on which a plurality of second user terminals camp, and the first user terminal camps on a neighboring cell of the serving cell, wherein the combinations include a plurality of ranks and at least one precoder matrix corresponding to each of the plurality of ranks, each combination of the plurality of combinations includes a piece of precoder matrix information and a piece of rank information, the piece of precoder matrix information indicates a special precoder matrix in which the influence of the interference exerted on the first user terminal is less, and the pieces of rank information included in the plurality of combinations indicate different ranks, wherein the special precoder matrix enables the base station to specify one second user terminal to be assigned with same radio resource as that of the first user terminal, from among the plurality of second user terminals, and to assign the same radio resource to the one second user terminal.

* * * * *